United States Patent
Lee et al.

(10) Patent No.: US 8,442,151 B2
(45) Date of Patent: May 14, 2013

(54) METHOD AND APPARATUS FOR TRANSMITTING REFERENCE SIGNAL IN MULTIPLE ANTENNA SYSTEM

(75) Inventors: Moon II Lee, Gyeongki-do (KR); So Yeon Kim, Gyeongki-do (KR); Ja Ho Koo, Gyeongki-do (KR); Hyun Soo Ko, Gyeongki-do (KR); Jae Hoon Chung, Gyeongki-do (KR); Seung Hee Han, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 211 days.

(21) Appl. No.: 13/054,345

(22) PCT Filed: Jul. 17, 2009

(86) PCT No.: PCT/KR2009/003970
§ 371 (c)(1),
(2), (4) Date: Jan. 14, 2011

(87) PCT Pub. No.: WO2010/008245
PCT Pub. Date: Jan. 21, 2010

(65) Prior Publication Data
US 2011/0116572 A1    May 19, 2011

Related U.S. Application Data

(60) Provisional application No. 61/081,712, filed on Jul. 17, 2008, provisional application No. 61/085,428, filed on Aug. 1, 2008.

(30) Foreign Application Priority Data

Feb. 17, 2009    (KR) .................. 10-2009-0013091

(51) Int. Cl.
*H04L 27/00* (2006.01)

(52) U.S. Cl.
USPC ........................................ 375/299; 375/295

(58) Field of Classification Search ................ 375/260
See application file for complete search history.

(56) References Cited

U.S. PATENT DOCUMENTS

2009/0252077 A1*  10/2009  Khandekar et al. .......... 370/312
2010/0002789 A1*  1/2010   Karabinis ..................... 375/260

FOREIGN PATENT DOCUMENTS

WO    00/55986     9/2000
WO    03/034642    4/2003

OTHER PUBLICATIONS

Bastug, et al., "Common and Dedicated Pilot-Based Channel Estimates Combining and Kalman Filtering for WCDMA Terminals", IEEE, http://ieeexplore.ieee.org/stamp/stamp.jsp?arnumber=01599713, pp. 111-115, Dec. 31, 2005.

* cited by examiner

*Primary Examiner* — Erin File
(74) *Attorney, Agent, or Firm* — Morgan, Lewis & Bockius LLP

(57) ABSTRACT

A method and an apparatus for transmitting a reference signal in a multiple antenna system are provided. The method includes transmitting a common reference signal through N antennas (N<M, where M and N is a natural number), and transmitting a dedicated reference signal through M–N antennas, wherein the common reference signal is transmitted to all user equipments within a cell, and the dedicated reference signal is transmitted to at least one user equipment within the cell.

12 Claims, 79 Drawing Sheets

Fig. 23
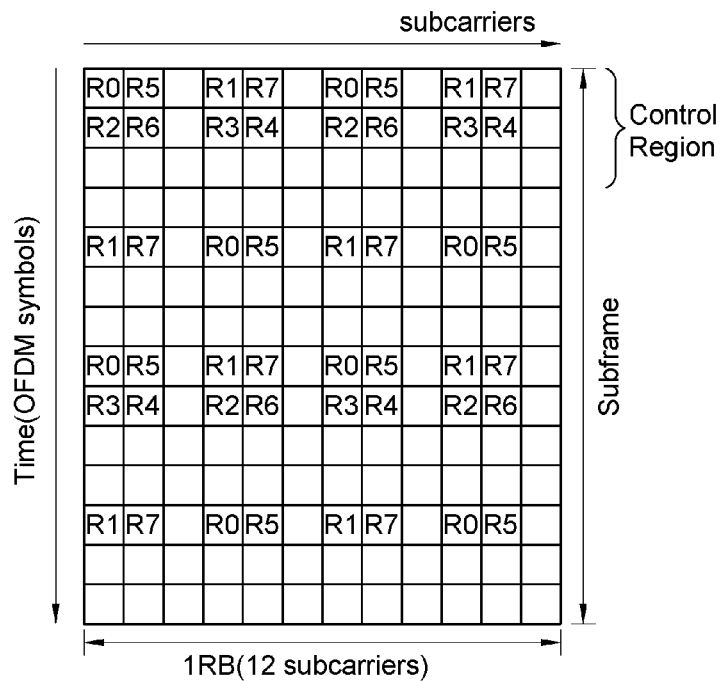
[Fig. 24
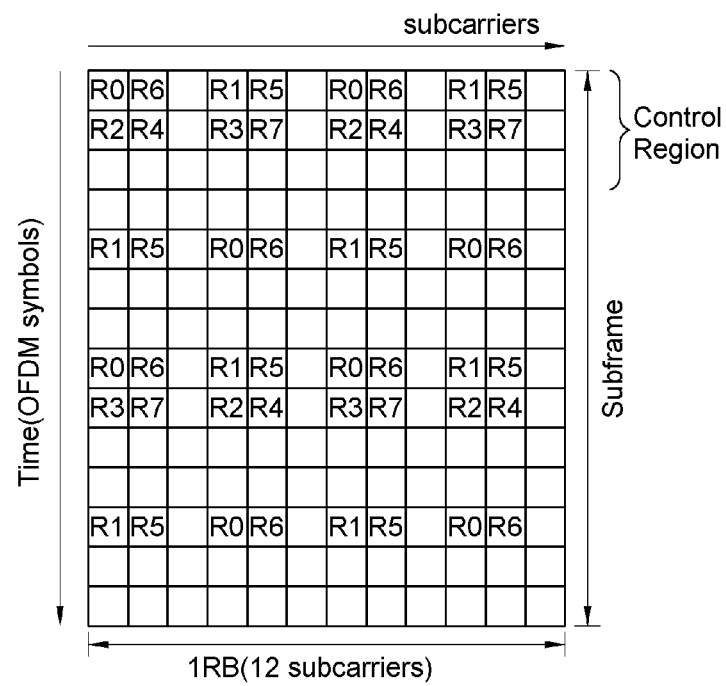

[Fig. 127]
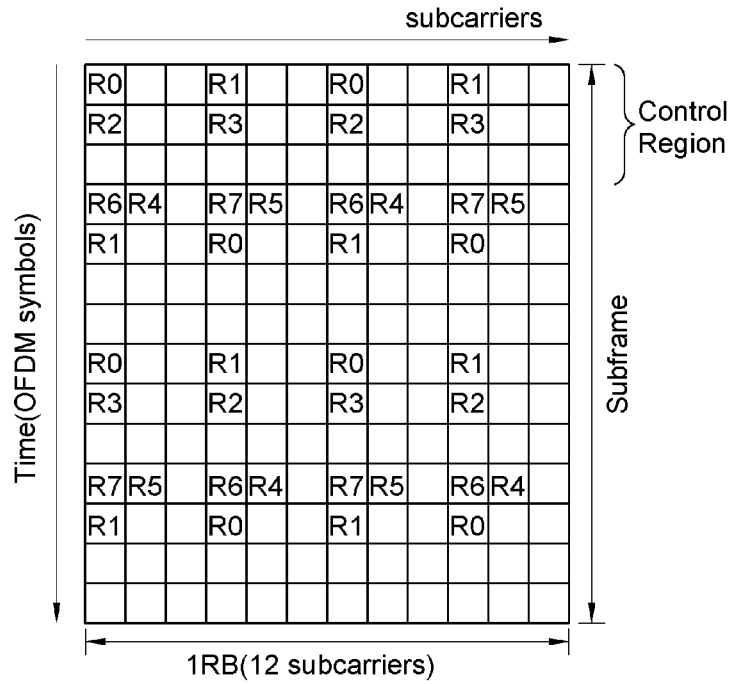
Fig. 128
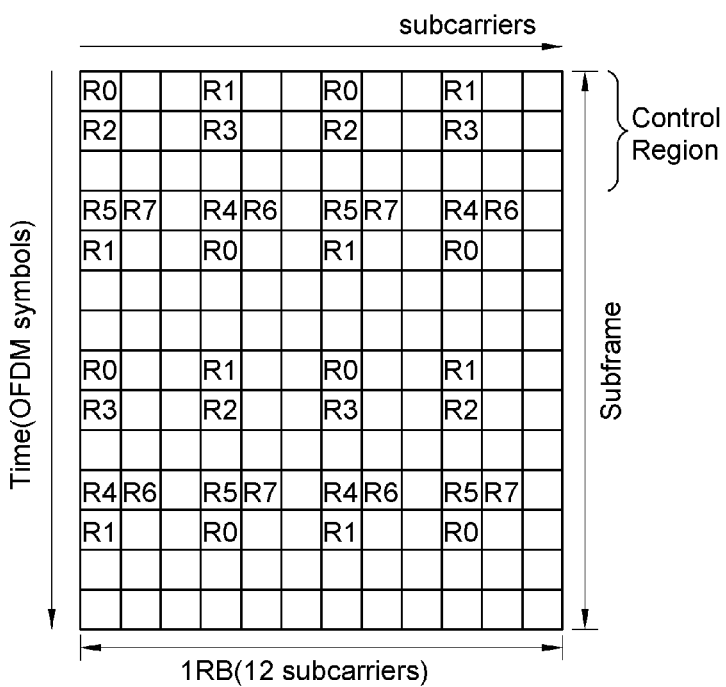

METHOD AND APPARATUS FOR TRANSMITTING REFERENCE SIGNAL IN MULTIPLE ANTENNA SYSTEM

The present application is a national stage of PCT International Application No. PCT/KR2009/003970, filed Jul. 17, 2009, and claims the benefit of U.S. Provisional Application Nos. 61/081,712 and 61/085,428, filed Jul. 17, 2008, and Aug. 1, 2008. The present national stage application also claims the benefit of Korean Patent Application No. 10-2009-0013091, filed Feb. 17, 2009.

TECHNICAL FIELD

The present invention relates to wireless communications, and more particularly, to a method and an apparatus for transmitting a reference signal in a multiple antenna system.

BACKGROUND ART

In next generation multimedia mobile communication systems, which have been actively studied in recent years, there is a demand for a system capable of processing and transmitting a variety of information (e.g., video and radio data) in addition to the early-stage voice service. 3rd generation wireless communication is followed by a 4th generation wireless communication which is currently being developed aiming at support of a high-speed data service of 1 gigabits per second (Gbps) in downlink and 500 megabits per second (Mbps) in uplink. Wireless communication systems are designed for the purpose of providing reliable communication to a plurality of users irrespective of users' locations and mobility. However, a wireless channel has an abnormal characteristic such as path loss, noise, fading due to multipath, an inter-symbol interference (ISI), the Doppler effect due to mobility of a user equipment, etc. Therefore, various techniques have been developed to overcome the abnormal characteristic of the wireless channel and to increase reliability of wireless communication.

Orthogonal Frequency Division Multiplexing (OFDM), Multiple Input Multiple Output (MIMO), etc., are techniques for supporting reliable high-speed data services.

An OFDM system capable of reducing an inter-symbol interference effect with a low complexity is taken into consideration as one of post-3rd generation wireless communication systems. In the OFDM, a serially input data symbol is converted into N parallel data symbols (where N is a natural number), and is then transmitted by being carried on N separate subcarriers. The subcarriers maintain orthogonality in a frequency dimension. In a mobile communication market, a standard is expected to be changed from a conventional code division multiple access (CDMA) system to an OFDM-based system.

The MIMO technique improves data transmission/reception efficiency by using multiple transmit (Tx) antennas and multiple receive (Rx) antennas. Examples of the MIMO technique include spatial multiplexing, transmit diversity, beamforming, etc. A MIMO channel matrix depending on the number of Rx antennas and the number of Tx antennas can be decomposed into a plurality of independent channels. Each independent channel is referred to as a layer or a stream. The number of layers is referred to as a rank.

For the purpose of data transmission/reception, system synchronization acquisition, channel information feedback, etc., there is a need to estimate an uplink channel or a downlink channel in a wireless communication system. Channel estimation is a process of recovering a Tx signal by compensating for signal distortion in an environment where a rapid change occurs due to fading. In general, channel estimation requires a reference signal known to both a transmitter and a receiver. The reference signal is also referred to as a pilot.

In the OFDM system, reference signals may be allocated by using two methods, i.e., a first method in which the reference signals are allocated to all subcarriers and a second method in which the reference signals are allocated between data subcarriers. The first method uses a signal (e.g., a preamble signal) consisting of only reference signals. The first method has a significantly improved channel estimation performance in comparison with the second method, but has a decreased data transmission rate. Therefore, the second method can be used to increase the data transmission rate. The second method may result in deterioration of the channel estimation performance since density of the reference signals is decreased. Therefore, it is required that the reference signals are properly arranged to minimize the deterioration of the channel estimation performance.

When the transmitter transmits a reference signal p and the receiver receives an Rx signal y, the Rx signal y can be expressed by the following equation.

MathFigure 1

$$y = h \cdot p + n \qquad \text{[Math.1]}$$

Herein, h denotes a channel on which the reference signal is transmitted, and n denotes thermal noise generated in the receiver.

In this case, the reference signal p is known to the receiver. The receiver can estimate the channel by using the reference signal p. The estimated channel h' can be expressed by the following equation.

MathFigure 2

$$h' = y/p = h + n/p = h + n' \qquad \text{[Math.2]}$$

Accuracy of the estimated channel h' is determined according to n'. For the accuracy of the estimated channel h', n' has to converge to zero. Channel estimation may be performed by using a large number of reference signals to minimize an influence of n'. The receiver can compensate for the estimated channel to recover data transmitted by the transmitter.

Since antennas of a multiple antenna system respectively correspond to different channels, each antenna has to be considered in the designing of a reference signal structure. Therefore, the reference signal structure of the multiple antenna system may have a significantly large reference signal overhead. The reference signal overhead can be defined as a ratio of the number of subcarriers for transmitting the reference signal to the number of all subcarriers. When the reference signal overhead is great, there is a problem in that the number of data subcarriers for transmitting data in practice is decreased. This results in decrease in a data processing load and deterioration in spectrum efficiency. As a result, an overall system performance may deteriorate.

Accordingly, there is a need for a method and an apparatus for effectively transmitting a reference signal in a multiple antenna system.

DISCLOSURE OF INVENTION

Technical Problem

The present invention provides a method and an apparatus for transmitting a reference signal in a multiple antenna system.

Technical Solution

In an aspect, a method for transmitting a reference signal in a multiple antenna system using M antennas (M≧2, where M is a natural number) is provided. The method includes transmitting a common reference signal through N antennas (N<M) and transmitting a dedicated reference signal through M−N antennas, wherein the common reference signal is transmitted to all user equipments within a cell, and the dedicated reference signal is transmitted to at least one user equipment within the cell, and wherein a resource block is defined for each of the M antennas, the resource block comprises a plurality of orthogonal frequency division multiplexing (OFDM) symbols and a plurality of subcarriers, each element of the resource block is a resource element, and the common reference signal or the dedicated reference signal is transmitted through a reference symbol which corresponds to a resource element at a specific position in the resource block for each of the M antennas.

Preferably, the common reference signal is generated based on an identifier (ID) of the cell, and the dedicated reference signal is generated based on an ID of the at least one user equipment.

Preferably, the dedicated reference signal is transmited in a resource block mapped with a physical downlink shared channel (PDSCH), and information indicating the resource block mapped with the PDSCH is transmitted on a physical downlink control channel (PDCCH).

Preferably, the M antennas each has the same number of reference symbols within the resource block.

Preferably, the M antennas each has the same number of reference symbols in one OFDM symbol within the resource block.

The method may further include transmitting information indicating the number M and the number N by using a radio resource control (RRC) message.

Preferably, information indicating the number M and the number N is masked onto a cyclic redundancy check (CRC) attached to a broadcast channel (BCH) transport block.

Preferably, n OFDM symbols (where n is a natural number) within the resource block are mapped to only reference symbols of the N antennas transmitting the common reference signal.

Preferably, control information is transmitted on a PDCCH in the n OFDM symbols, and information indicating the number n is transmitted on a physical control format indicator channel (PCFICH).

Preferably, a first reference signal for one of the M antennas is generated based on a first sequence, and a second reference signal for the other one of the M antennas is generated based on a second sequence, and wherein the first reference signal and the second reference signal are multiplexed and are transmitted on the same resource element in the resource block.

Preferably, the second sequence is obtained by cyclic-shifting the first sequence in a time domain.

Preferably, the second sequence is orthogonal to the first sequence.

In another aspect, a transmitter is provided. The transmitter includes M antennas (M≧2, where M is a natural number) and a reference signal generator generating a common reference signal transmitted through N antennas (N<M), and generating a dedicated reference signal transmitted through M−N antennas, wherein the common reference signal is transmitted to all user equipments within a cell, and the dedicated reference signal is transmitted to at least one user equipment within the cell, and wherein a resource block is defined for each of the M antennas, the resource block comprises a plurality of OFDM symbols and a plurality of subcarriers, each element of the resource block is a resource element, and the common reference signal or the dedicated reference signal is transmitted through a reference symbol which corresponds to a resource element at a specific position on the resource block for each of the M antennas.

Advantageous Effects

A method and an apparatus for effectively transmitting a reference signal in a multiple antenna system are provided.

BRIEF DESCRIPTION OF DRAWINGS

FIG. 14 to FIG. 48 show examples in which reference symbols of antennas 4 to 7 of FIG. 13 are shifted in a frequency domain or are interchanged in their positions.

FIG. 127 to FIG. 137 show examples in which reference symbols of antennas 4 to 7 of FIG. 120 are interchanged in their positions.

MODE FOR THE INVENTION

Figure 1:
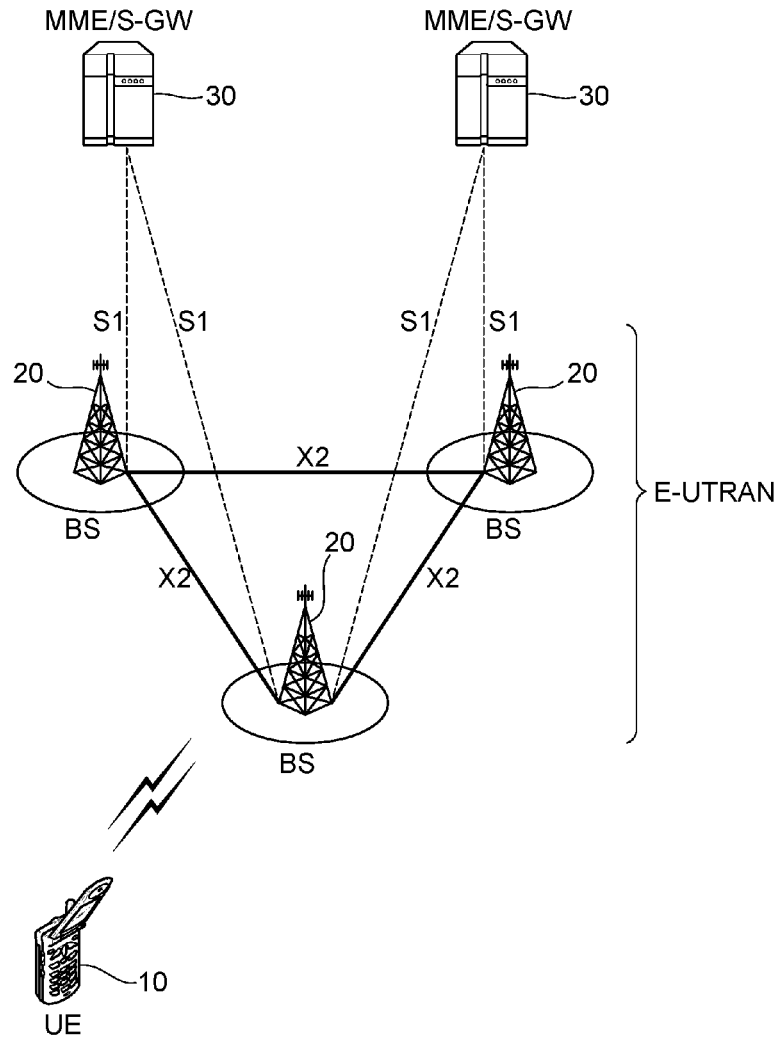
FIG. 1 is a block diagram showing a wireless communication system.

FIG. 1 is a block diagram showing a wireless communication system. This may be a network structure of a 3rd generation partnership project (3GPP) long term evolution (LTE)/LTE-advanced (LTE-A). The LTE may be also referred to as an evolved-universal mobile telecommunications system (E-UMTS). The wireless communication system can be widely deployed to provide a variety of communication services, such as voices, packet data, etc.

Referring to FIG. 1, an evolved-UMTS terrestrial radio access network (E-UTRAN) includes at least one base station (BS) 20 providing a user plane and a control plane towards a user equipment (UE) 10.

The UE 10 may be fixed or mobile, and may be referred to as another terminology, such as a mobile station (MS), a user terminal (UT), a subscriber station (SS), a mobile terminal (MT), a wireless device, etc. The BS 20 may be a fixed station that communicates with the UE 10 and may be referred to as another terminology, such as an evolved node-B (eNB), a base transceiver system (BTS), an access point, etc. There are one or more cells within the coverage of the BS 20. Interfaces for transmitting user traffic or control traffic may be used between the BSs 20. The BSs 20 are interconnected with each other by means of an X2 interface. The BSs 20 are also connected by means of an S1 interface to an evolved packet core (EPC), more specifically, to the mobility management entity (MME) by means of the S1-MME and to the serving gateway (S-GW) 30 by means of the S1-U. The S1 interface supports a many-to-many relation between the BS 20 and the MME/S-GW 30.

Hereinafter, downlink means communication from the BS 20 to the UE 10, and uplink means communication from the UE 10 to the BS 20. In downlink, a transmitter may be a part of the BS 20 and a receiver may be a part of the UE 10. In uplink, a transmitter may be a part of the UE 20 and a receiver may be a part of the BS 20.

The UE belongs to one cell. The cell to which the UE belongs is referred to as a serving cell. The BS which provides the serving cell with a communication service is referred to as a serving BS. The wireless communication system is a cellular system in which another cell is adjacent to the serving cell. The adjacent another cell is referred to as a neighbor cell.

Layers of a radio interface protocol between the UE and the network can be classified into a first layer (L1), a second layer (L2), and a third layer (L3) based on the lower three layers of the open system interconnection (OSI) model that is well-known in the communication system. The first layer is a physical (PHY) layer. The second layer can be divided into a medium access control (MAC) layer, a radio link control (RLC) layer, and a packet data convergence protocol (PDCP) layer. The third layer is a radio resource control (RRC) layer.

Figure 2:
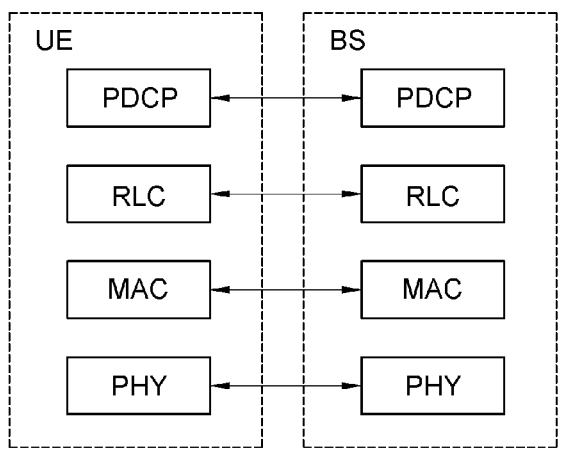
FIG. 2 is a block diagram showing a radio protocol architecture for a user plane.
Figure 3:
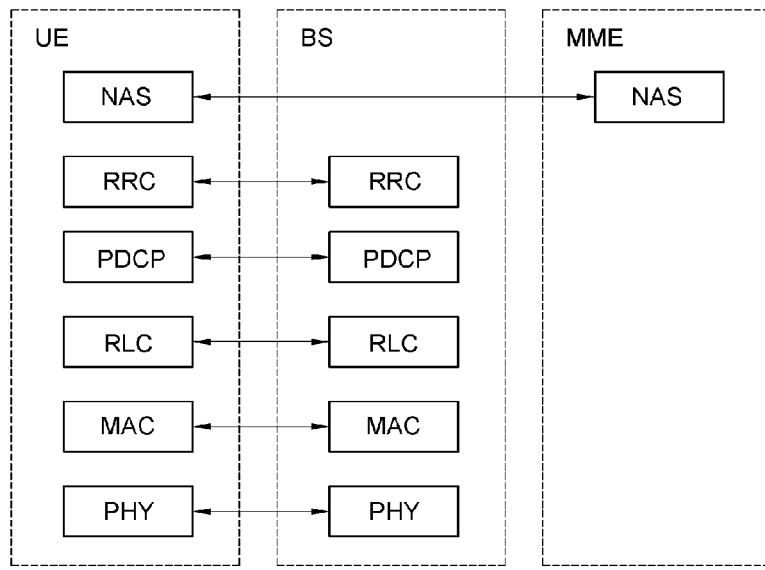
FIG. 3 is a block diagram showing a radio protocol architecture for a control plane.

FIG. 2 is a block diagram showing a radio protocol architecture for a user plane. FIG. 3 is a block diagram showing a radio protocol architecture for a control plane. They illustrate the architecture of a radio interface protocol between the UE and the E-UTRAN. The user plane is a protocol stack for user data transmission. The control plane is a protocol stack for control signal transmission.

Referring to FIGS. 2 and 3, between different PHY layers (i.e., a PHY layer of a transmitter and a PHY layer of a receiver), information is carried through a physical channel. The PHY layer is coupled with a MAC layer, i.e., an upper layer of the PHY layer, through a transport channel. Data is transferred between the MAC layer and the PHY layer through the transport channel. The PHY layer provides the MAC layer and upper layers with information transfer services through the transport channel.

The MAC layer provides services to an RLC layer, i.e., an upper layer of the MAC layer, through a logical channel. The RLC layer supports reliable data transmission. The PDCP layer performs a header compression function to reduce a header size of an Internet protocol (IP) packet.

An RRC layer is defined only in the control plane. The RRC layer controls radio resources between the UE and the network. For this, in the RRC layer, RRC messages are exchanged between the UE and the network. The RRC layer serves to control the logical channel, the transport channel, and the physical channel in association with configuration, reconfiguration and release of radio bearers (RBs). An RB means a logical path provided by a first layer (i.e. PHY layer) and second layers (i.e. MAC layer, RLC layer and PDCP layer) for data transmission between the UE and the network.

Configuring the RB includes defining radio protocol layers and characteristics of channels to provide a service and defining specific parameters and operation schemes. The RB may be classified into a signaling RB (SRB) and a data RB (DRB). The SRB is used as the path to transfer RRC messages in the control plane and the DRB is used as the path to transfer user data in the user plane. When an RRC connection is established between an RRC layer of the UE and an RRC layer of the network, it is called that the UE is in an RRC connected mode. When the RRC connection is not established yet, it is called that the UE is in an RRC idle mode.

A non-access stratum (NAS) layer belongs to an upper layer of the RRC layer and serves to perform session management, mobility management, or the like.

Figure 4:
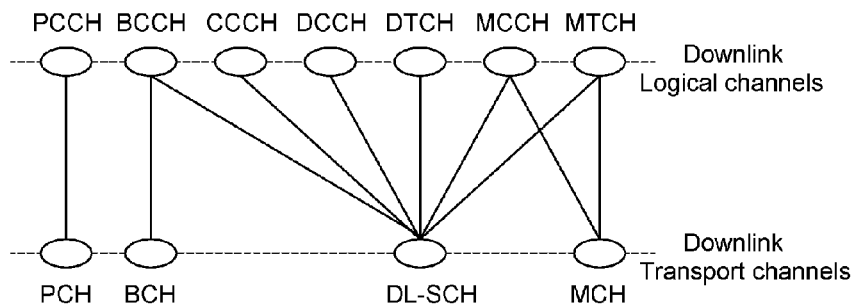
FIG. 4 shows mapping between a downlink logical channel and a downlink transport channel.

FIG. 4 shows mapping between a downlink logical channel and a downlink transport channel. The section 6.1.3.2 of 3GPP TS 36.300 V8.3.0 (2007-12) Technical Specification Group Radio Access Network; Evolved Universal Terrestrial Radio Access (E-UTRA) and Evolved Universal Terrestrial Radio Access Network (E-UTRAN); Overall description; Stage 2 (Release 8) may be incorporated herein by reference.

Referring to FIG. 4, a paging control channel (PCCH) is mapped to a paging channel (PCH). A broadcast control channel (BCCH) is mapped to a broadcast channel (BCH) or a downlink shared channel (DL-SCH). A common control channel (CCCH), a dedicated control channel (DCCH), a dedicated traffic channel (DTCH), a multicast control channel (MCCH), and a multicast traffic channel (MTCH) are mapped to the DL-SCH. The MCCH and MTCH are also mapped to a multicast channel (MCH).

A type of each logical channel is defined according to a type of information to be transmitted. The logical channel is classified into a control channel and a traffic channel.

The control channel is used to transmit control plane information. The BCCH is a downlink channel for broadcasting system control information. The PCCH is a downlink channel for transmitting paging information and is used when a network does not know a location of a UE. The CCCH is a channel for transmitting control information between the UE and the network and is used when there is no RRC connection established between the UE and the network. The MCCH is a point-to-multipoint downlink channel used for transmitting multimedia broadcast multicast service (MBMS) control information. The MCCH is used by UEs that receive an MBMS. The DCCH is a point-to-point bi-directional channel for transmitting dedicated control information between the UE and the network, and is used by UEs having an RRC connection.

The traffic channel is used to transmit user plane information. The DTCH is a point-to-point channel for transmitting user information and exists in both uplink and downlink. The MTCH is a point-to-multipoint downlink channel for transmitting traffic data and is used by UEs that receive an MBMS.

The transport channels are classified by how and with what characteristics data are transferred over the radio interface. The BCH is broadcast in the entire coverage area of the cell and has a fixed, pre-defined transport format. The DL-SCH is characterized by support for hybrid automatic repeat request (HARQ), support for dynamic link adaptation by varying modulation, coding, and transmit (Tx) power, possibility to be broadcast in the entire cell, and possibility to use beamforming, support for both dynamic and semi-static resource assignment, support for UE discontinuous reception (DRX) to enable UE power saving, and support for MBMS transmission. The PCH is characterized by support for DRX to enable UE power saving and requirement to be broadcast in the entire coverage area of the cell. The MCH is characterized by support for requirement to be broadcast in the entire coverage area of the cell and support for an MBMS single frequency network (MBSFN).

Figure 5:
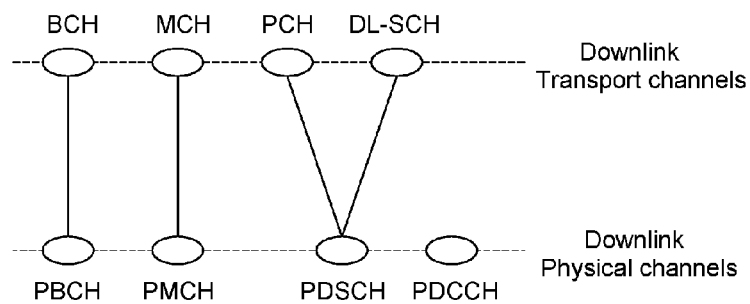
FIG. 5 shows mapping between a downlink transport channel and a downlink physical channel.

FIG. 5 shows mapping between a downlink transport channel and a downlink physical channel. The section 5.3.1 of 3GPP TS 36.300 V8.3.0 (2007-12) may be incorporated herein by reference.

Referring to FIG. 5, a BCH is mapped to a physical broadcast channel (PBCH). An MCH is mapped to a physical multicast channel (PMCH). A PCH and a DL-SCH are mapped to a physical downlink shared channel (PDSCH). The PBCH carries a BCH transport block. The PMCH carries the MCH. The PDSCH carries the DL-SCH and the PCH.

Several downlink physical control channels are used in a PHY layer. A physical downlink control channel (PDCCH) informs a UE of resource assignment of the PCH and DL-SCH, and also informs the UE of HARQ information related to the DL-SCH. The PDCCH may carry an uplink scheduling grant which informs the UE of resource assignment for uplink transmission. A physical control format indicator channel (PCFICH) informs the UE of the number of orthogonal frequency division multiplexing (OFDM) symbols used for transmission of the PDCCHs within a subframe. The PCFICH is transmitted in every subframe. A physical hybrid ARQ indicator channel (PHICH) carries HARQ acknowledgement (ACK)/negative-acknowledgement (NACK) in response to uplink transmission.

Figure 6:
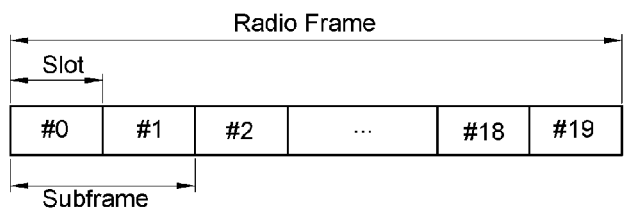
FIG. 6 shows a structure of a radio frame.

FIG. 6 shows a structure of a radio frame.

Referring to FIG. 6, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Figure 7:
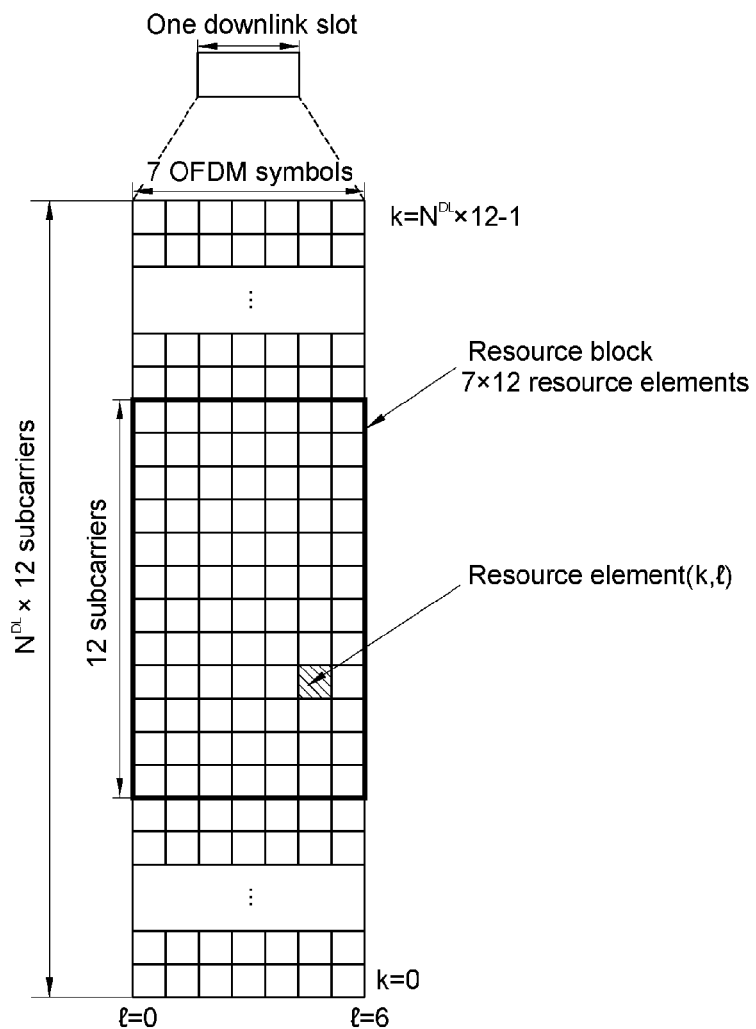
FIG. 7 shows an example of a resource grid for one downlink slot.

FIG. 7 shows an example of a resource grid for one downlink slot.

Referring to FIG. 7, the downlink slot includes a plurality of OFDM symbols in a time domain and $N^{DL}$ resource blocks (RBs) in a frequency domain. The OFDM symbol is for representing one symbol period. The OFDM symbol may also be referred to as an orthogonal frequency division multiple access (OFDMA) symbol, single carrier-frequency division multiple access (SC-FDMA) symbol, etc. in accordance with multiple access scheme. The number $N^{DL}$ of resource blocks included in the downlink slot depends on a downlink transmission bandwidth configured in a cell. For example, in a 3GPP LTE system, $N^{DL}$ may be any one value in the range of 60 to 110. One RB includes a plurality of subcarriers in the frequency domain.

Each element on the resource grid is referred to as a resource element. The resource element on the resource grid can be identified by an index pair (k, l) within the slot. Herein, $k(k=0, \ldots, N^{DL} \times 12-1)$ denotes a subcarrier index in the frequency domain, and $l(l=0, \ldots, 6)$ denotes an OFDM symbol index in the time domain.

Although it is described herein that one RB includes 7×12 resource elements consisting of 7 OFDM symbols in the time domain and 12 subcarriers in the frequency domain for example, the number of OFDM symbols and the number of subcarriers in the RB are not limited thereto. Thus, the number of OFDM symbols and the number of subcarriers may change variously depending on a cyclic prefix (CP) length, a frequency spacing, etc. For example, when using a normal CP, the number of OFDM symbols is 7, and when using an extended CP, the number of OFDM symbols is 6. In one OFDM symbol, the number of subcarriers may be selected from 128, 256, 512, 1024, 1536, and 2048. The structure of an uplink slot may be same as that of the downlink slot.

Figure 8:
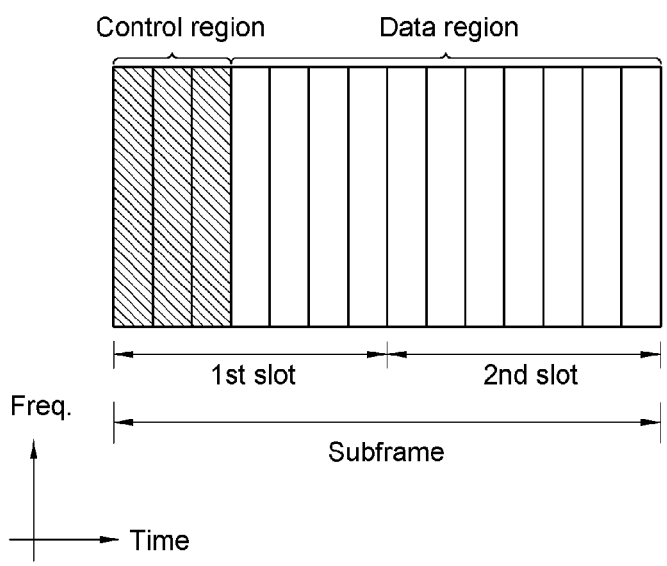
FIG. 8 shows a structure of a subframe.

FIG. 8 shows a structure of a subframe.

Referring to FIG. 8, the subframe includes two consecutive slots. A maximum of three OFDM symbols located in a front portion of a 1st slot within the subframe correspond to a control region. The remaining OFDM symbols correspond to a data region. Control channels such as a PCFICH, a PHICH, a PDCCH etc., can be assigned to the control region. A PDSCH can be assigned to the data region. A UE can read data information transmitted through the PDSCH by decoding control information transmitted through the PDCCH. Although the control region includes three OFDM symbols herein, this is for exemplary purposes only. The number of OFDM symbols included in the control region of the subframe can be known by using the PCFICH.

Figure 9:
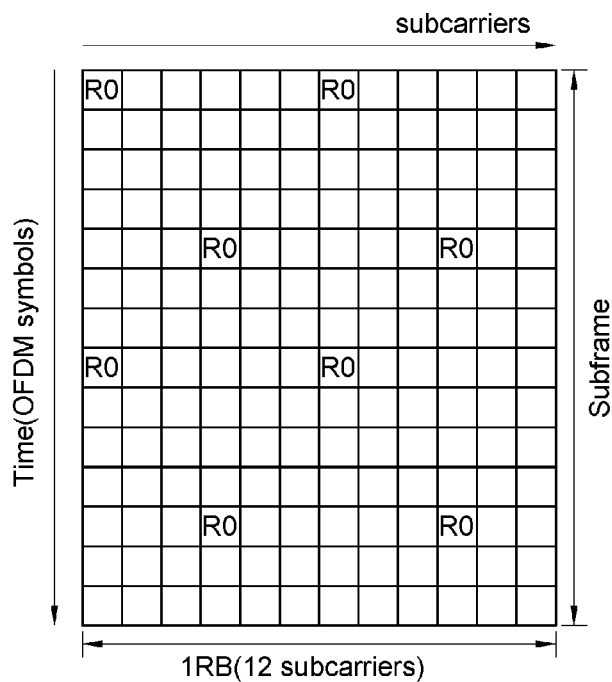
FIG. 9 shows an example of a reference signal structure when a base station uses one antenna.
Figure 10:
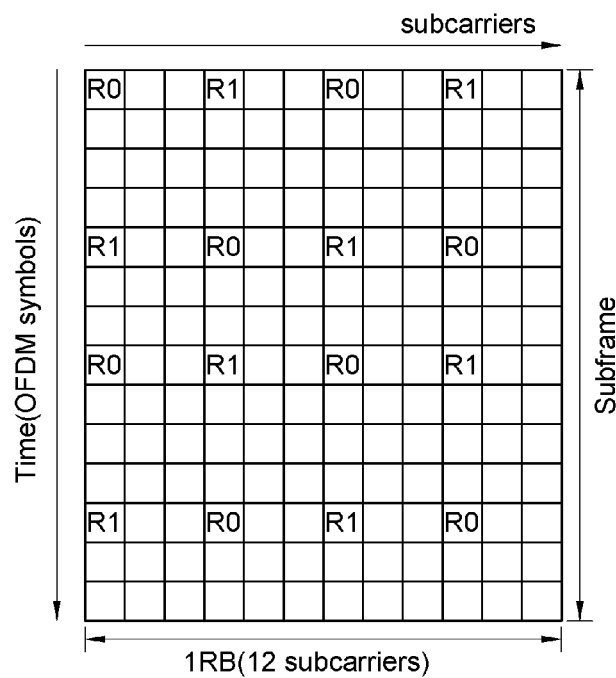
FIG. 10 shows an example of a reference signal structure when a base station uses two antennas.
Figure 11:
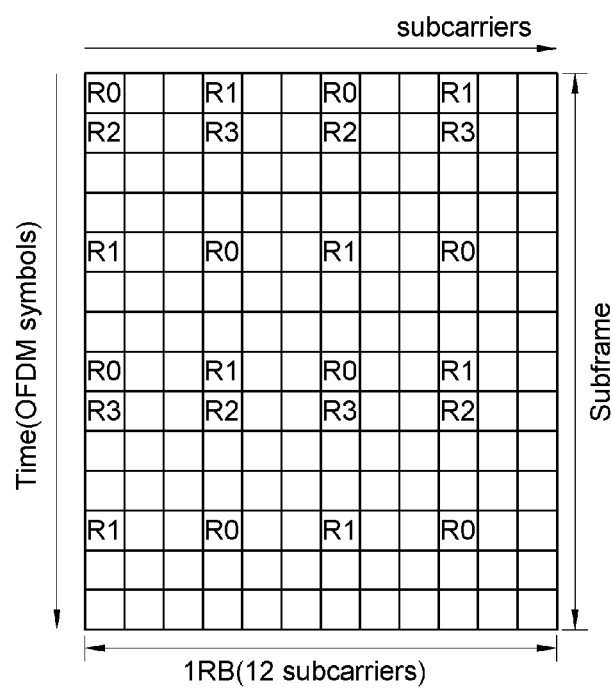
FIG. 11 shows an example of a reference signal structure when a base station uses four antennas.

FIG. 9 shows an example of a reference signal (RS) structure when a BS uses one antenna. FIG. 10 shows an example of an RS structure when a BS uses two antennas. FIG. 11 shows an example of an RS structure when a BS uses four antennas. The section 6.10.1 of the 3GPP TS 36.211 V8.2.0 (2008-03) Technical Specification Group Radio Access Network; Evolved Universal Terrestrial Radio Access (E-UTRA); Physical Channels and Modulation (Release 8) may be incorporated herein by reference.

Referring to FIG. 9 to FIG. 11, Rp denotes a resource element used to transmit a reference signal through an antenna p (where, p∈{0, 1, 2, 3}). R0 to R3 do not overlap with one another. In one OFDM symbol, each Rp is located with a spacing of 6 subcarriers. The number of R0s in a subframe is equal to the number of R1s in the subframe. The number of R2s in a subframe is equal to the number of R3s in the subframe. The number of R2s or R3s in a subframe is less than the number of R0s or R1s in the subframe.

Hereinafter, a resource element used to transmit a reference signal is referred to as a reference symbol. Resource elements other than the reference symbol can be used for data transmission. A resource element used for data transmission is referred to as a data symbol. One reference signal is transmitted for each antenna. A reference signal for each antenna is transmitted through reference symbols.

In multi-antenna transmission, a BS uses a plurality of antennas, there is one resource grid defined per antenna. In FIG. 10 and FIG. 11, reference symbols for all antennas are shown on the same resource grid for convenience of explanation. Rp is not used for any transmission on any other antennas except for the antenna p. This is to avoid interference between antennas.

When a serving cell and a neighbor cell use the same-structured reference signal, collision may occur between the cells. To avoid the collision, a reference signal can be protected by shifting reference symbols in a frequency domain on a subcarrier basis, or by shifting the reference symbols in a time domain on an OFDM symbol basis.

Figure 12:
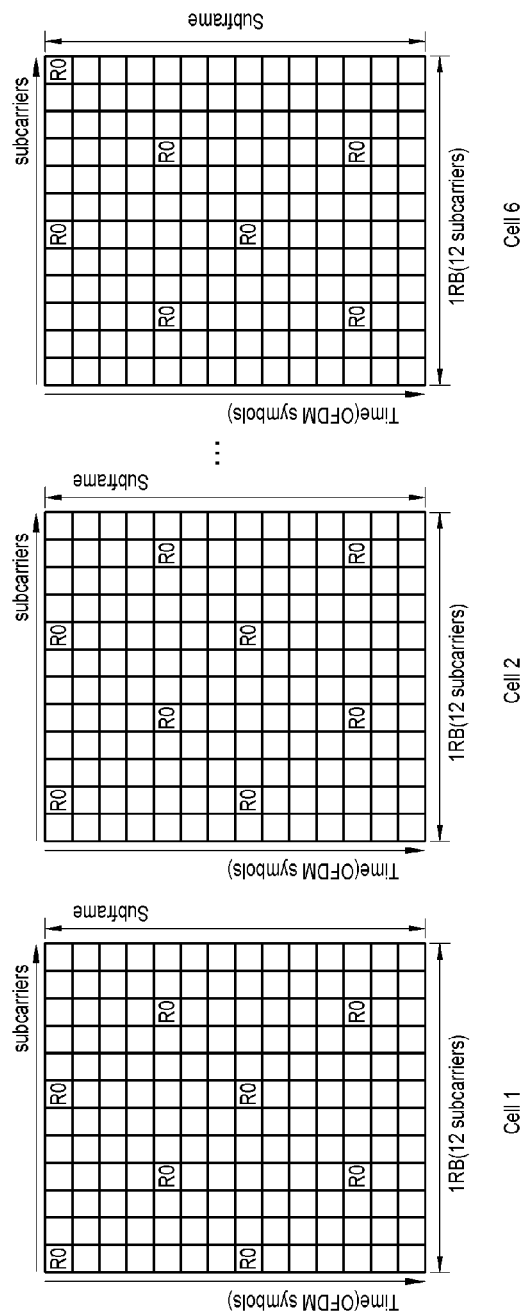
FIG. 12 shows an example of a reference signal structure in which shifting is performed in a frequency domain when a base station uses one antenna.

FIG. 12 shows an example of an RS structure in which shifting is performed in a frequency domain when a BS uses one antenna.

Referring to FIG. 12, a 1st cell uses reference symbols located with a spacing of 6 subcarriers in one OFDM symbol. Thus, by shifting the reference symbols on a subcarrier basis in the frequency domain, at least 5 neighbor cells (2nd to 6th cells) can use reference symbols respectively located in different resource elements. Accordingly, collision of reference signals is inevitable among the 1st to 6th cells. For example, if $v_{shift}$ denotes a variable indicating the number of subcarriers for shifting reference symbols in the frequency domain, $v_{shift}$ can be expressed by the following equation.

MathFigure 3

$$v_{shift} = n_{cell\_ID} \bmod 6 \qquad [\text{Math.3}]$$

Herein, $N_{cell\_ID}$ denotes a cell identifier (ID).

A reference signal may be multiplied by a predetermined reference signal sequence when transmitted. For example, the reference signal sequence may be generated based on a pseudo-random (PN) sequence, an m-sequence, etc. The reference signal sequence may be generated based on a binary sequence or a complex sequence. When the BS transmits the reference signal multiplied by the reference signal sequence, interference of a reference signal received from a neighbor cell can be reduced and thus channel estimation performance can be improved in a UE. The reference signal sequence may be used on an OFDM symbol basis in one subframe. The reference signal sequence may vary according to a cell ID, a slot number in one radio frame, an OFDM symbol index in a slot, a CP length, etc.

Referring to FIG. 9 to FIG. 11, in an OFDM symbol including reference symbols, the number of reference symbols for each antenna is 2. Since a subframe includes NDL resource blocks in the frequency domain, the number of reference symbols for each antenna is $2 \times N^{DL}$ in one OFDM symbol. Thus, a reference signal sequence has a length of $2 \times N^{DL}$.

When r(m) denotes a reference signal sequence, the following equation shows an example of a complex sequence used as r(m).

MathFIG. 4

$$r(m) = \frac{1}{\sqrt{2}}(1 - 2 \cdot c(2m)) + j\frac{1}{\sqrt{2}}(1 - 2 \cdot c(2m+1)) \qquad [\text{Math. 4}]$$

Herein, m is 0, 1, . . . , $2N^{max,DL}-1$. $N^{max,DL}$ denotes the number of resource blocks corresponding to a maximum bandwidth. For example, in the 3GPP LTE system, $N^{max,DL}$ is 110. c(i) is a PN sequence and can be defined by a Gold sequence having a length of 31. The following equation shows an example of a sequence c(i) having a length of $2 \times N^{max,DL}$.

MathFigure 5

$$c(n) = (x_1(n+N_c) + x_2(n+N_c)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \qquad [\text{Math.5}]$$

Herein, $N_C$ is 1600, $x_1(i)$ denotes a 1st m-sequence, and $x_2(i)$ denotes a 2nd m-sequence. For example, the 1st m-sequence can be initialized with $x_1(0)=1$, $x_1(n)=0$ (n=1, 2, . . . , 30) at the start of each OFDM symbol. The 2nd m-sequence can be initialized according to a cell ID, a slot number in one radio frame, an OFDM symbol index in a slot, a CP length, etc. at the start of each OFDM symbol.

When a system has a bandwidth smaller than $N^{max,DL}$, a certain portion of a reference signal sequence generated to have a length of $2 \times N^{max,DL}$ can be selected to be used.

The RS structure described up to now cannot be simply extended. Therefore, when the BS transmits downlink information through 5 or more antennas, the UE cannot properly perform channel estimation. In this case, the UE cannot recover the downlink information and cannot properly deliver feedback on channel quality to the BS. When the BS fails to receive the feedback on the channel quality properly, it is difficult to transmit the downlink information efficiently in accordance with channel quality. Accordingly, when the BS transmits the downlink information through 5 or more antennas, there is a need to provide a method for effectively transmitting a reference signal.

Now, a method for effectively transmitting a reference signal in a multiple antenna system will be described. For convenience of explanation, it is assumed that a BS uses 8 antennas. In the drawings described below, 168 resource elements constitute one subframe in a time domain and one resource block in a frequency domain. Rp denotes a reference symbol of an antenna p. p is any one value selected from 0, 1, 2, . . . , 7. The value p is shown in the drawing for exemplary purposes only, and thus the value p may change. For example, R4 and R6 may be changed to each other, and R5 and R7 may be changed to each other. A positional change between reference symbols for each antenna does not have an effect on channel estimation performance. In addition, a reference symbol in a subframe may be shifted in the frequency domain and/or the time domain. The reference symbol in the subframe may be shifted by m subcarriers (where m is a natural number). The reference symbol in the subframe may be shifted by n OFDM symbols (where n is a natural number). Shifting of the reference symbol in a subcarrier direction or an OFDM symbol direction does not have an effect on channel estimation performance for each antenna, power boosting of the reference symbol, etc.

When using the multiple antenna system, data can be recovered only when a reference signal for each antenna is identifiable. To avoid interference between reference signals for respective antennas, frequency division multiplexing (FDM), time division multiplexing (TDM), or code division multiplexing (CDM) can be used. In the FDM, a reference signal for each antenna is transmitted by being divided in the frequency domain. In the TDM, the reference signal for each antenna is transmitted by being divided in the time domain. In the CDM, the reference signal for each antenna is transmitted by using a different sequence.

First, a case where a reference signal is transmitted through multiple antennas by using the FDM and the TDM will be described. In this case, reference symbols for each antenna do not overlap with one another.

A structure of a reference signal transmitted through multiple antennas can be designed by considering channel estimation performance, a reference symbol overhead, even power transmission for each antenna, power boosting of a reference symbol, a control region, etc. Hereinafter, the reference symbol overhead is defined as a value obtained by dividing the number of resource elements used as a reference symbol in a subframe by total number of all resource elements in the subframe.

(1) RS Structure Considering Channel Estimation Performance

Wireless commutation reliability can be increased when channel estimation performance is good. The channel estimation performance depends on the number of reference symbols for each antenna which are included in one resource block. In addition, a spacing between reference symbols of each antenna in a frequency domain or a spacing between reference symbols of each antenna in a time domain also have an effect on the channel estimation performance. To increase the channel estimation performance, reference symbols of each antenna are preferably spaced apart from one another by a specific spacing in the time domain and/or the frequency domain. In this case, the reference symbols have to be allocated in the time domain by considering a coherent time and in the frequency domain by considering a coherent bandwidth. The coherent time is inversely proportional to a Doppler spread. The coherent time can be used to determine whether a channel is a time selective channel or a time flat channel. The coherent bandwidth is inversely proportional to a delay spread. The coherent bandwidth can be used to determine whether a channel is a frequency selective channel or a frequency flat channel. For example, if the channel is the frequency selective channel, the channel estimation performance can be improved when many reference symbols of each antenna are used in the frequency domain. If the channel is the time selective channel, the channel estimation performance can be improved when many reference symbols of each antenna are used in the time domain.

Figure 13:
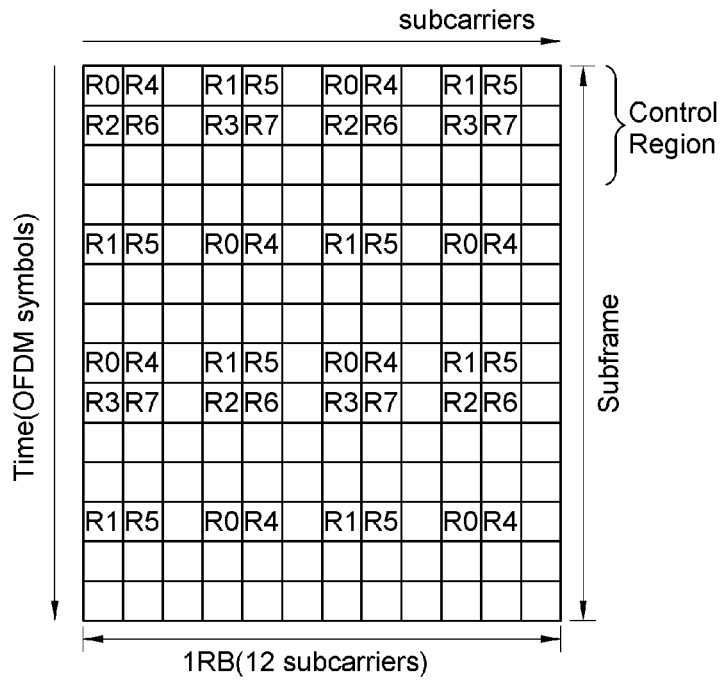
FIG. 13 shows a first example of a reference signal structure considering channel estimation performance.

FIG. 13 shows a first example of an RS structure considering channel estimation performance.

Referring to FIG. 13, 48 resource elements out of 168 resource elements are used as reference symbols. The remaining 120 resource elements can be used as data symbols. A reference symbol overhead is 29%. Antennas 0, 1, 4, and 5 each has the same number of reference symbols. Antennas 2, 3, 6, and 7 each has the same number of reference symbols. The number of reference symbols for each of the antennas 0, 1, 4, and 5 is double of the number of reference symbols for each of the antennas 2, 3, 6, and 7. In one OFDM symbol, reference symbols for each antenna are located with a spacing of 6 subcarriers. The antennas 4 and 5 each has channel estimation performance similar to channel estimation performance for each of the antennas 0 and 1. The antennas 6 and 7 each has channel estimation performance similar to channel estimation performance for each of the antennas 2 and 3. Channel estimation performance of the antennas 0, 1, 4, and 5 each is robust in a frequency selective channel or a time selective channel. Reference symbols of the antennas 4 and 5 (or the antennas 6 and 7) are allocated only to OFDM symbols including reference symbols of the antennas 0 and 1 (or the antennas 2 and 3). Therefore, Tx power of an OFDM symbol including only a data symbol can be maintained to be the same as a case of using only four antennas (see FIG. 11). An OFDM symbol including reference symbols has a structure in which only reference symbols for four antennas are evenly distributed. For example, one OFDM symbol includes reference symbols of the antennas 0, 1, 4, and 5, and another OFDM symbol includes reference symbols of the antennas 2, 3, 6, and 7. Therefore, in the OFDM symbol including the reference symbols, Tx power for each antenna can be equalized for every 4 antennas.

Reference symbols of the antennas 4 to 7 may be shifted by m subcarriers, or may be shifted by n OFDM symbols (where m and n are natural numbers). In addition, the reference symbols of the antennas 4 to 7 may be interchanged in their positions.

FIG. 14 to FIG. 48 show examples in which reference symbols of the antennas 4 to 7 of FIG. 13 are shifted in a frequency domain or are interchanged in their positions.

Figure 14:
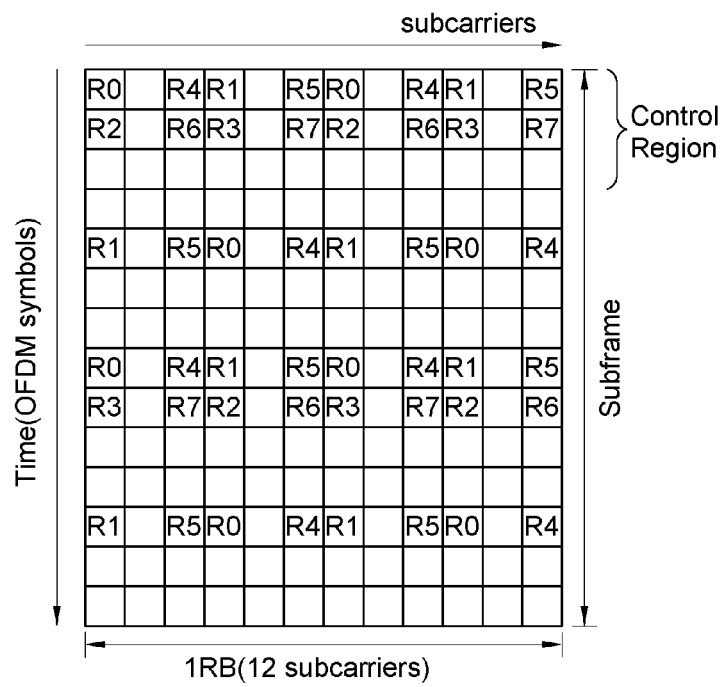
Figure 15:
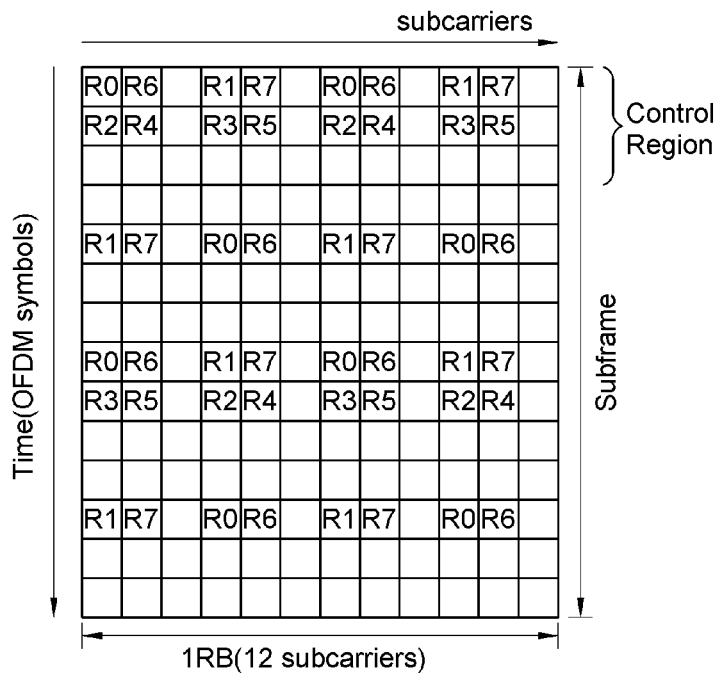
Figure 16:
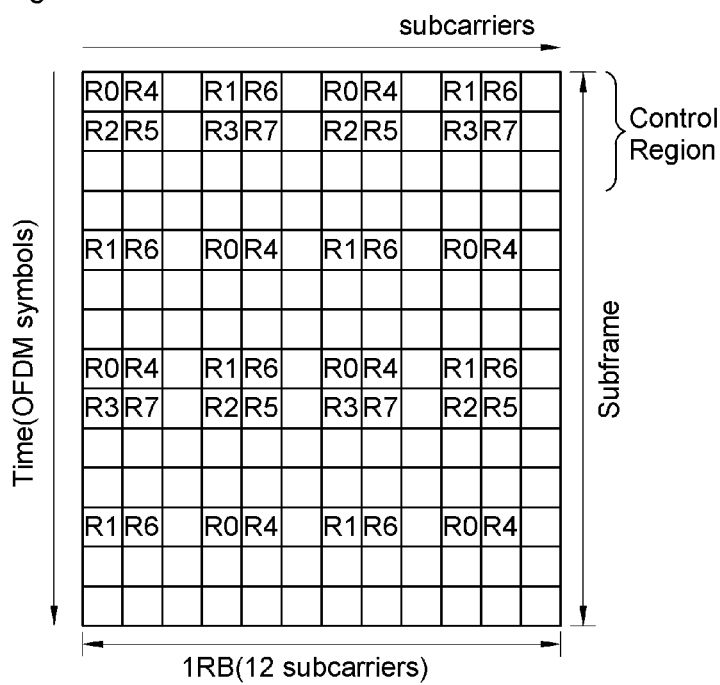
Figure 17:
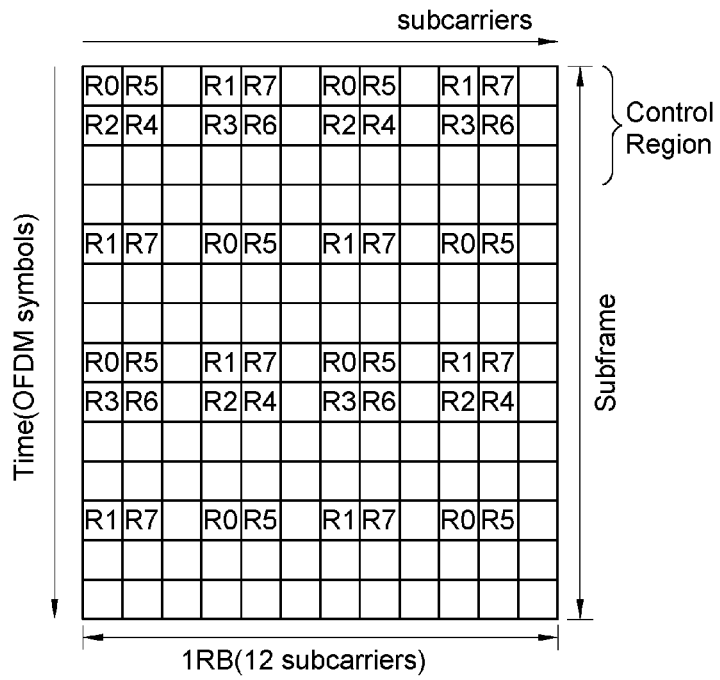
Figure 18:
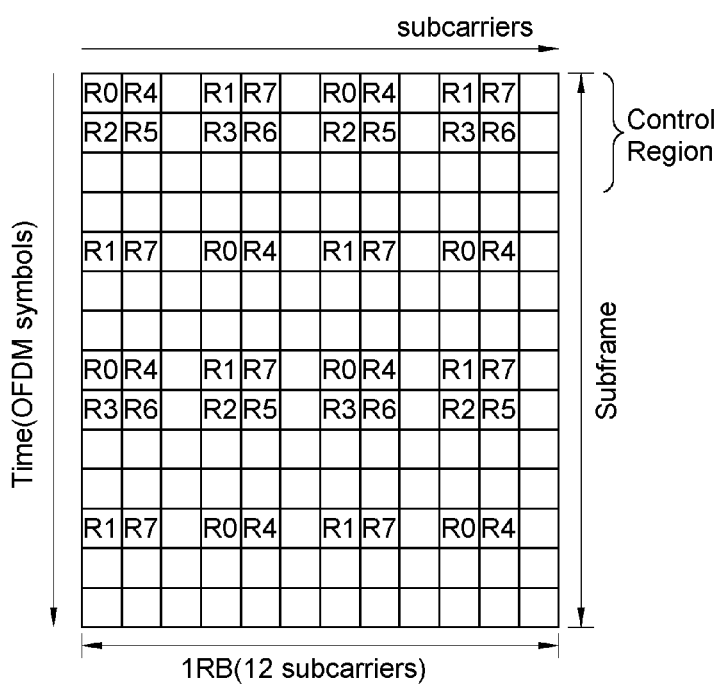
Figure 19:
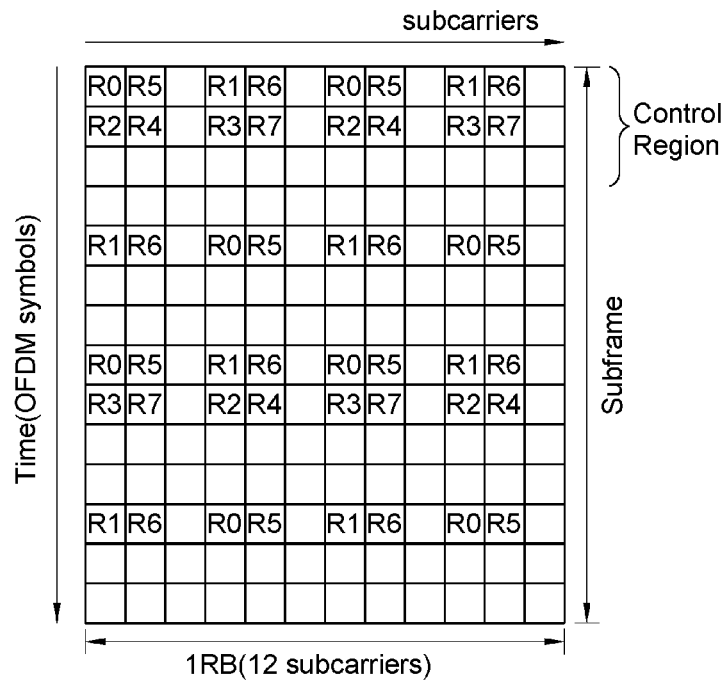
Figure 20:
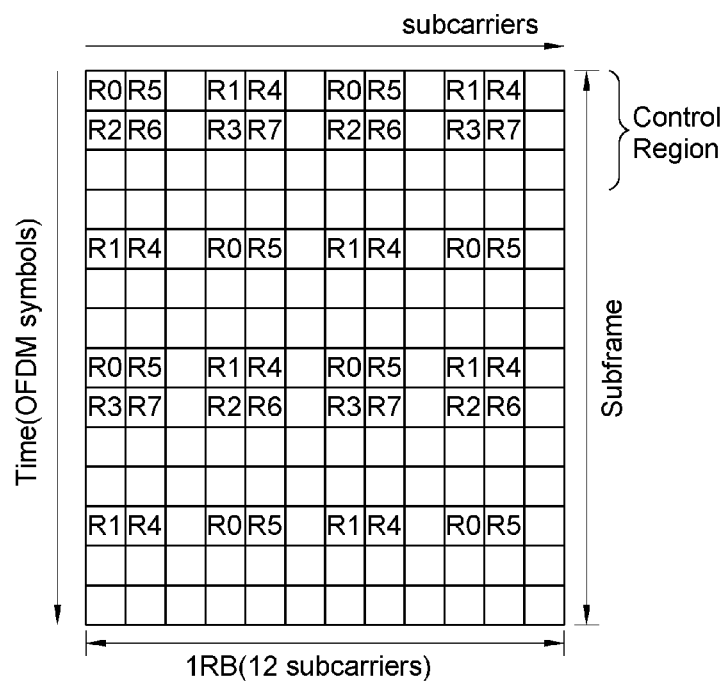
Figure 21:
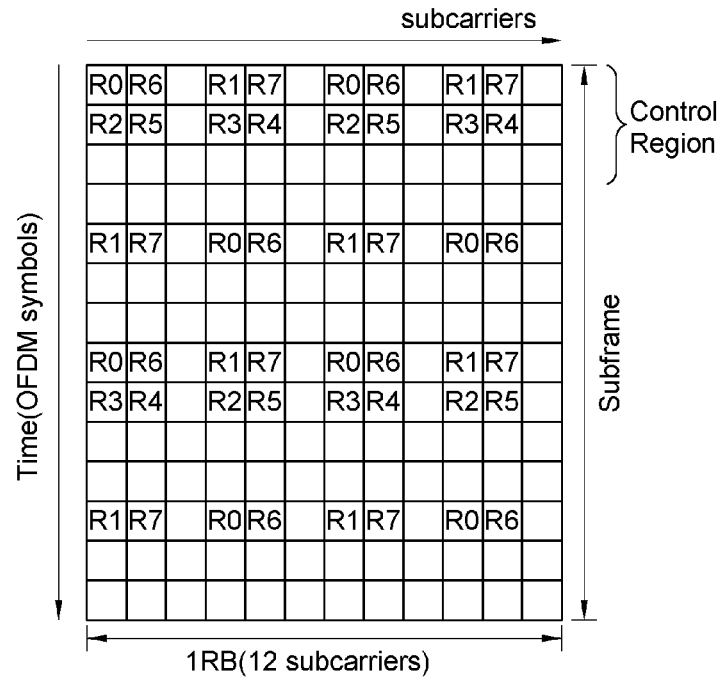
Figure 22:
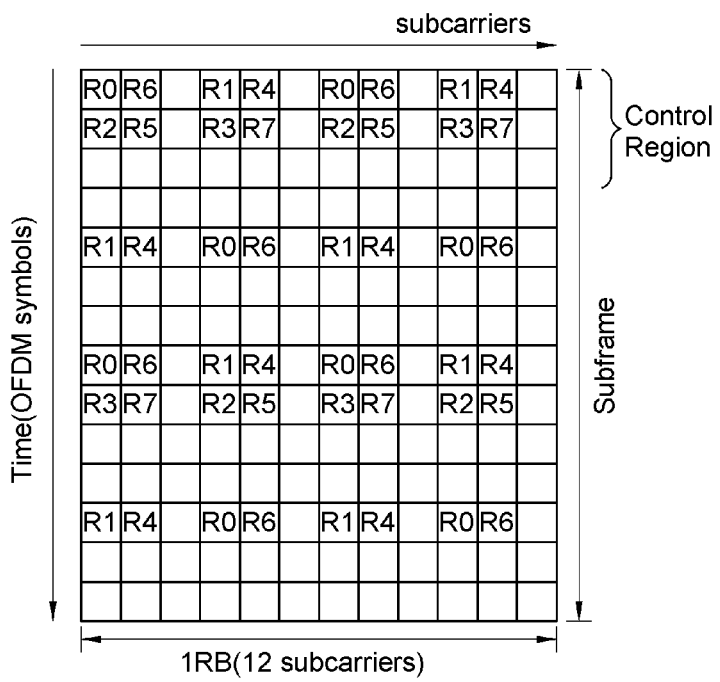
Figure 25:
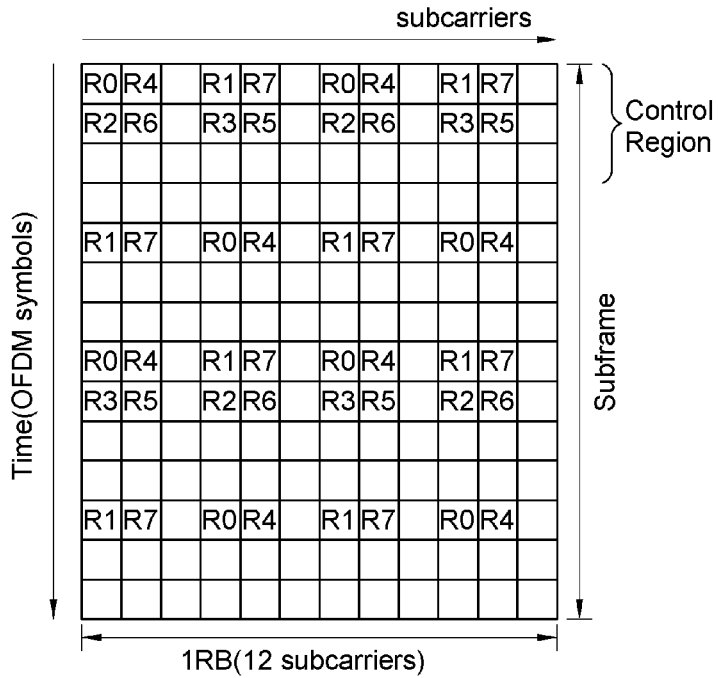
Figure 26:
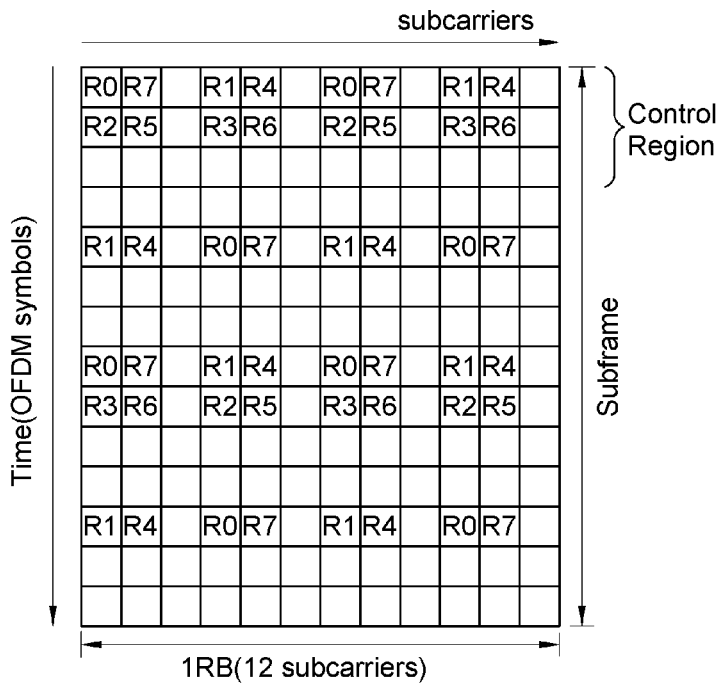
Figure 27:
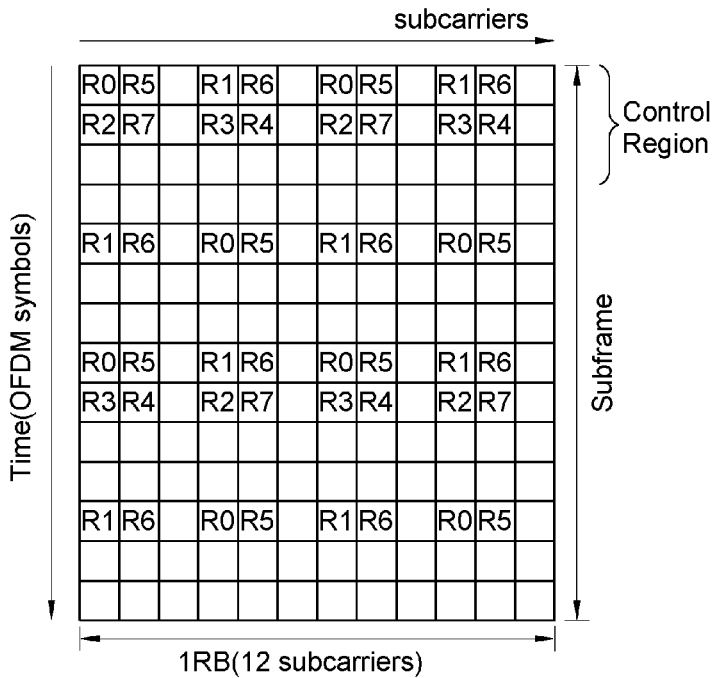
Figure 28:
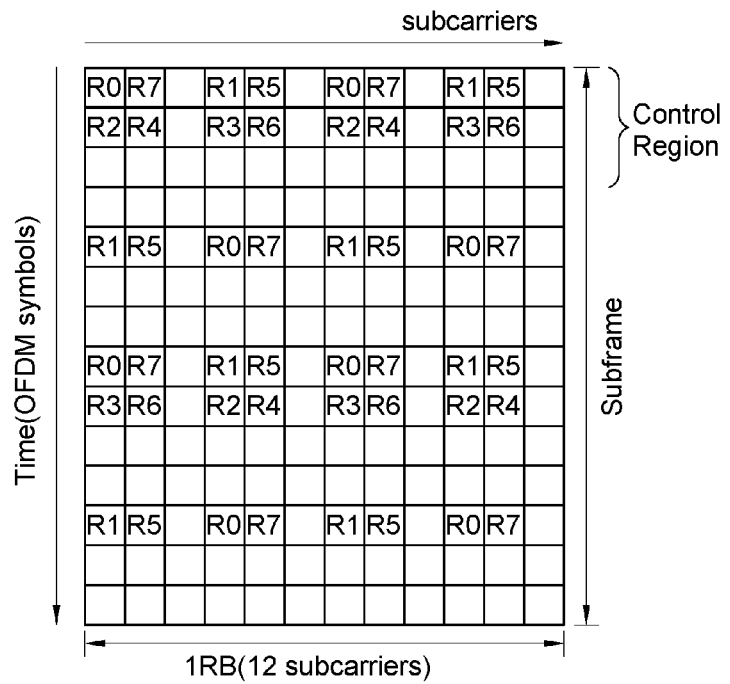
Figure 29:
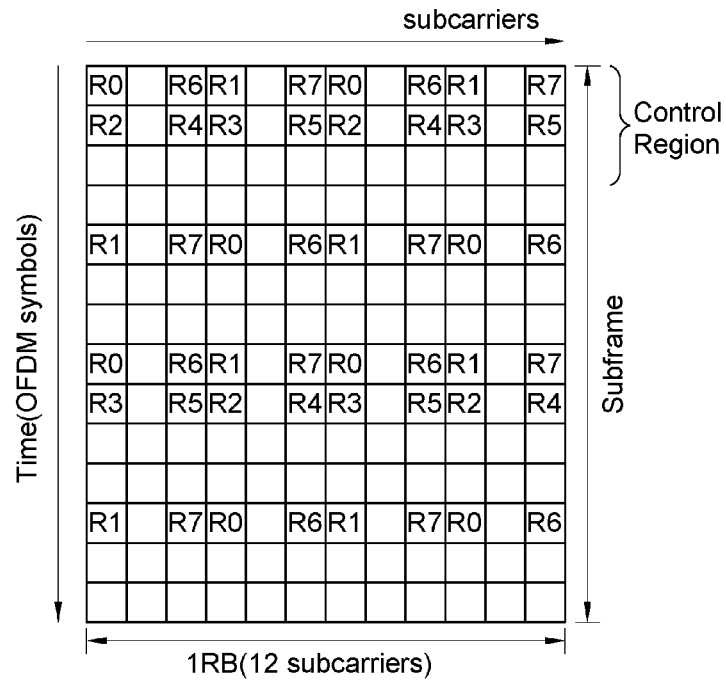
Figure 30:
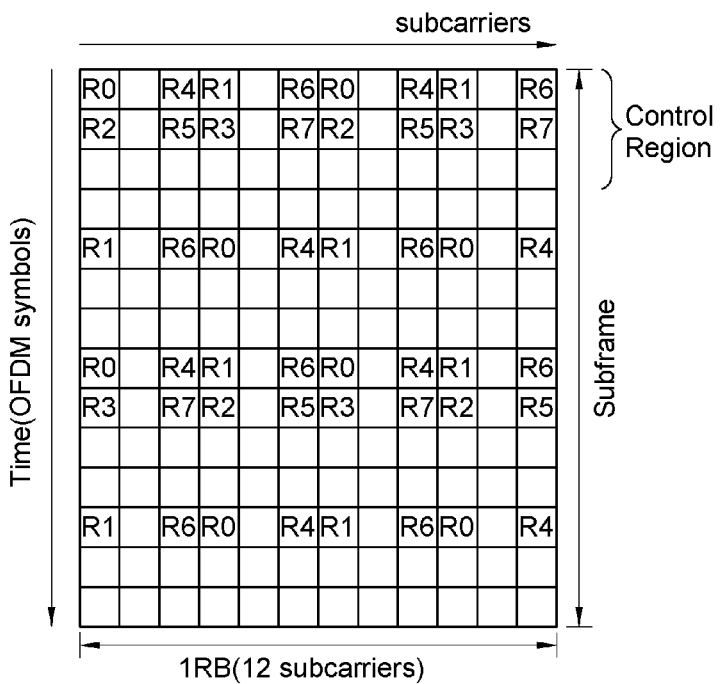
Figure 31:
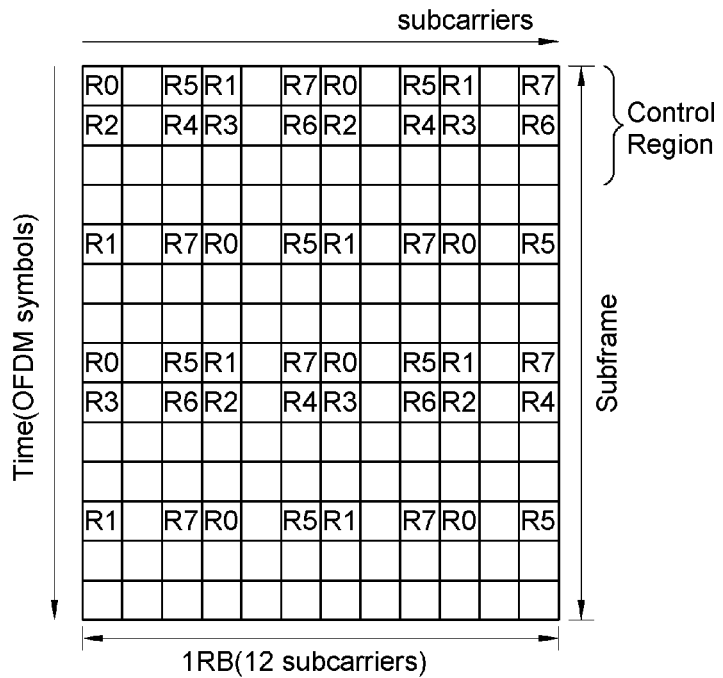
Figure 32:
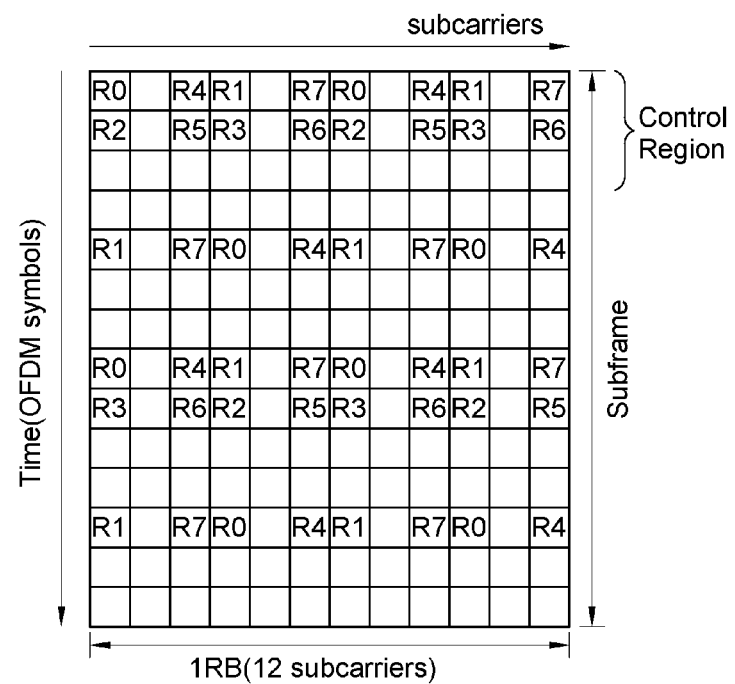
Figure 33:
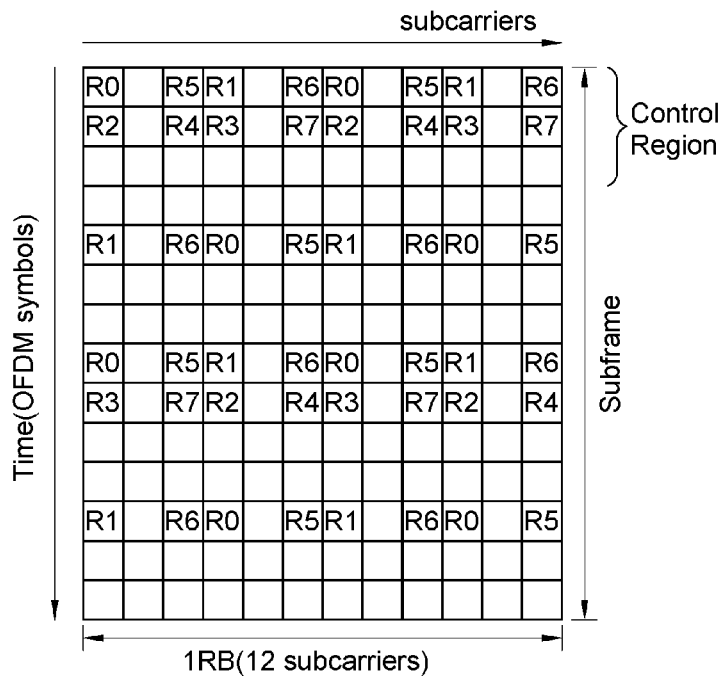
Figure 34:
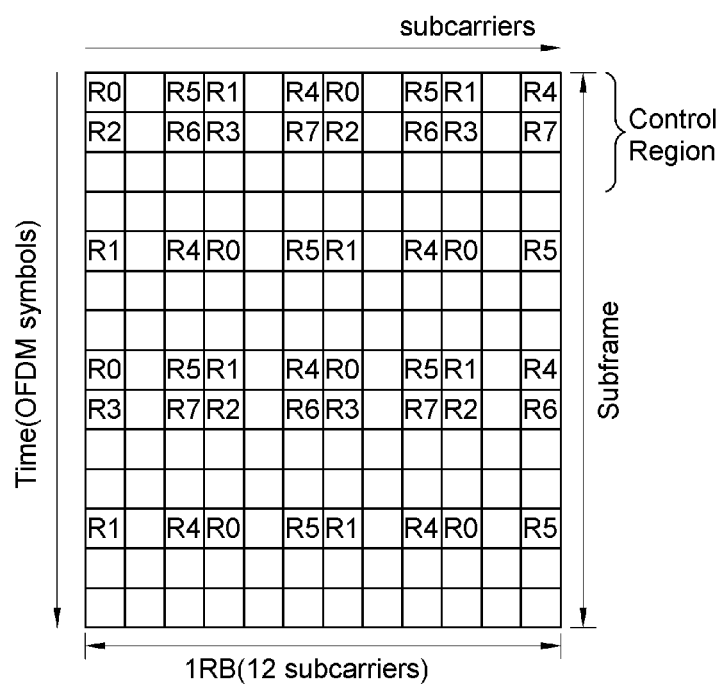
Figure 35:
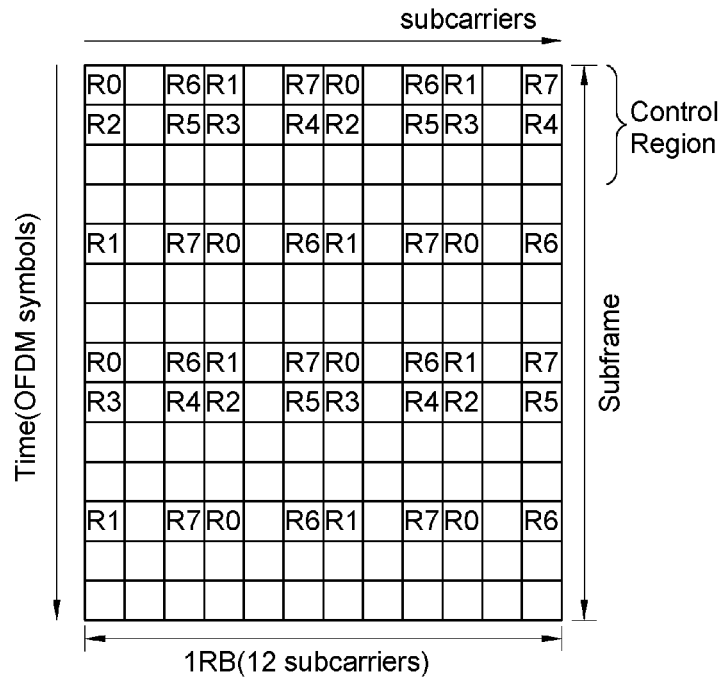
Figure 36:
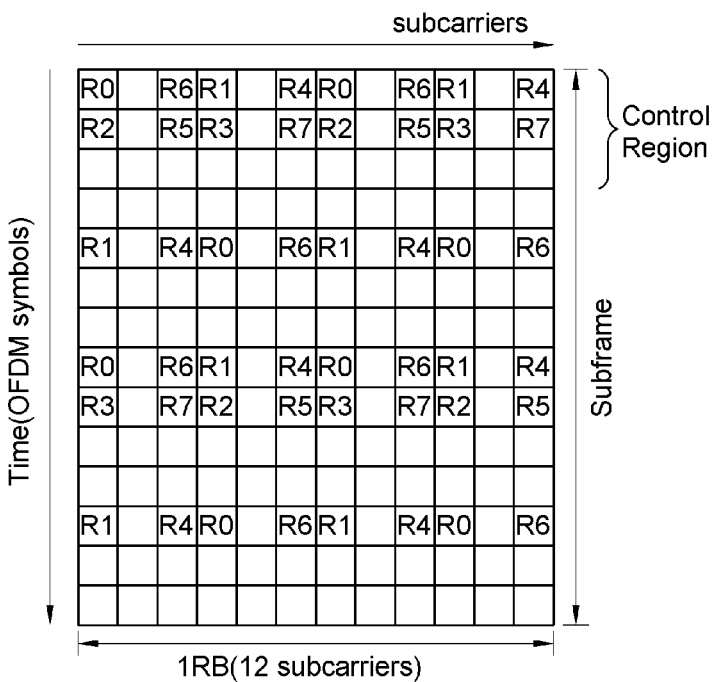
Figure 37:
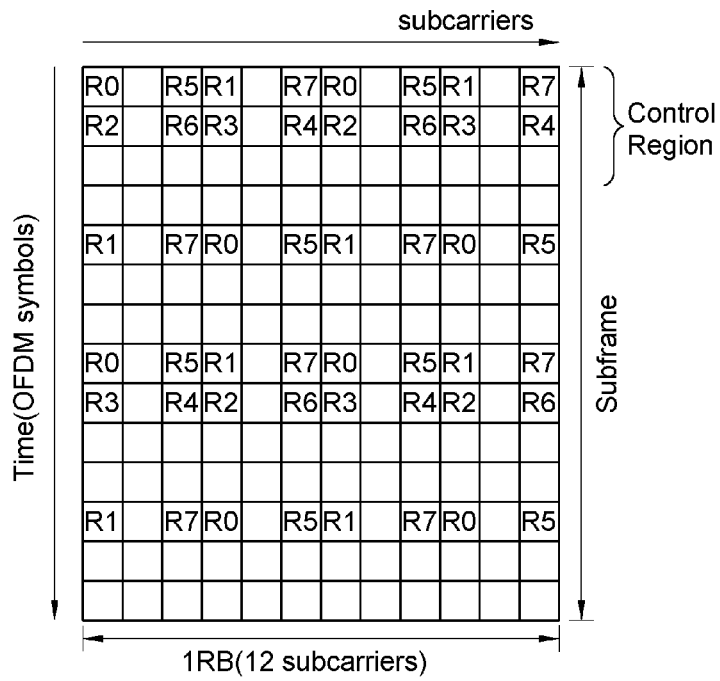
Figure 38:
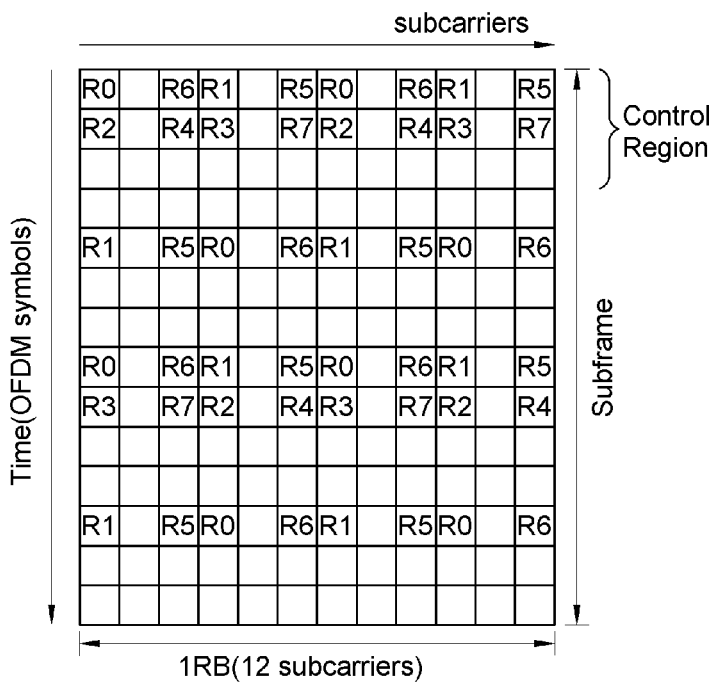
Figure 39:
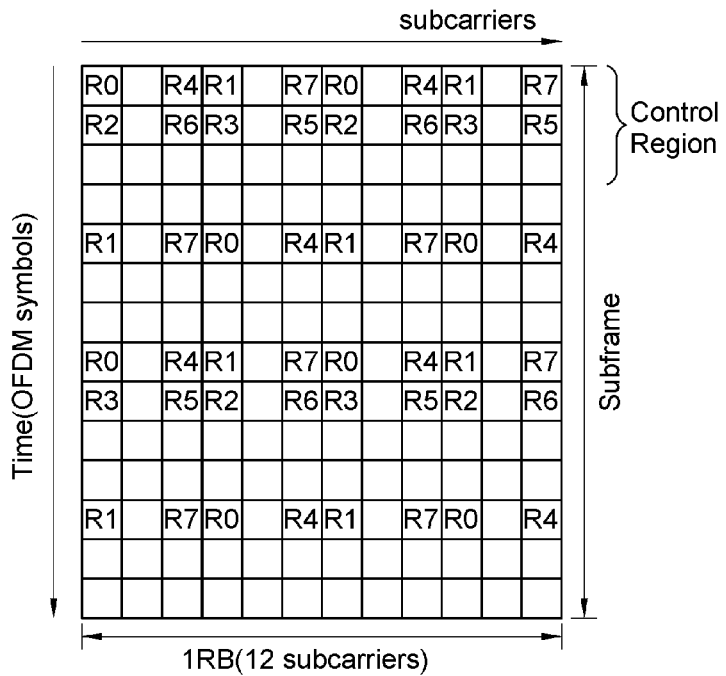
Figure 40:
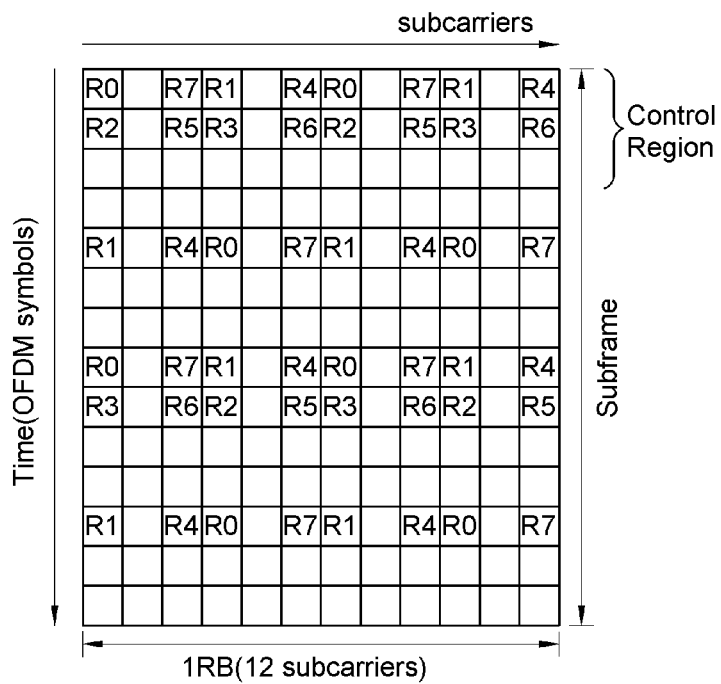
Figure 41:
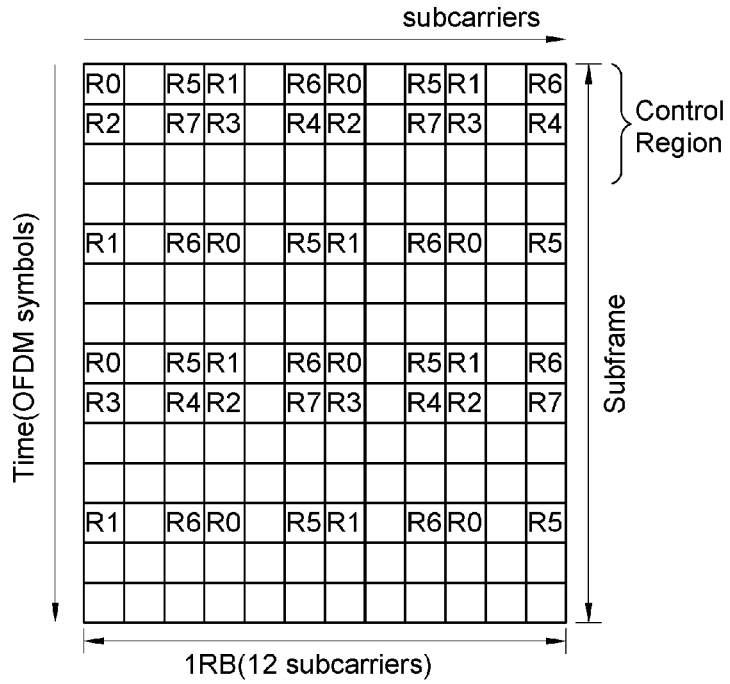
Figure 42:
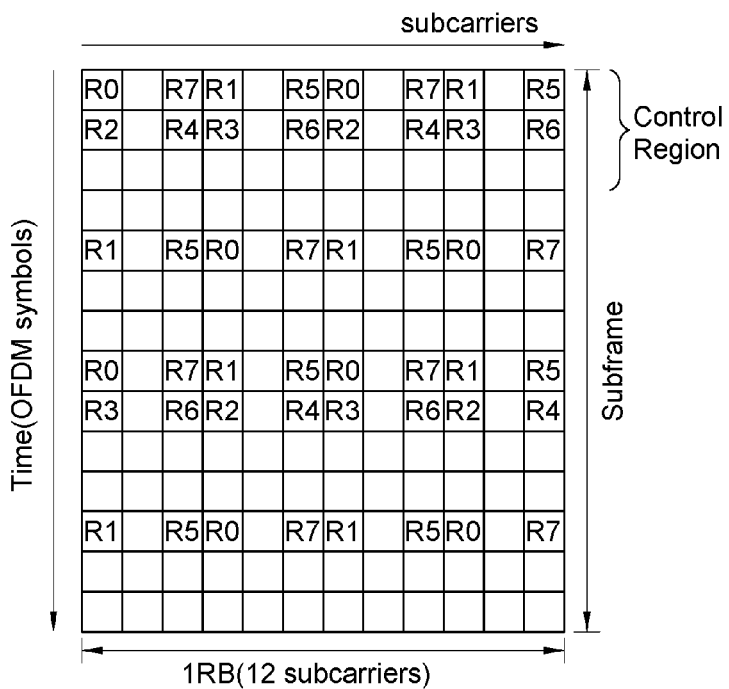
Figure 43:
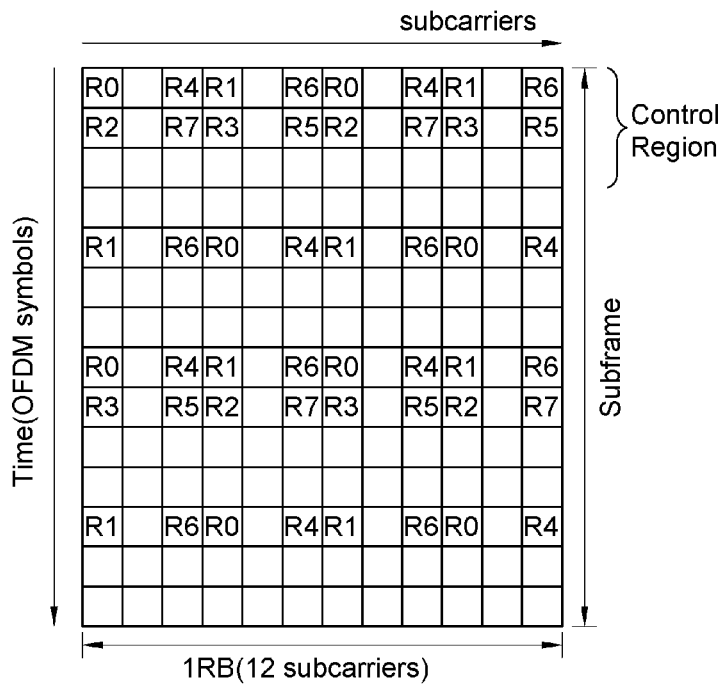
Figure 44:
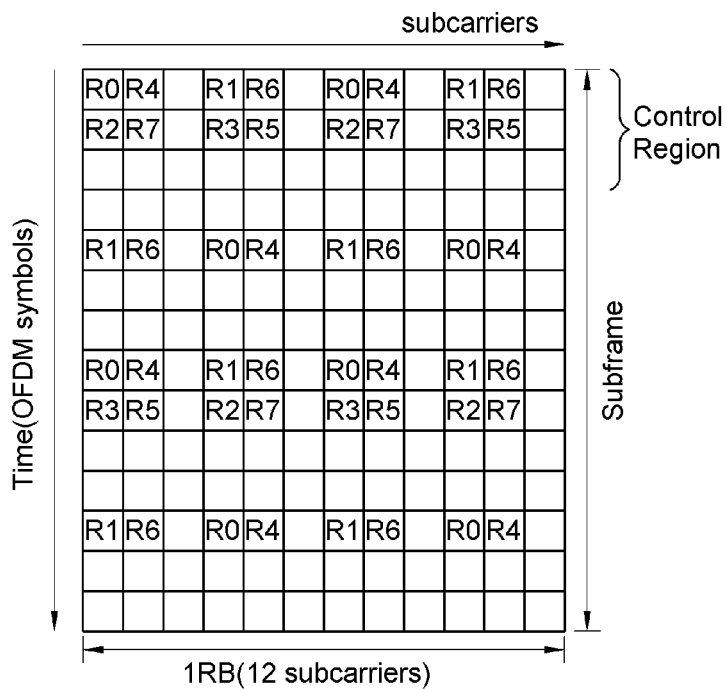
Figure 45:
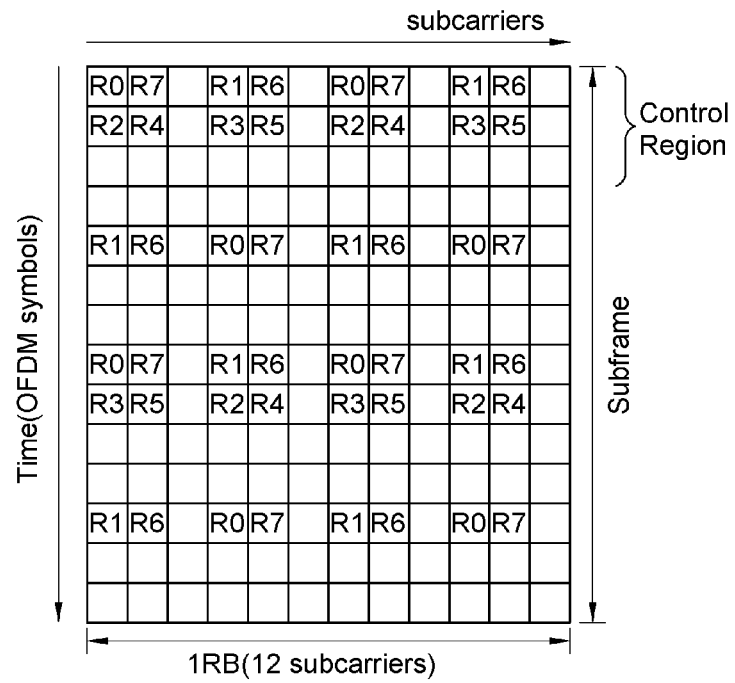
Figure 46:
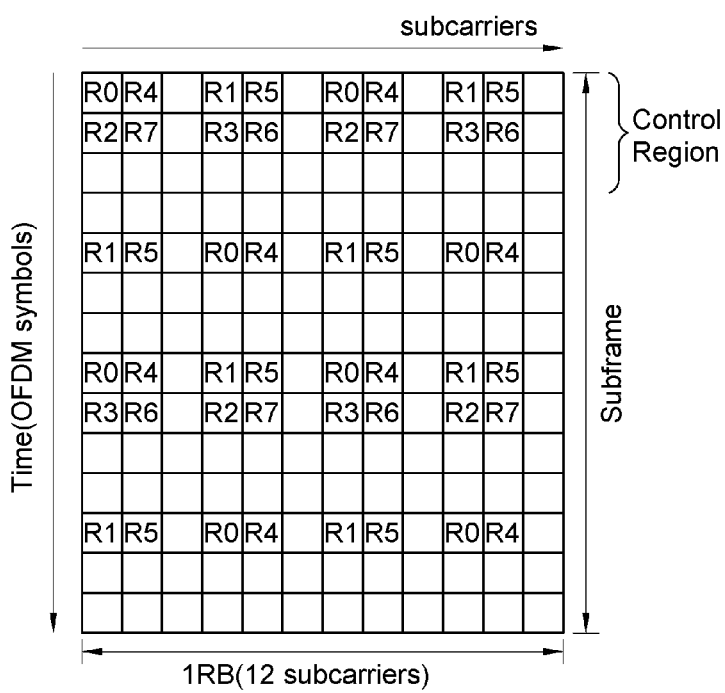
Figure 47:
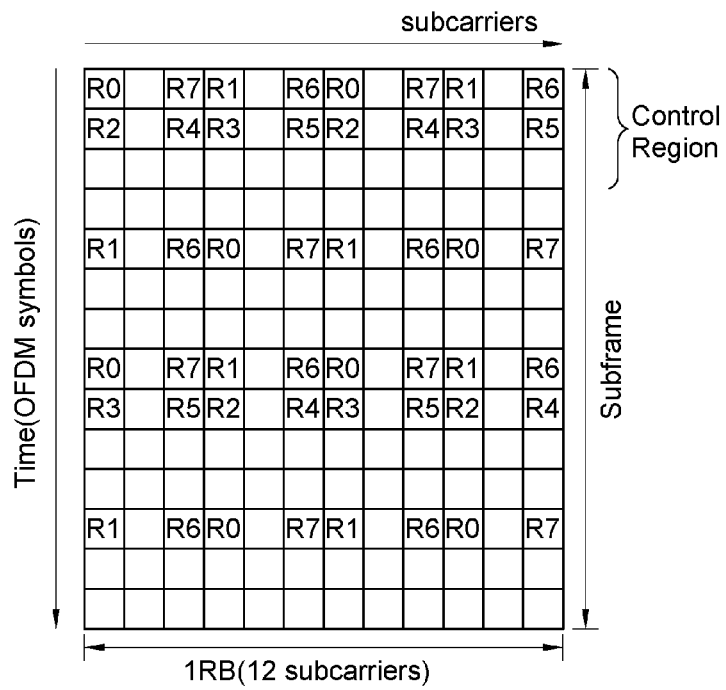
Figure 48:
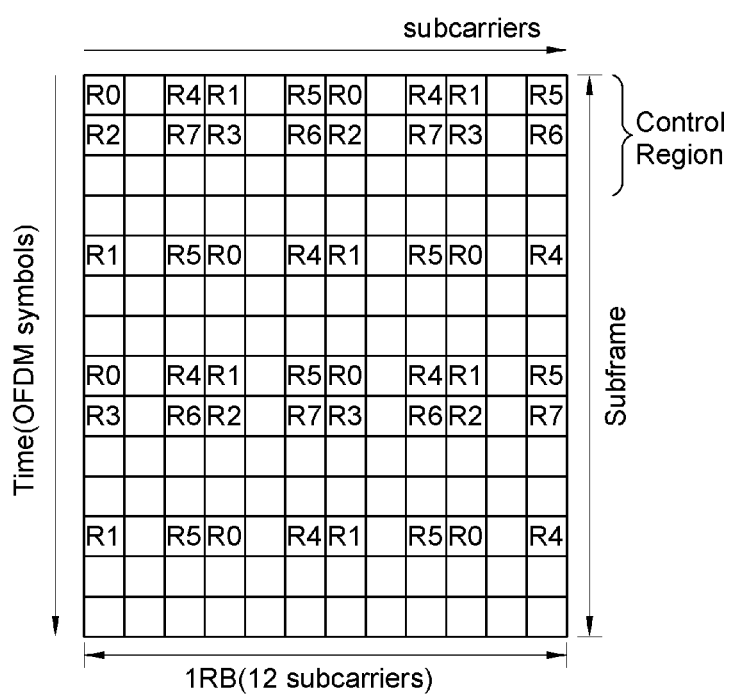

FIG. 14 shows a case where the reference symbols of the antennas 4 to 7 of FIG. 13 are shifted by one subcarrier. FIG. 15 to FIG. 28 show cases where the reference symbols of the antennas 4 to 7 are interchanged in their positions. For example, in FIG. 15, R4 and R6 of FIG. 13 are interchanged in their positions and R5 and R7 of FIG. 13 are interchanged in their positions. In FIG. 16, R5 and R6 of FIG. 13 are interchanged in their positions. In FIG. 17, positions of R4, R5, R6, and R7 of FIG. 13 are respectively changed to positions of R5, R7, R4, and R6. In FIG. 29 to FIG. 42, reference symbols of the antennas 4 to 7 of FIG. 15 to FIG. 28, respectively, are shifted by one subcarrier. In FIG. 44 to FIG. 46, reference symbols of the antennas 4 to 7 are interchanged in their positions. In FIG. 43, FIG. 47, and FIG. 48, reference symbols of the antennas 4 to 7 of FIG. 44, FIG. 45, and FIG. 46, respectively, are shifted by one subcarrier.

Meanwhile, in FIG. 13, the antennas 6 and 7 each has poorer channel estimation performance than each of the antennas 4 and 5. In particular, the antennas 6 and 7 each may have inferior channel estimation performance in a time selective channel.

Figure 49:
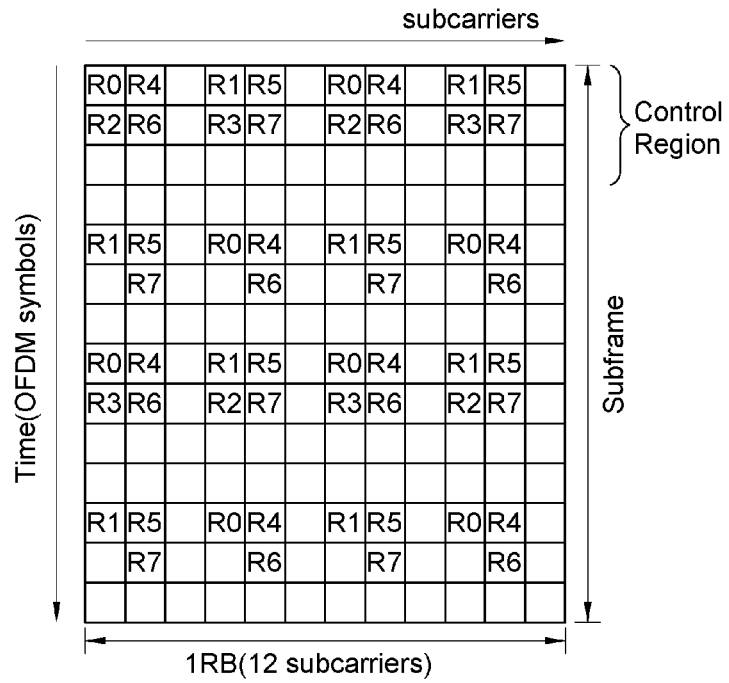
FIG. 49 shows a second example of a reference signal structure considering channel estimation performance.

FIG. 49 shows a second example of an RS structure considering channel estimation performance.

Referring to FIG. 49, 56 resource elements out of 168 resource elements are used as reference symbols. The remaining 112 resource elements can be used as data symbols. A reference symbol overhead is 33%. In this structure, the number of reference symbols of each of the antennas 6 and 7 of FIG. 13 is matched to the number of reference symbols of each of the antennas 0, 1, 4, and 5. Channel estimation performance of each of the antennas 6 and 7 is compensated to the extent of channel estimation performance of each of the antennas 4 and 5. Accordingly, channel estimation performance of each of the antennas 4 to 7 is similar to channel estimation performance of each of the antennas 0 and 1.

However, the number of reference symbols of each of the antennas 6 and 7 is increased, and thus the reference symbol overhead is increased to 33%. In this structure, ⅓ of the total resource elements in a subframe are used as reference symbols. When using 4 antennas as shown in FIG. 11, the reference symbol overhead is 14%. In FIG. 49, although channel estimation performance is good, a data transfer rate is decreased by ½ or more in comparison with a case of using four antennas as shown in FIG. 11. In addition, in an OFDM symbol including only reference symbols of the antennas 6 and 7, the number of transmitted reference symbols is less than that of an OFDM symbol including other reference symbols, and thus the power boosting of the reference symbols may not even.

(2) RS Structure Considering Reference Symbol Overhead

A reference symbol overhead has a significant effect on a system throughput. When the reference symbol overhead is great, the number of data symbols for transmitting actual data is decreased to reduce the system throughput. However, if the number of reference symbols is decreased to reduce the reference symbol overhead, a problem arises in that channel estimation performance cannot be guaranteed. Therefore, it is important to design a suitable RS structure by considering a proper tradeoff between the reference symbol overhead and the channel estimation performance.

Figure 50:
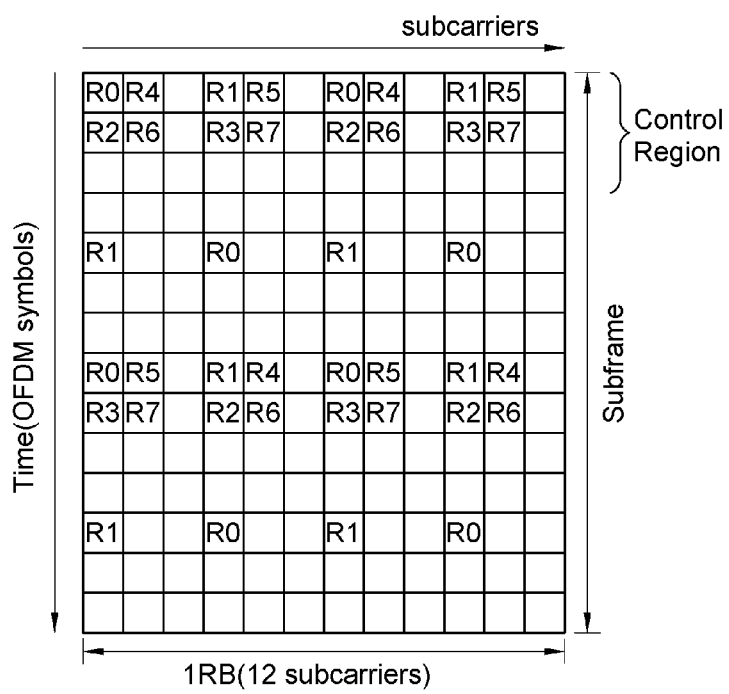
FIG. 50 shows a first example of a reference signal structure considering a reference symbol overhead.

FIG. 50 shows a first example of an RS structure considering a reference symbol overhead.

Referring to FIG. 50, 40 resource elements out of 168 resource elements are used as reference symbols. The remaining 128 resource elements can be used as data symbols. The reference symbol overhead is 24%. In this structure, even distribution is considered in a frequency domain. Antennas 0 and 1 each has the same number of reference symbols. Antennas 2 to 7 each has the same number of reference symbols. The number of reference symbols for each of the antennas 0 and 1 is double of the number of reference symbols for each of the antennas 2 to 7. In one OFDM symbol, reference symbols for each antenna are located with a spacing of 6 subcarriers. The antennas 4 to 7 each has channel estimation performance similar to channel estimation performance for each of the antennas 2 and 3.

However, the antennas 2 to 7 each has poorer channel estimation performance than each of the antennas 0 and 1. In particular, in a time selective channel, the antennas 2 to 7 each may have pooper channel estimation performance than each of the antennas 0 and 1.

Figure 51:
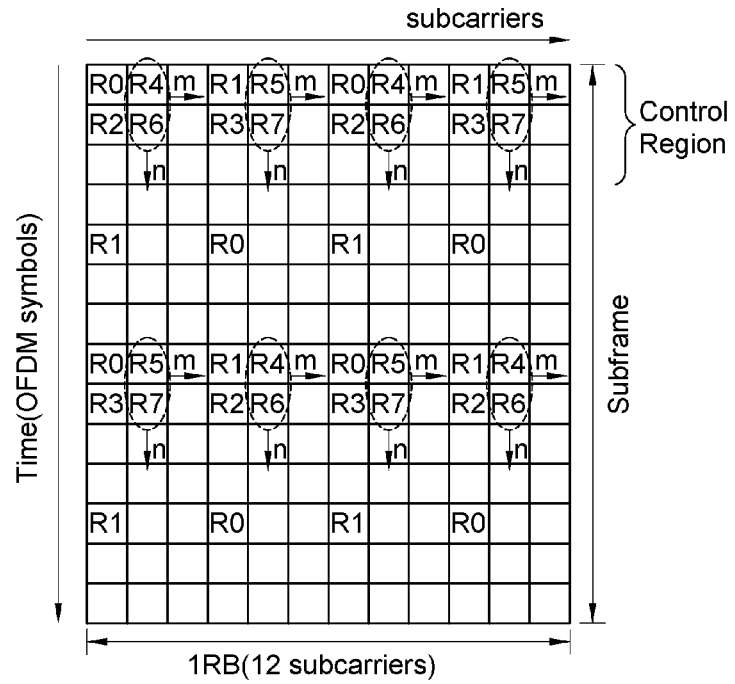
FIG. 51 shows an example of reference symbol shifting.
Figure 52:
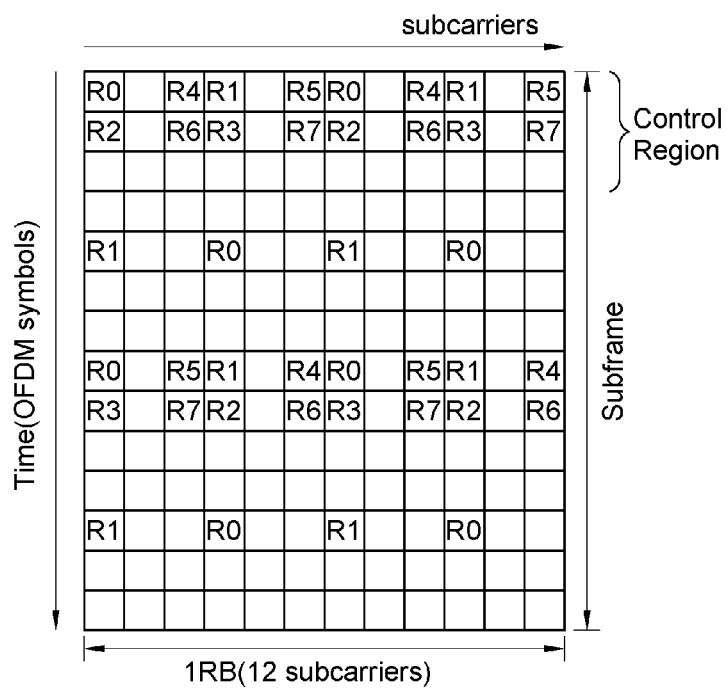
FIG. 52 to FIG. 62 show examples of FIG. 51.

FIG. 51 shows an example of reference symbol shifting.

Referring to FIG. 51, reference symbols of each of antennas 4 to 7 can be shifted by m subcarriers (where m is a natural number). The reference symbols of each of the antennas 4 to 7 can be shifted by n-OFDM symbols (where n is a natural number). Shifting of the reference symbols in a subcarrier direction or an OFDM symbol direction does not have an effect on channel estimation performance for each antenna. In addition, the reference symbols of the antennas 4 to 7 may be interchanged in their positions. This also does not have an effect on the channel estimation performance for each antenna.

Figure 53:
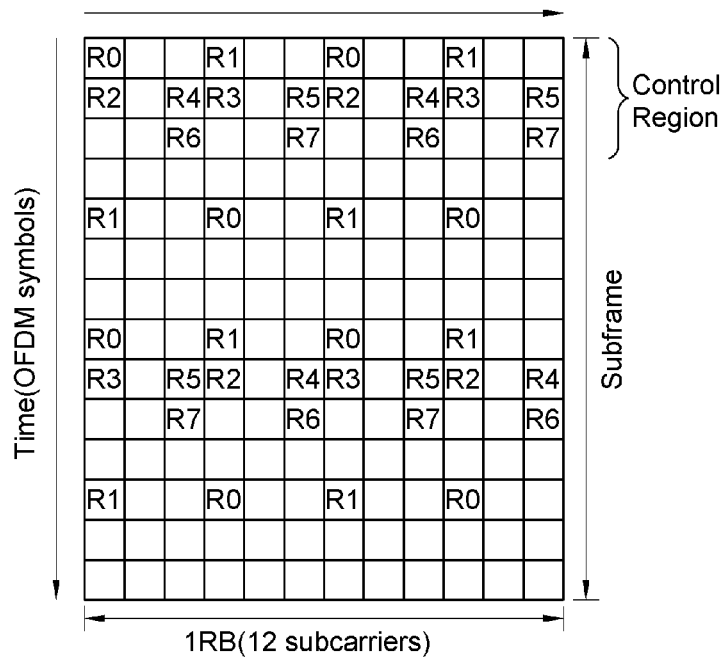
Figure 54:
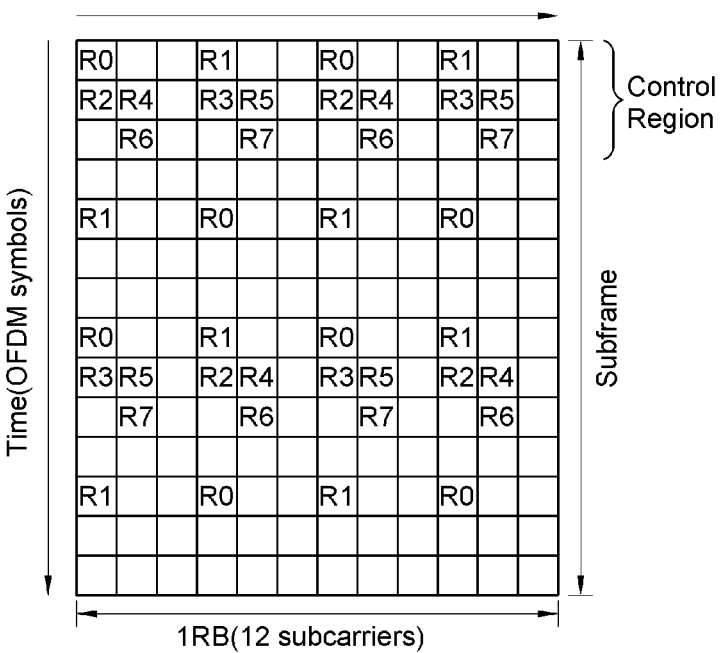
Figure 62:
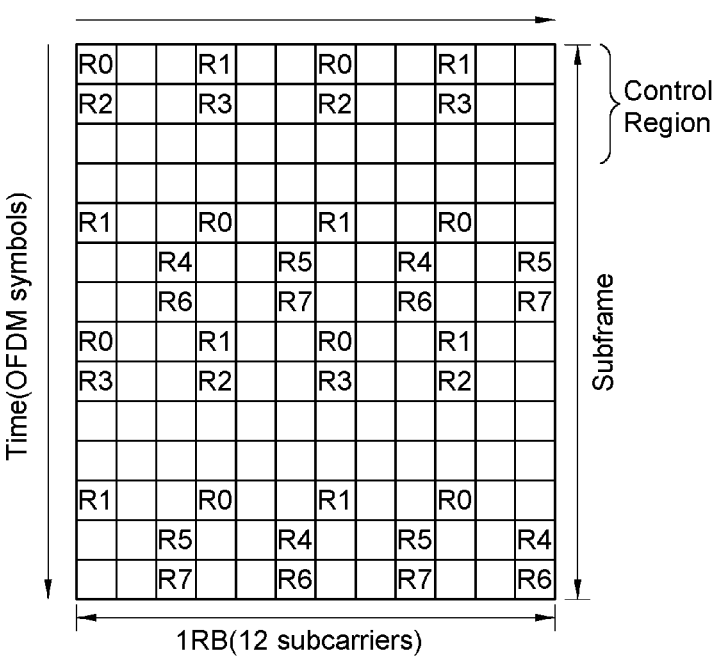

FIG. 52 to FIG. 62 show examples of FIG. 51. Herein, m is either 0 or 1, and n is any one value selected from 0 to 5. For example, in FIG. 52, m is 1, and n is 0. In FIG. 53, m is 1, and n is 1. In FIG. 62, m is 1, and n is 5.

Figure 63:
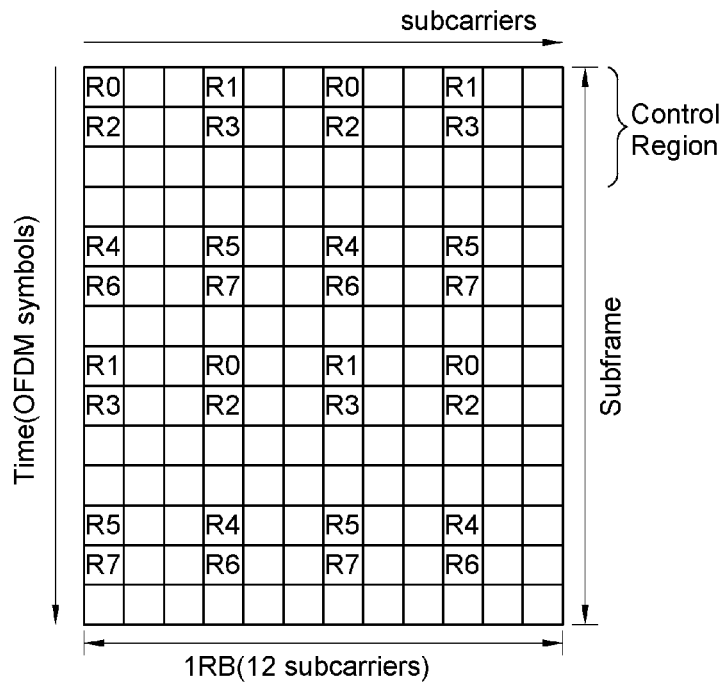
FIG. 63 shows a second example of a reference signal structure considering a reference symbol overhead.

FIG. 63 shows a second example of an RS structure considering a reference symbol overhead.

Referring to FIG. 63, 32 resource elements out of 168 resource elements are used as reference symbols. The remaining 136 resource elements can be used as data symbols. The reference symbol overhead is 19%. Antennas 0 to 7 each has the same number of reference symbols. In one OFDM symbol, reference symbols for each antenna are located with the same subcarrier spacing. In addition, in a time domain, the reference symbols for each antenna are located with the same OFDM symbol spacing. Therefore, the antennas 0 to 7 each has a similar channel estimation performance in a frequency selective channel or a time selective channel.

Figure 64:
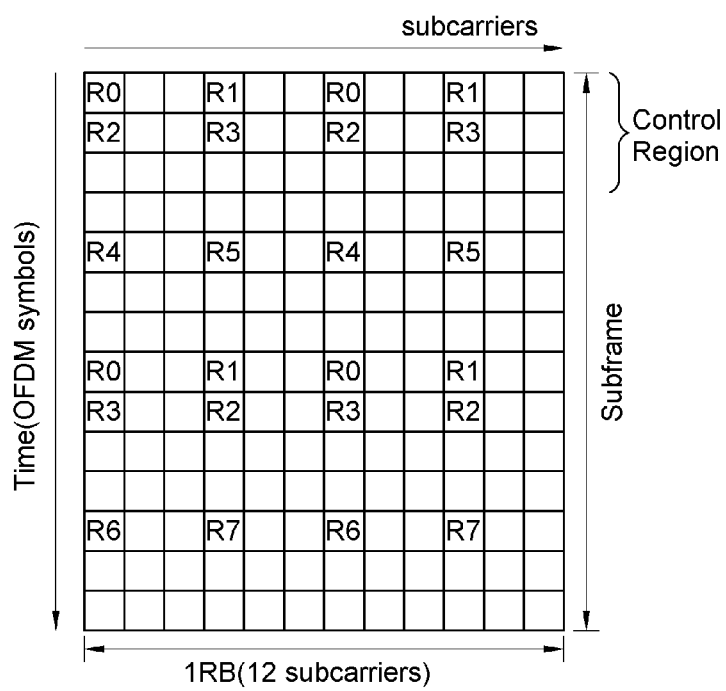
FIG. 64 shows a third example of a reference signal structure considering a reference symbol overhead.

FIG. 64 shows a third example of an RS structure considering a reference symbol overhead.

Referring to FIG. 64, 24 resource elements out of 168 resource elements are used as reference symbols. The remaining 144 resource elements can be used as data symbols. The reference symbol overhead is 14%. This is the same as the reference symbol overhead for the case of using four antennas (see FIG. 11). Antennas 0 to 3 each has the same number of reference symbols. Antennas 4 to 7 each has the same number of reference symbols. The number of reference symbols for each of the antennas 0 to 3 is double of the number of reference symbols for each of the antennas 4 to 7. In one OFDM symbol, reference symbols for each antenna are located with a spacing of 6 subcarriers. In a time selective channel, each of the antennas 0 and 1 may have low channel estimation performance in comparison with the case of using four antennas (see FIG. 11). In addition, the antennas 4 to 7 each has channel estimation performance lower than that of the antennas 0 to 3 each. However, in the RS structure of FIG. 64, channel estimation performance is not significantly changed in a time flat and frequency flat channel such as an indoor environment. Further, a system throughput can be improved due to a low reference symbol overhead.

Meanwhile, there is a high possibility that a system such as a relay station is a fixed station like a BS. When transmission and reception are achieved between the BS and the relay station, the channel between the BS and the relay station may be a time flat and frequency selective channel.

Figure 65:
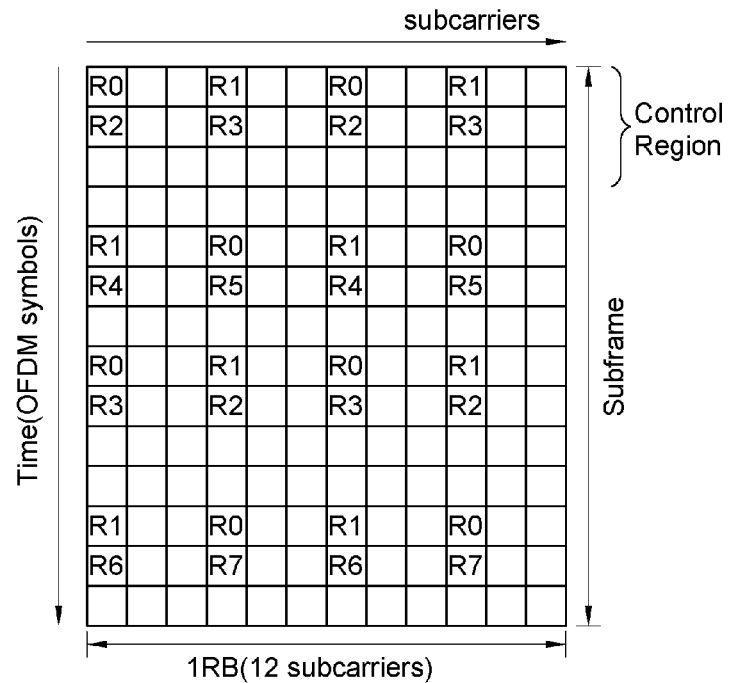
FIG. 65 shows a fourth example of a reference signal structure considering a reference symbol overhead.

FIG. 65 shows a fourth example of an RS structure considering a reference symbol overhead.

Referring to FIG. 65, 32 resource elements out of 168 resource elements are used as reference symbols. The remaining 136 resource elements can be used as data symbols. The reference symbol overhead is 19%. Antennas 0 to 3 each has reference symbols as shown in FIG. 11. Antennas 4 and 5 each has two reference symbols located in one OFDM symbol. Antennas 6 and 7 each has two reference symbols located in another OFDM symbol. In one OFDM symbol, reference symbols for each antenna are located with a spacing of 6 subcarriers. This is suitable for channel estimation of a time flat and frequency selective channel.

Reference symbols of each of antennas 4 to 7 can be shifted by m subcarriers (where m is a natural number). The reference symbols of each of the antennas 4 to 7 can be shifted by n OFDM symbols (where n is a natural number). Shifting of the reference symbols in a subcarrier direction or an OFDM symbol direction does not have an effect on channel estimation performance for each antenna.

Figure 66:
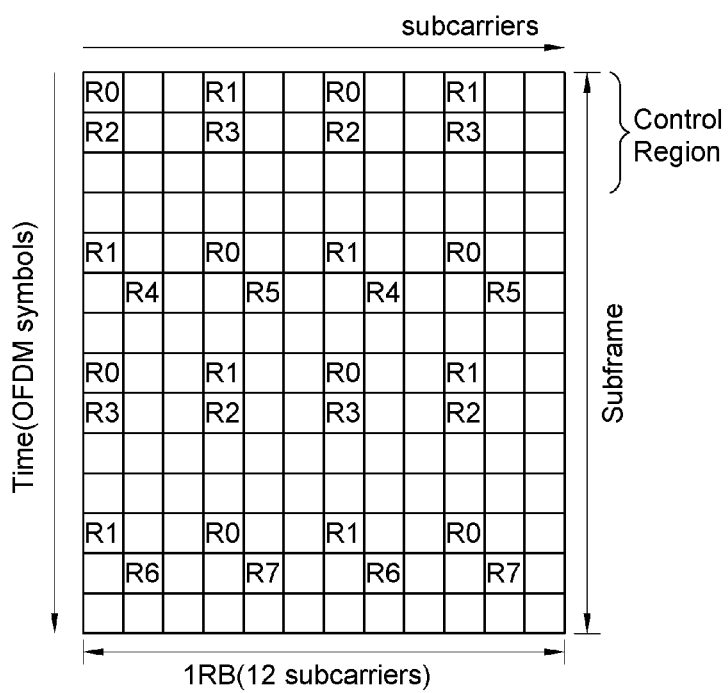
FIG. 66 to FIG. 80 show examples in which reference symbols of antennas 4 to 7 of FIG. 65 are shifted in a frequency domain and/or a time domain.
Figure 67:
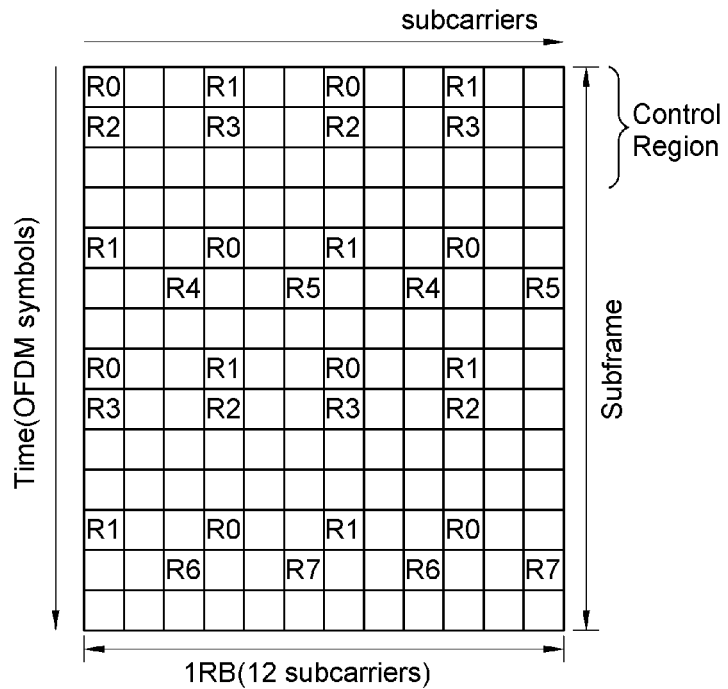
Figure 68:
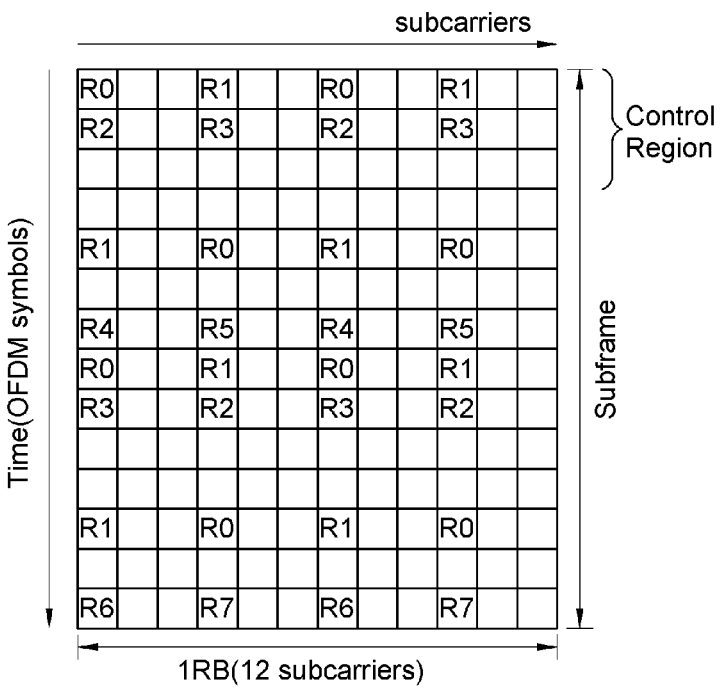
Figure 69:
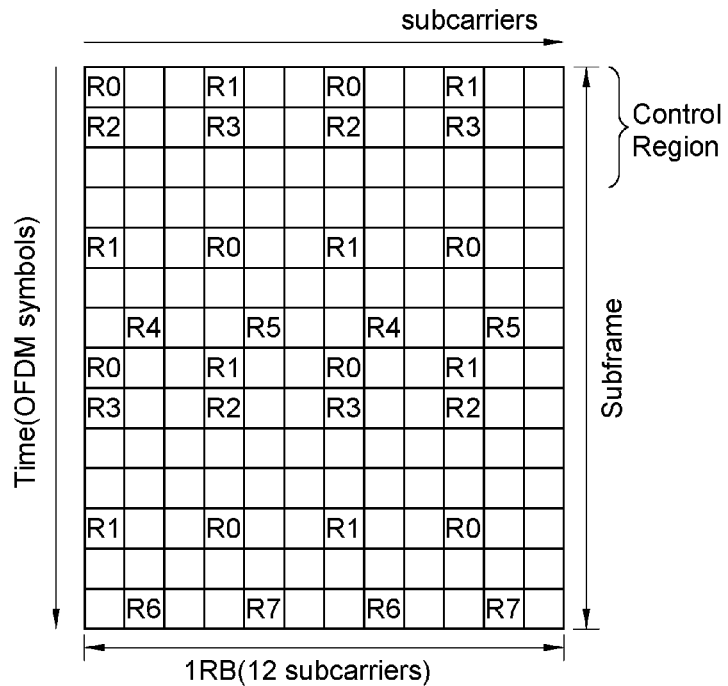
Figure 70:
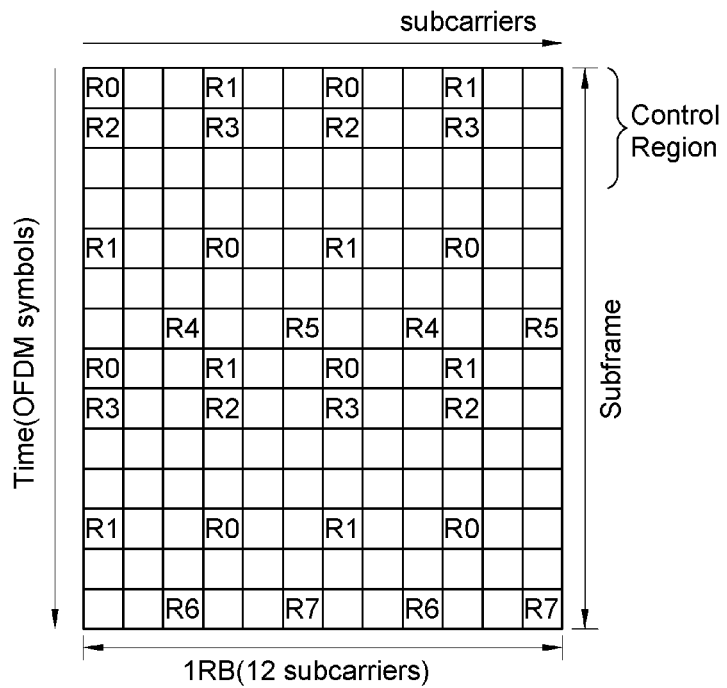
Figure 71:
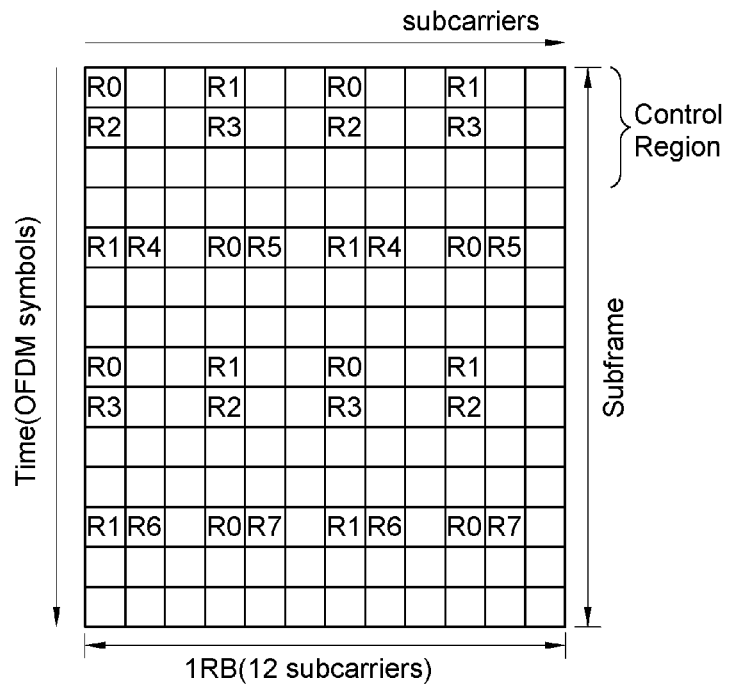
Figure 72:
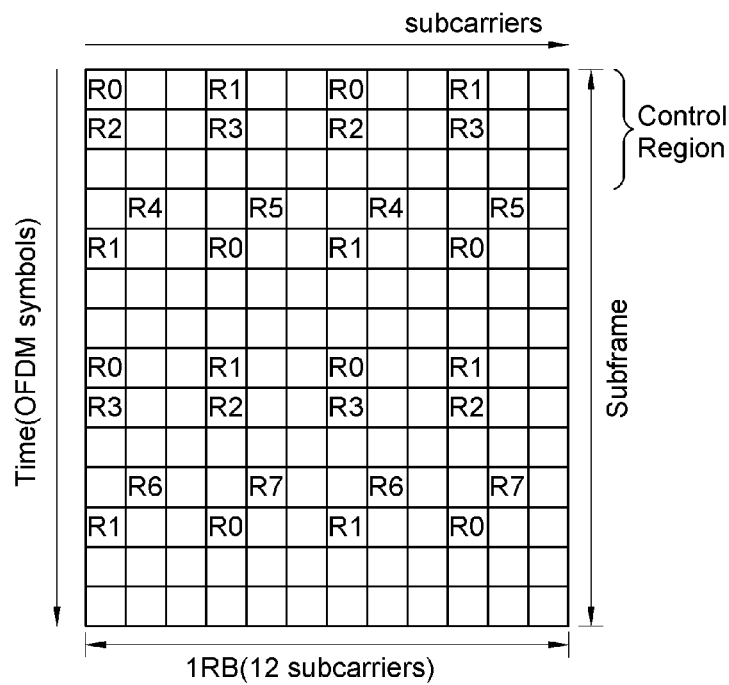
Figure 73:
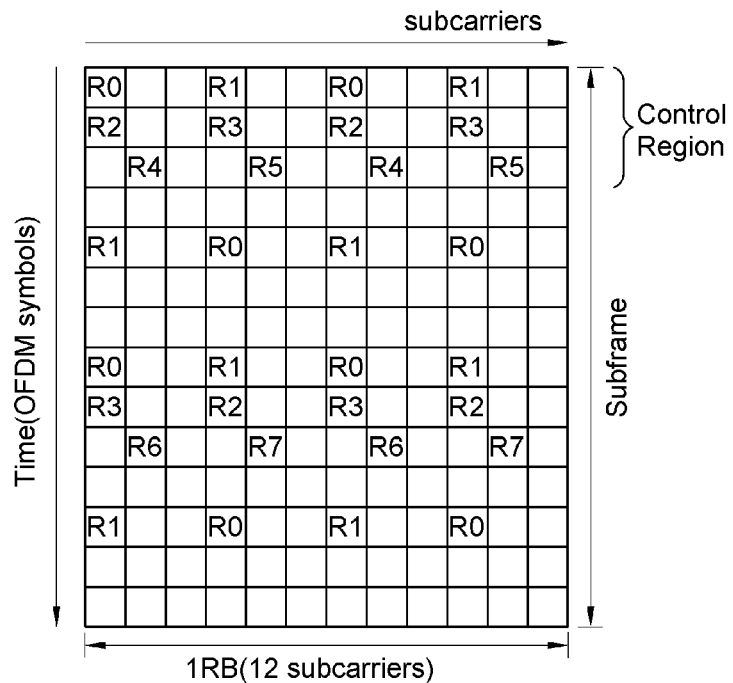
Figure 74:
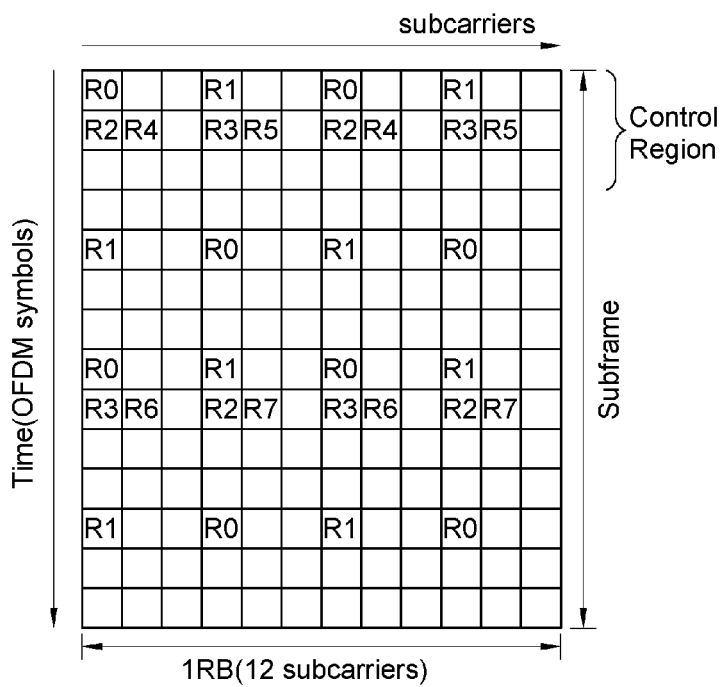
Figure 75:
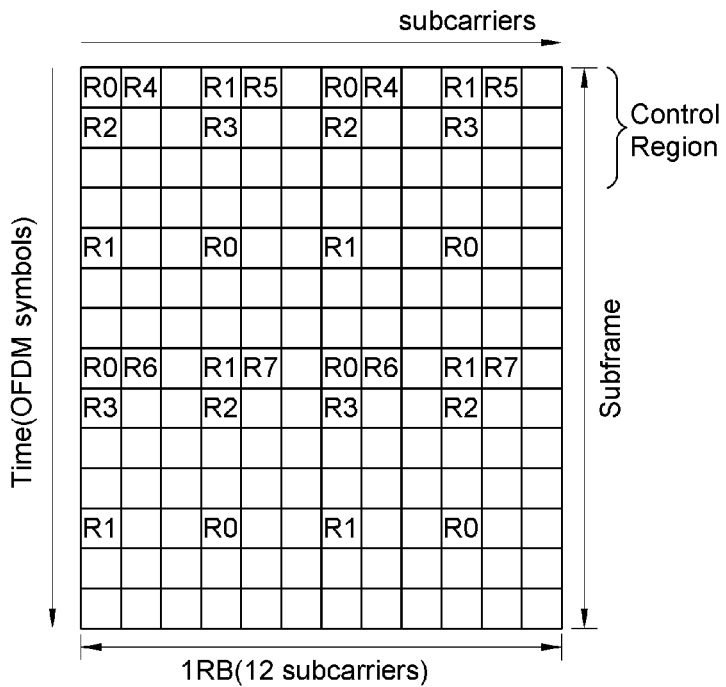
Figure 76:
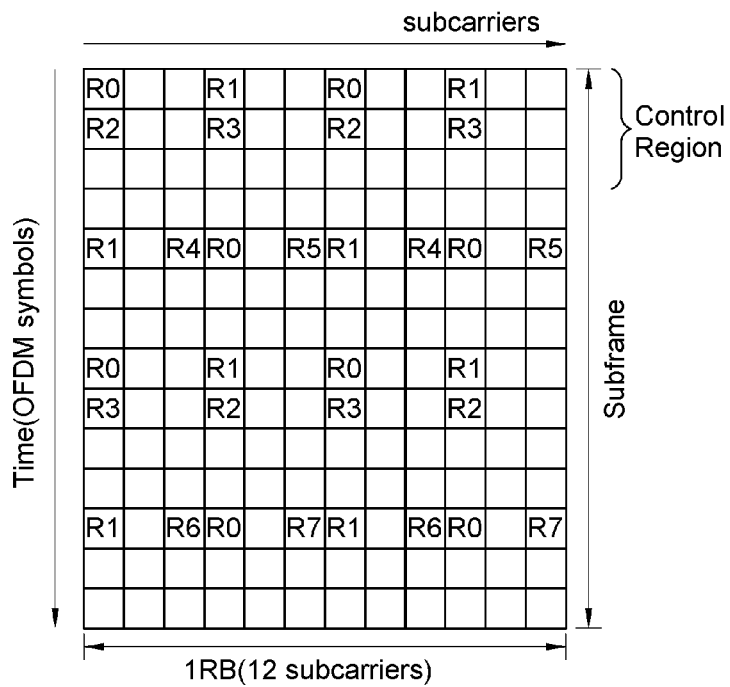
Figure 77:
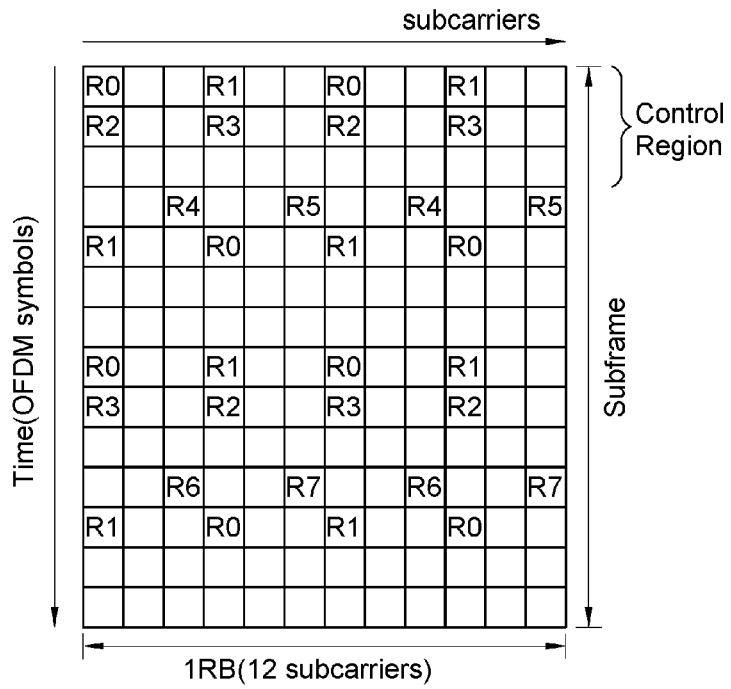
Figure 78:
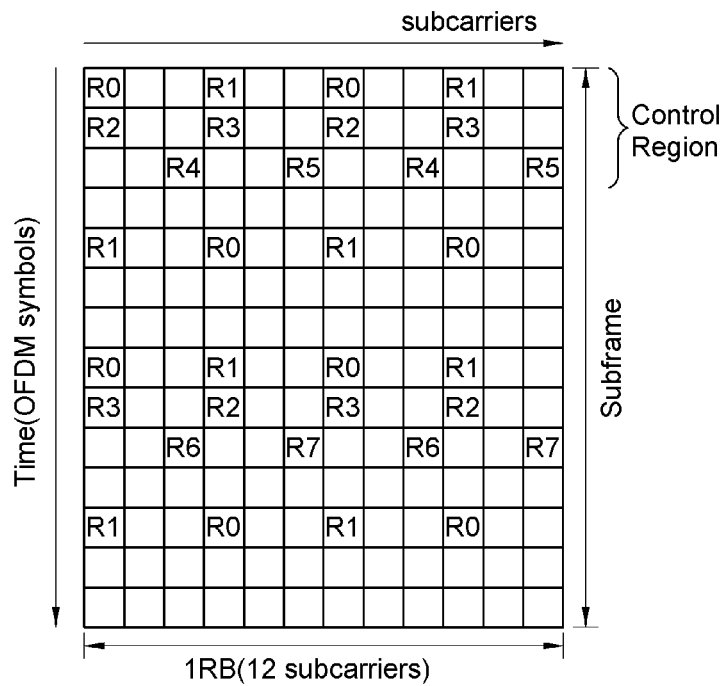
Figure 79:
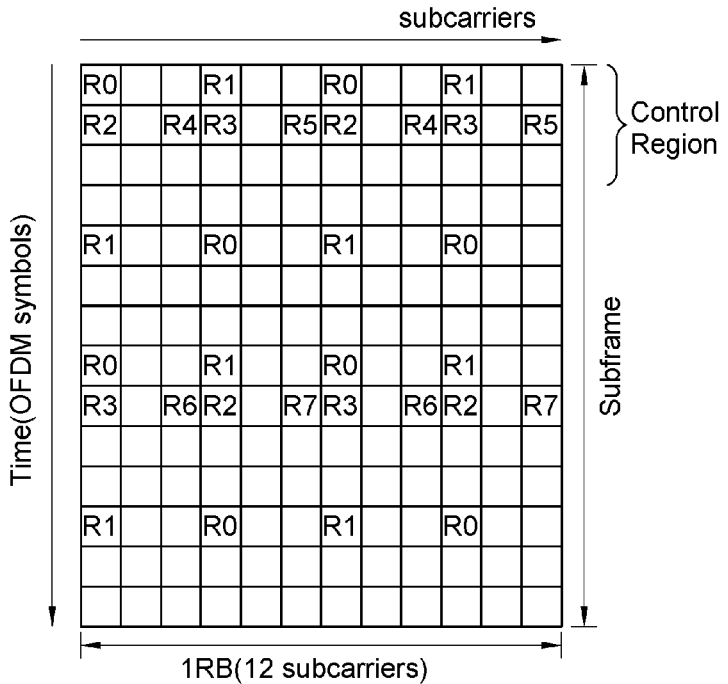
Figure 80:
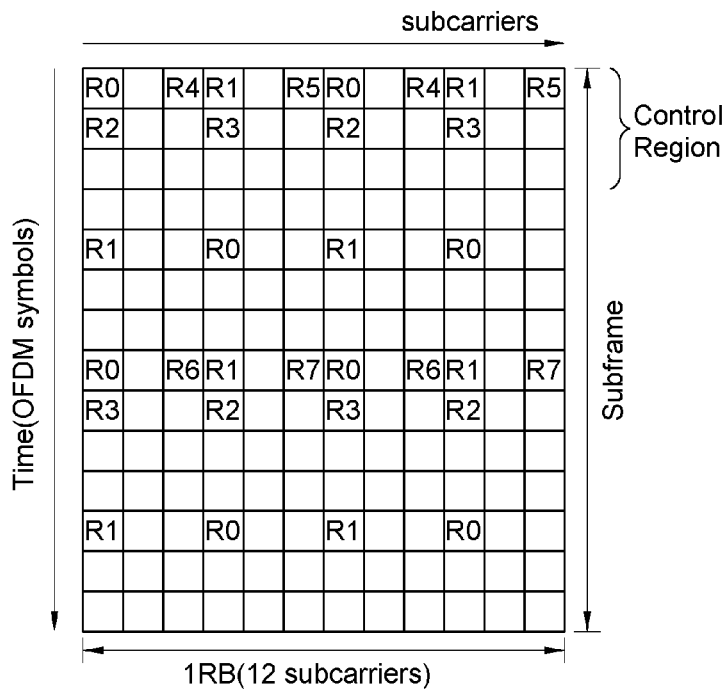

FIG. 66 to FIG. 80 show examples in which reference symbols of the antennas 4 to 7 of FIG. 65 are shifted in a frequency domain and/or a time domain. For example, in FIG. 66, the reference symbols of each of the antennas 4 to 7 are shifted by one subcarrier. In FIG. 68, the reference symbols of each of the antennas 4 to 7 are shifted by one OFDM symbol. In FIG. 70, the reference symbols of each of the antennas 4 to 7 are shifted by two subcarriers and one OFDM symbol.

A line of sight (LOS) may be formed between the relay station and the BS. In this case, the channel may no longer have frequency selectivity and be a frequency flat channel.

Figure 81:
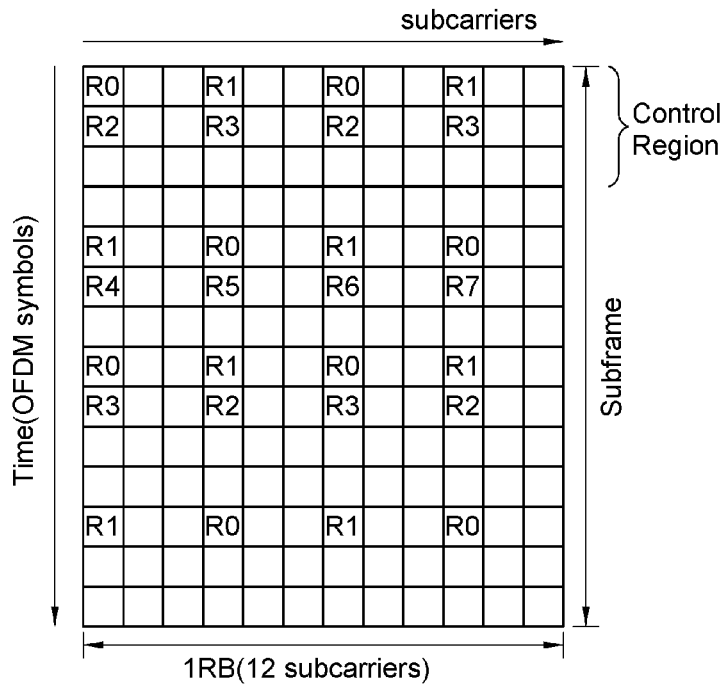
FIG. 81 shows a fifth example of an RS structure considering a reference symbol overhead.

FIG. 81 shows a fifth example of an RS structure considering a reference symbol overhead.

Referring to FIG. 81, 28 resource elements out of 168 resource elements are used as reference symbols. The remaining 140 resource elements can be used as data symbols. The reference symbol overhead is 17%. Antennas 0 to 3 each has reference symbols as shown in FIG. 11. Antennas 4 to 7 each has one reference symbol in one OFDM symbols. This is suitable for channel estimation of a frequency flat channel and a time flat channel.

Reference symbols of each of antennas 4 to 7 can be shifted by m subcarriers (where m is a natural number). The reference symbols of each of the antennas 4 to 7 can be shifted by n OFDM symbols (where n is a natural number). Shifting of the reference symbols in a subcarrier direction or an OFDM symbol direction does not have an effect on channel estimation performance for each antenna.

Figure 82:
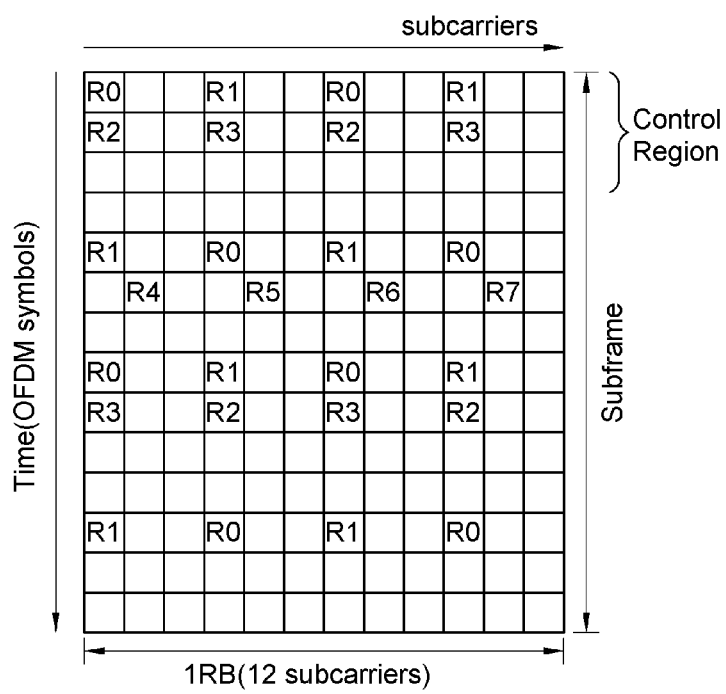
FIG. 82 to FIG. 116 show examples in which reference symbols of antennas 4 to 7 of FIG. 81 are shifted in a frequency domain and/or a time domain.
Figure 83:
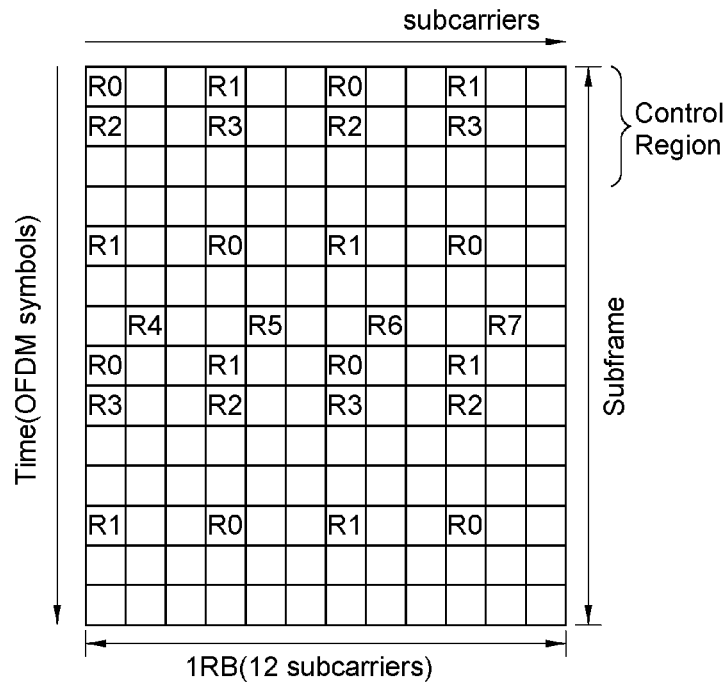
Figure 84:
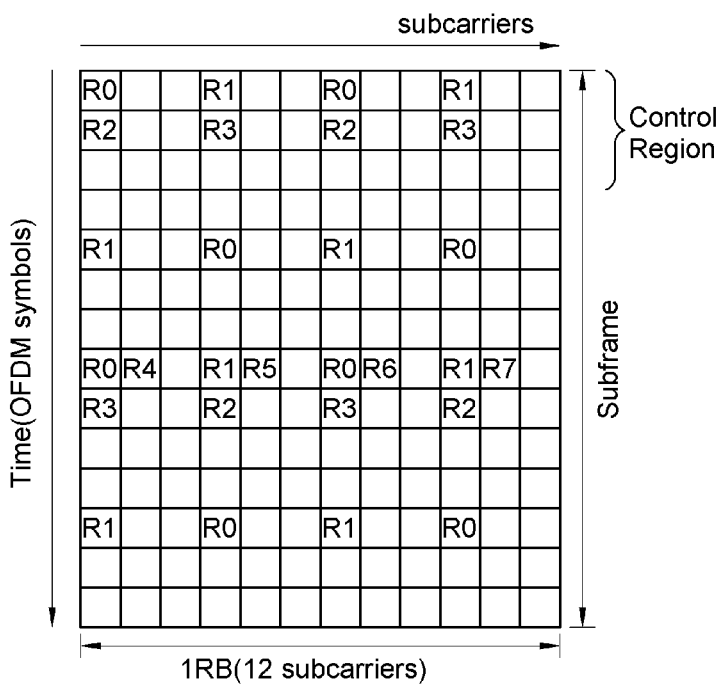
Figure 85:
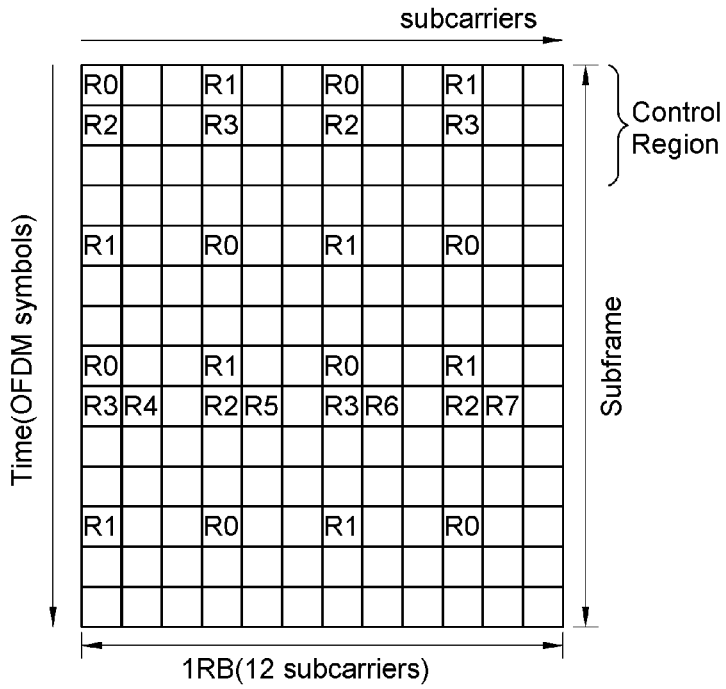
Figure 86:
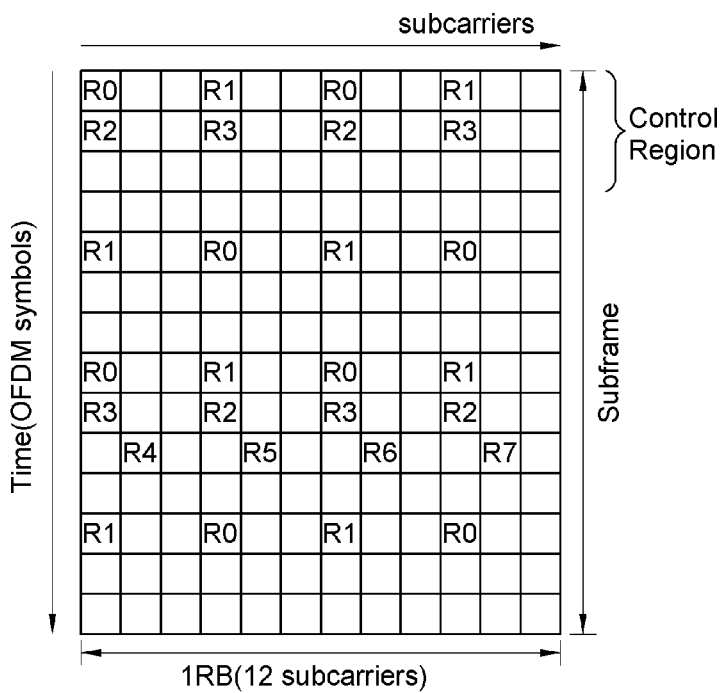
Figure 87:
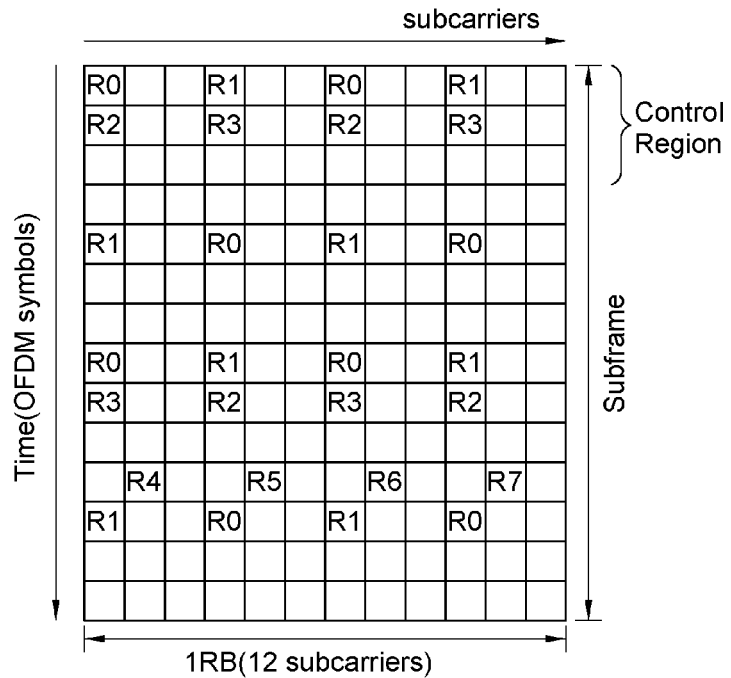
Figure 88:
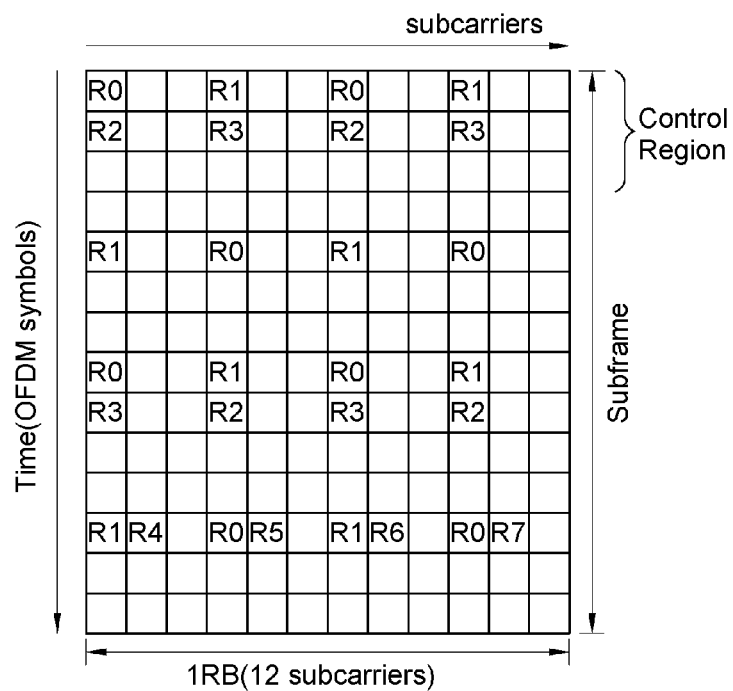
Figure 89:
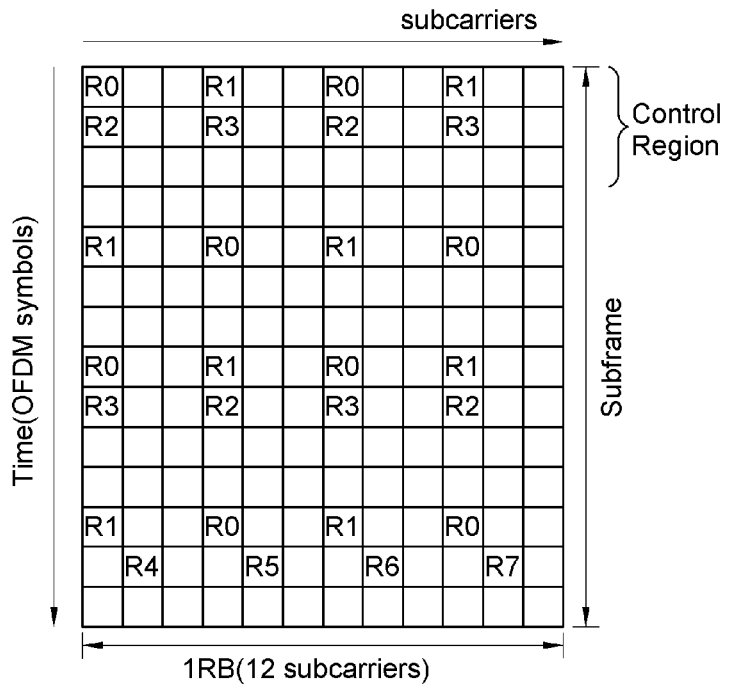
Figure 90:
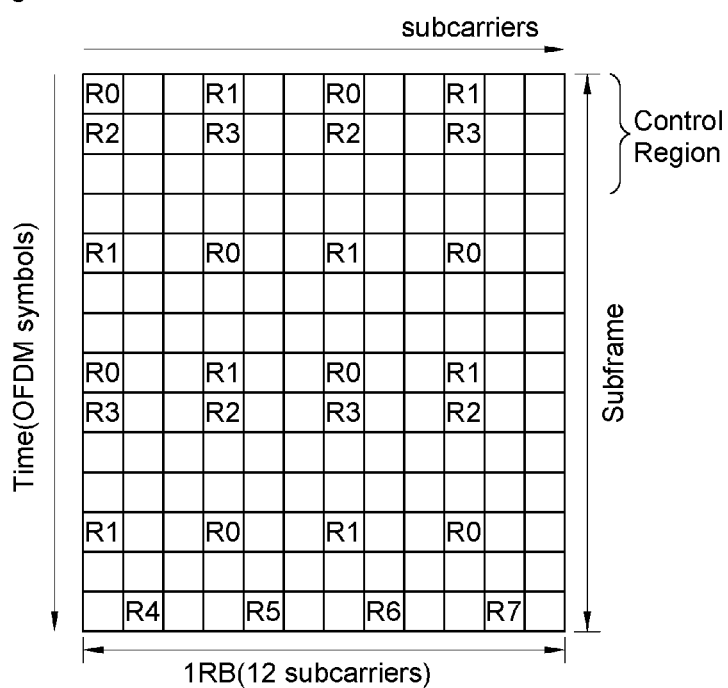
Figure 91:
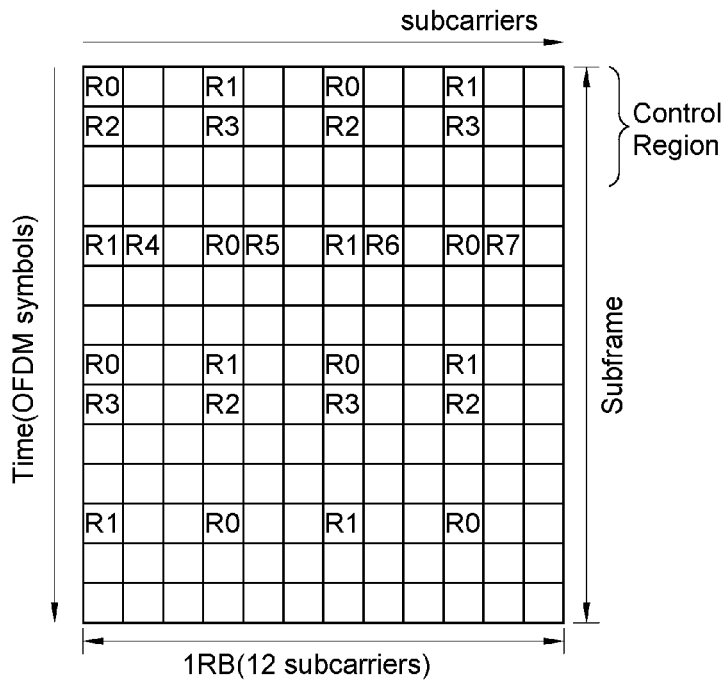
Figure 92:
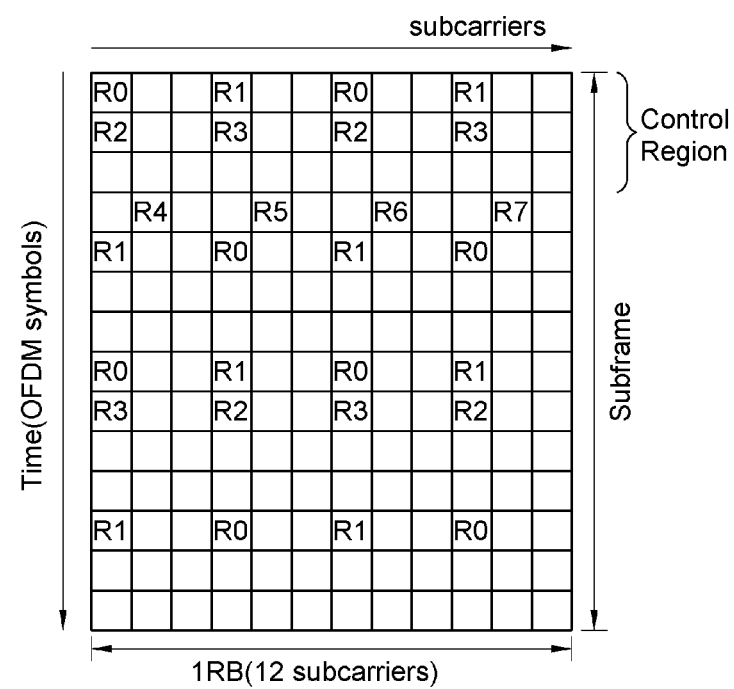
Figure 93:
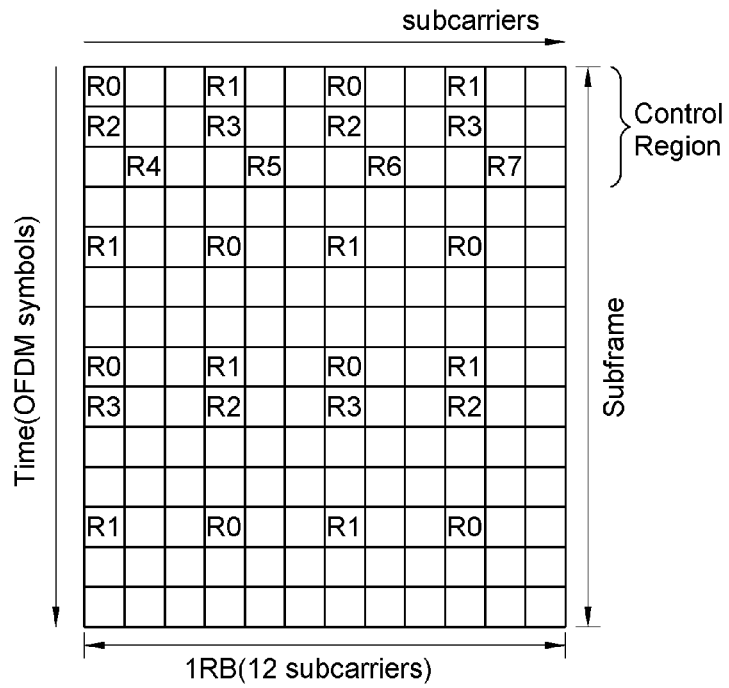
Figure 94:
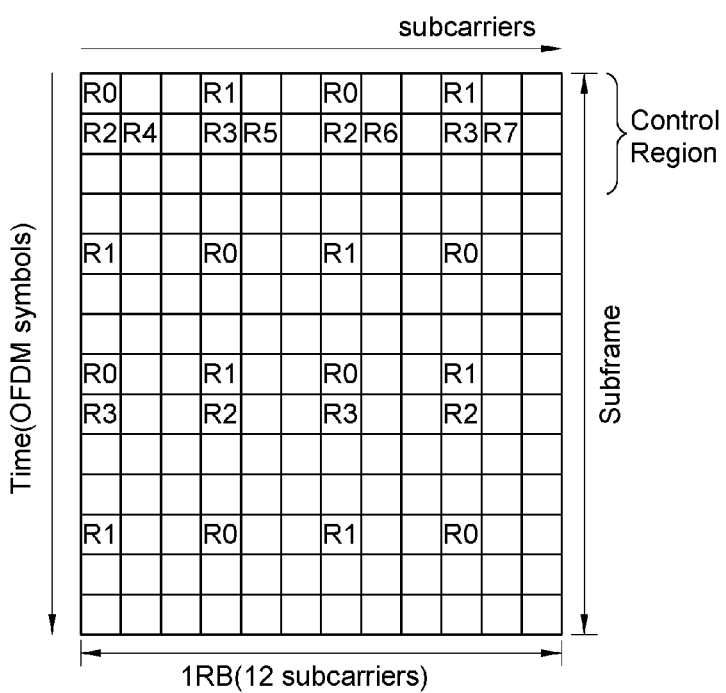
Figure 95:
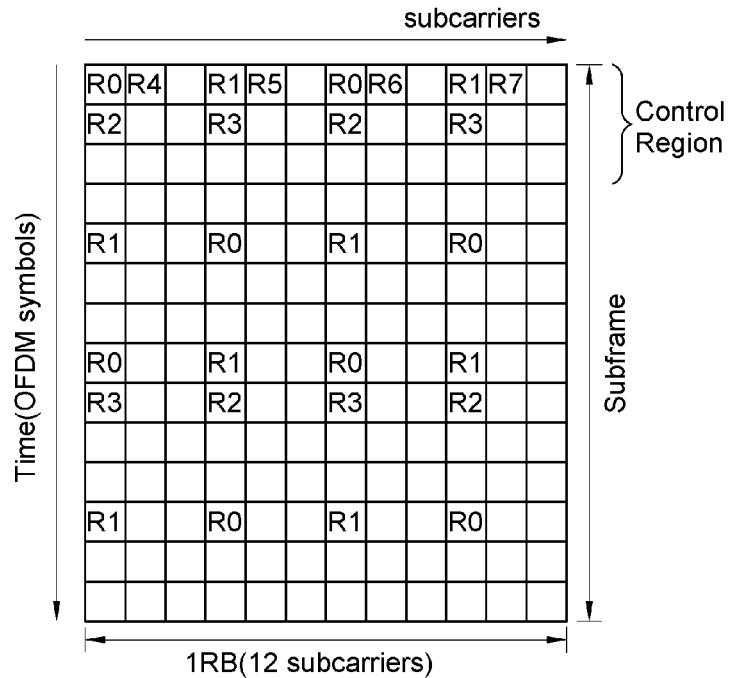
Figure 96:
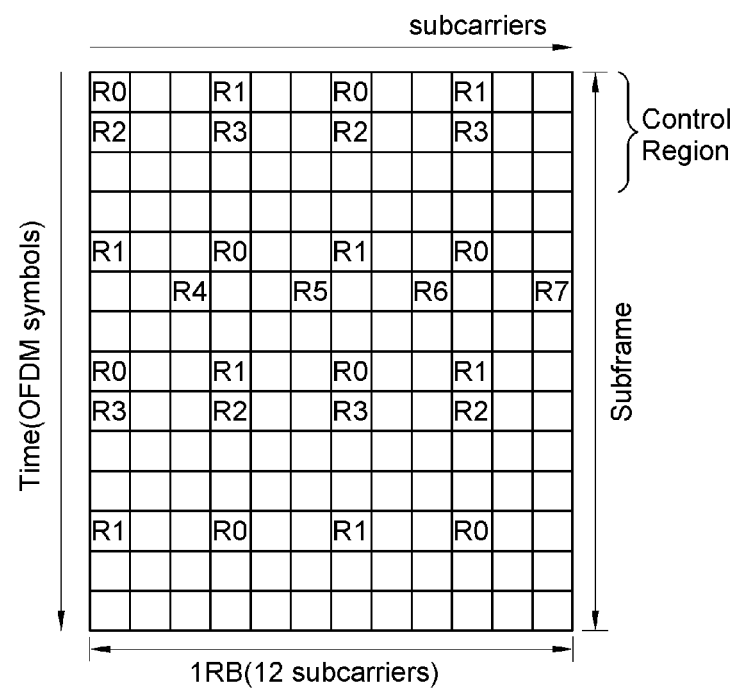
Figure 97:
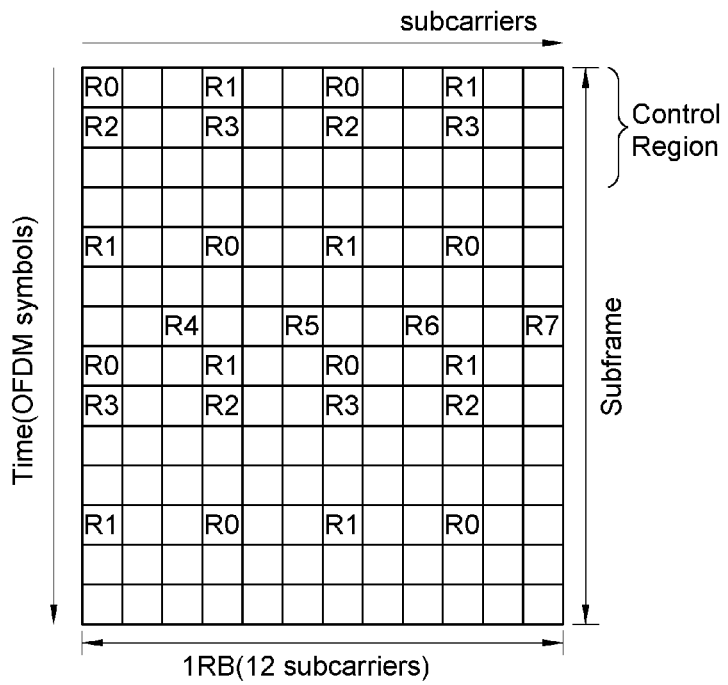
Figure 98:
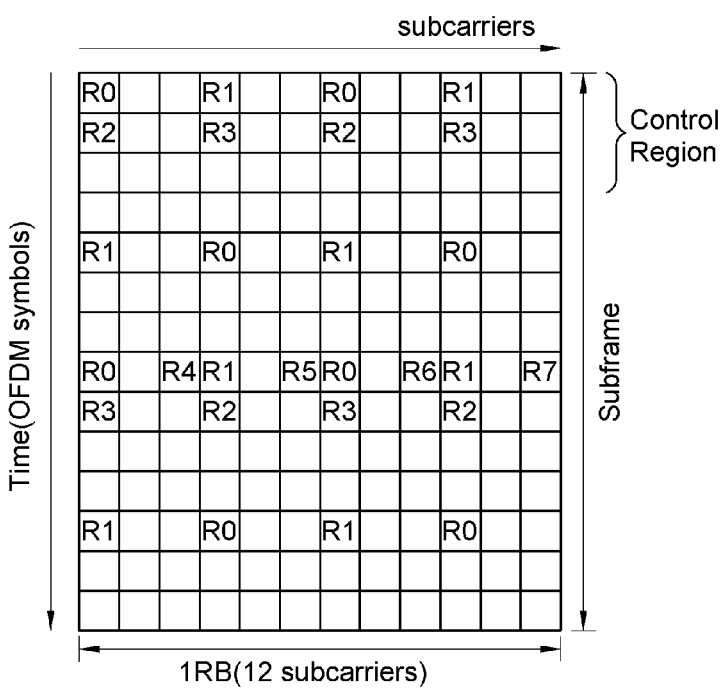
Figure 99:
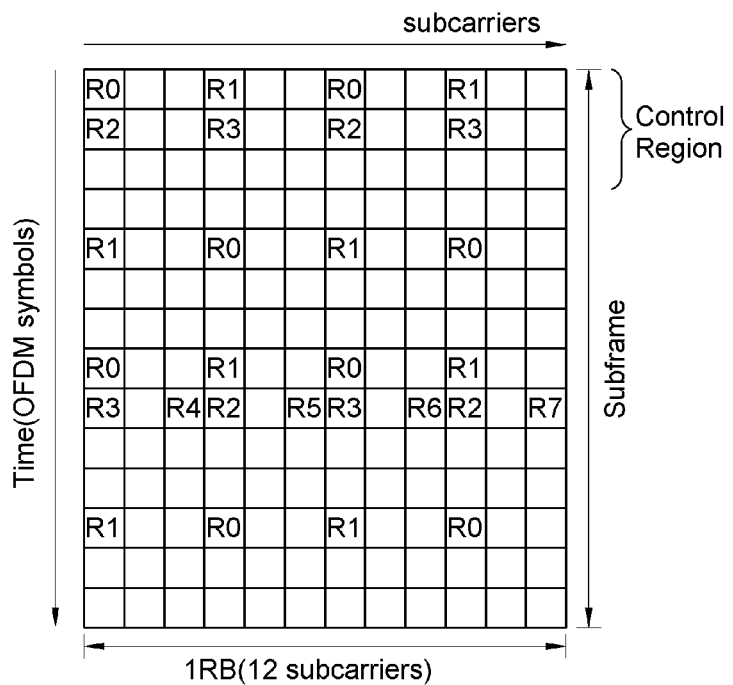
Figure 100:
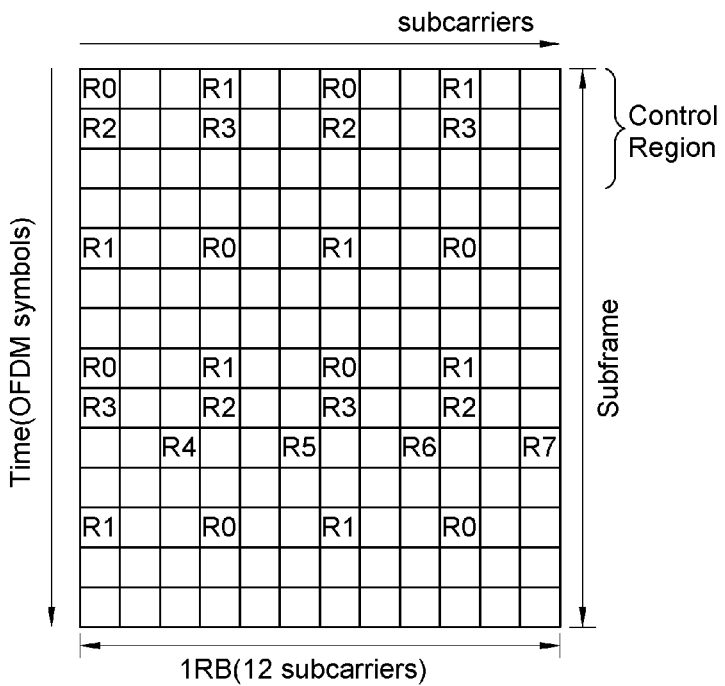
Figure 101:
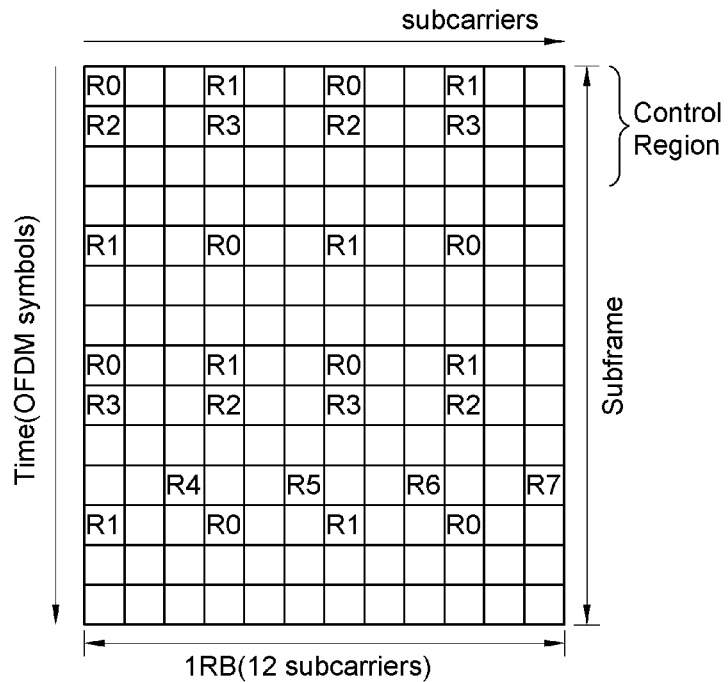
Figure 102:
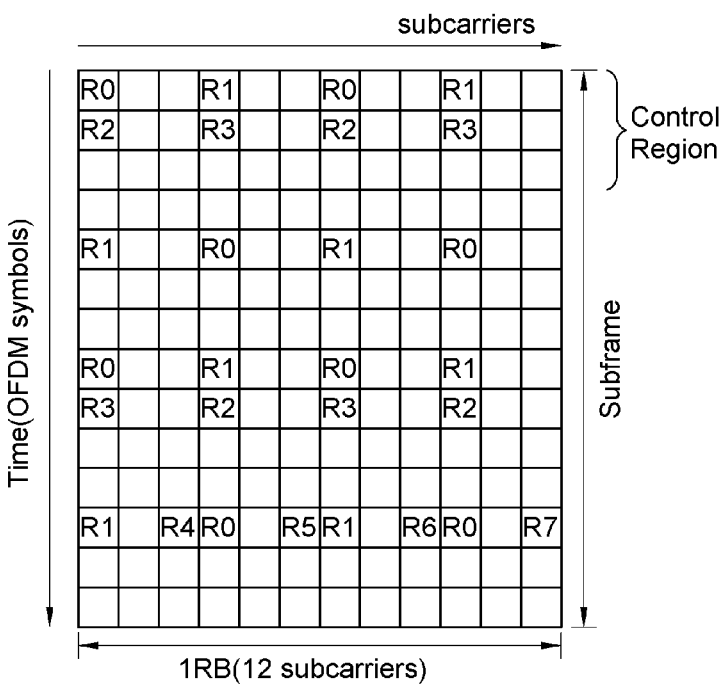
Figure 103:
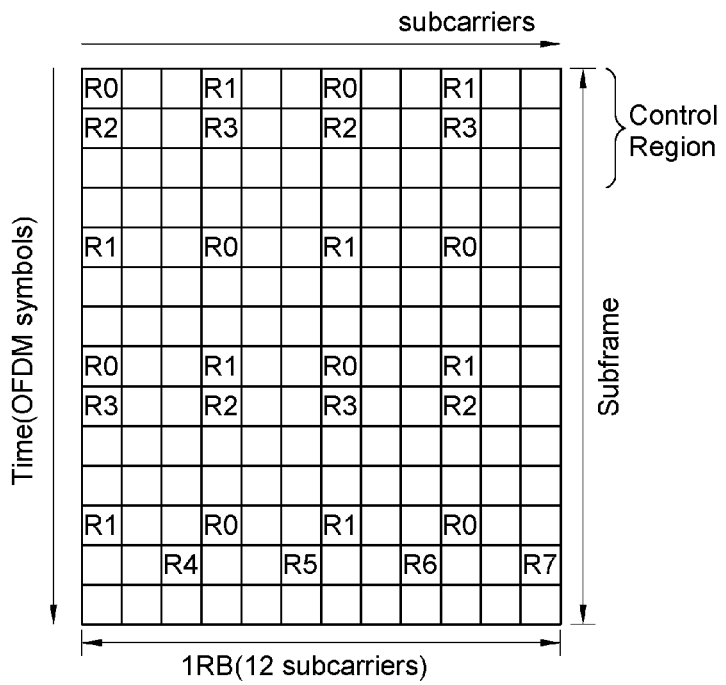
Figure 104:
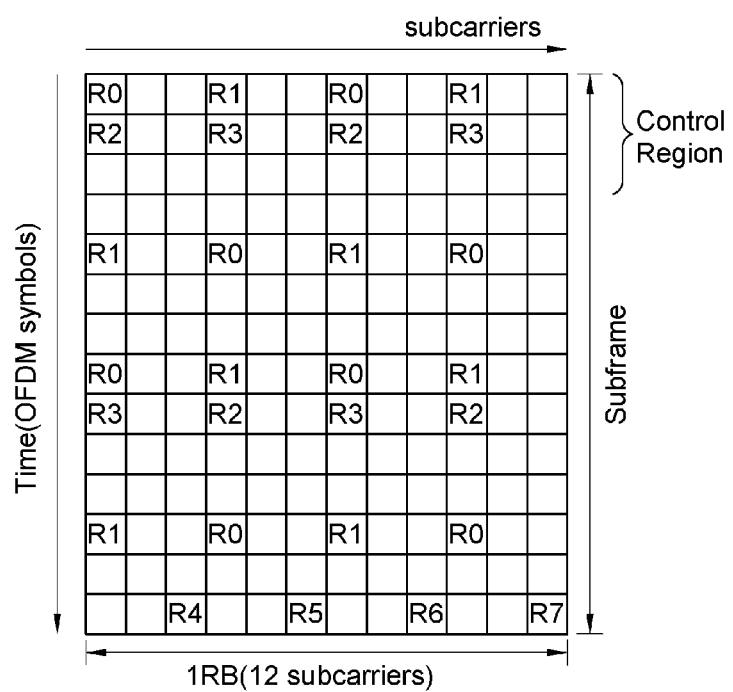
Figure 105:
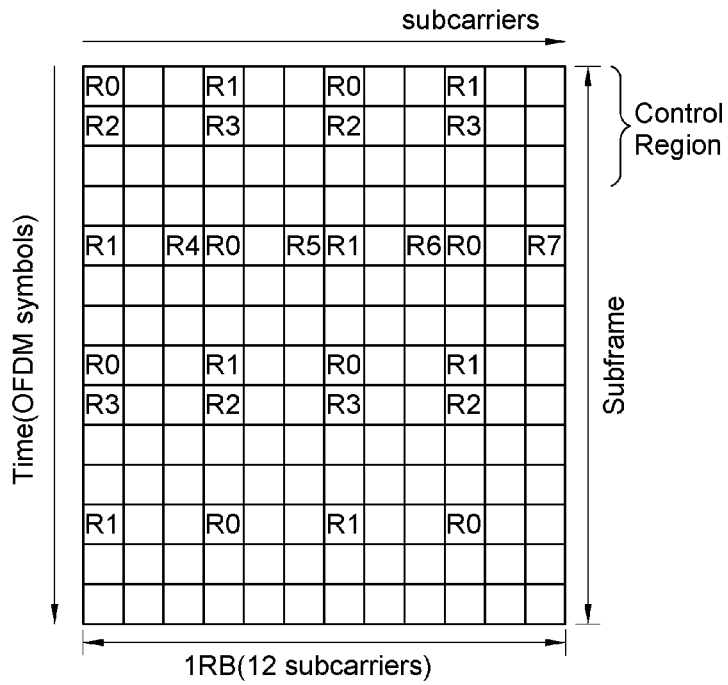
Figure 106:
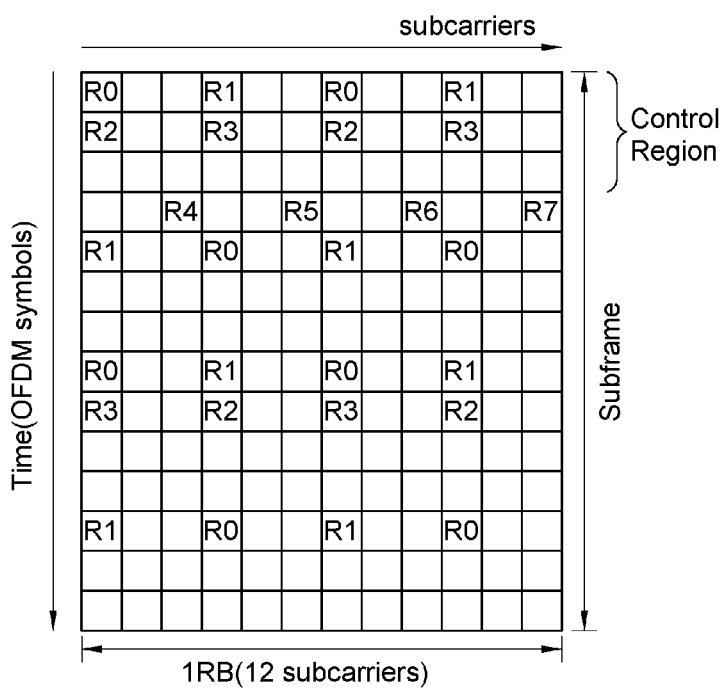
Figure 107:
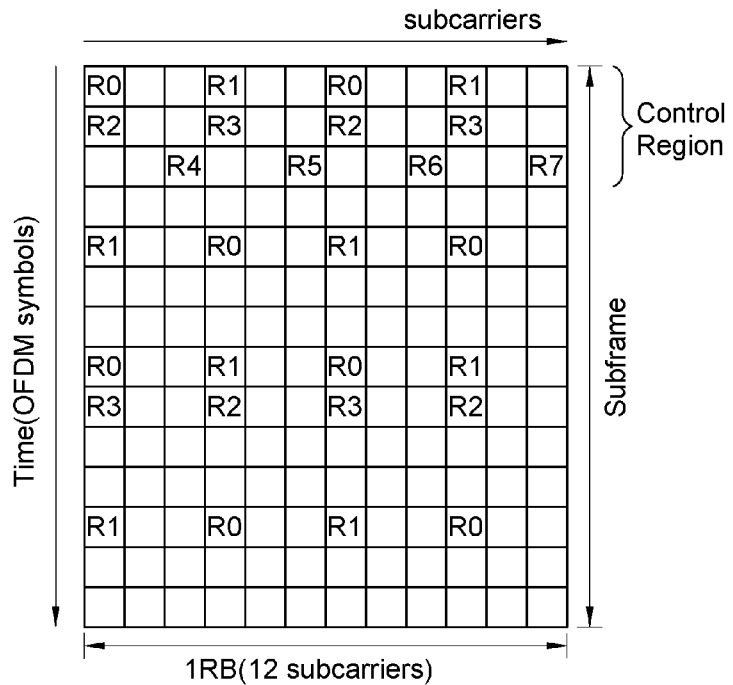
Figure 108:
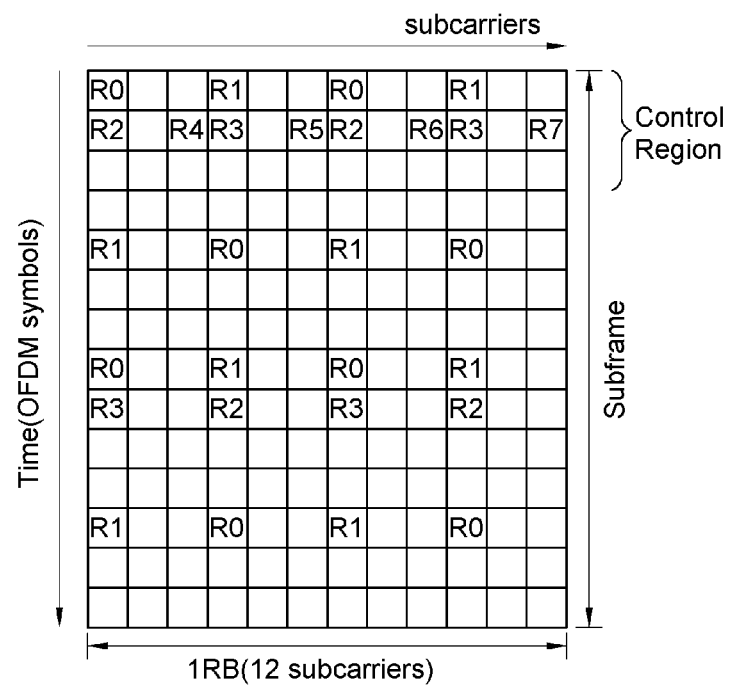
Figure 109:
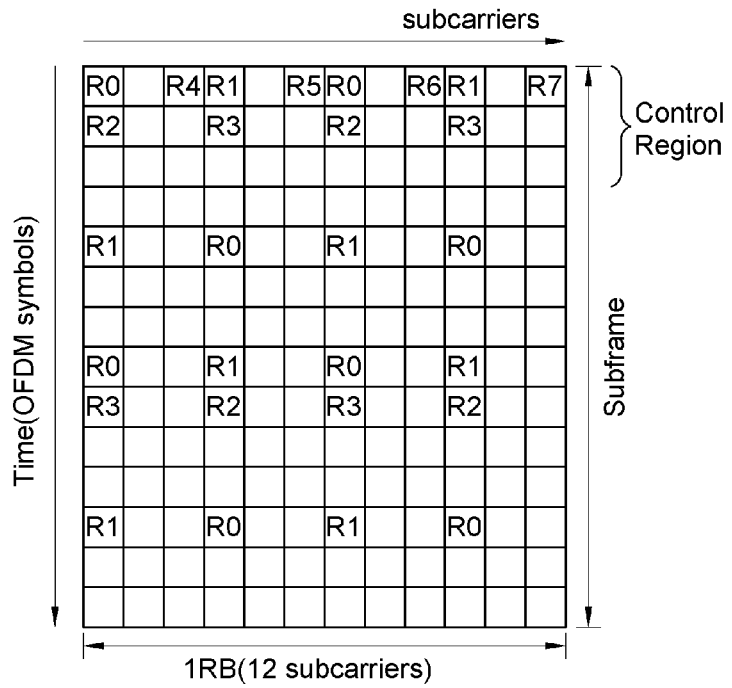
Figure 110:
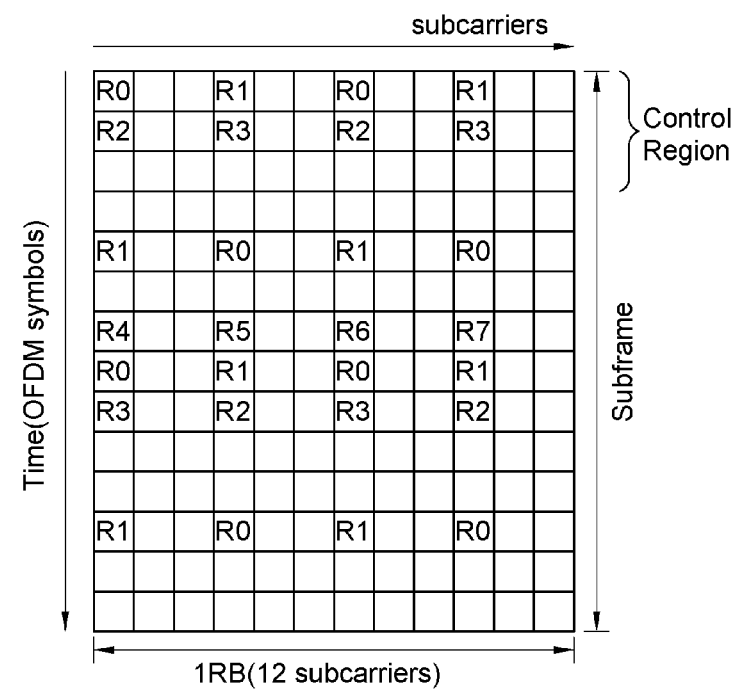
Figure 111:
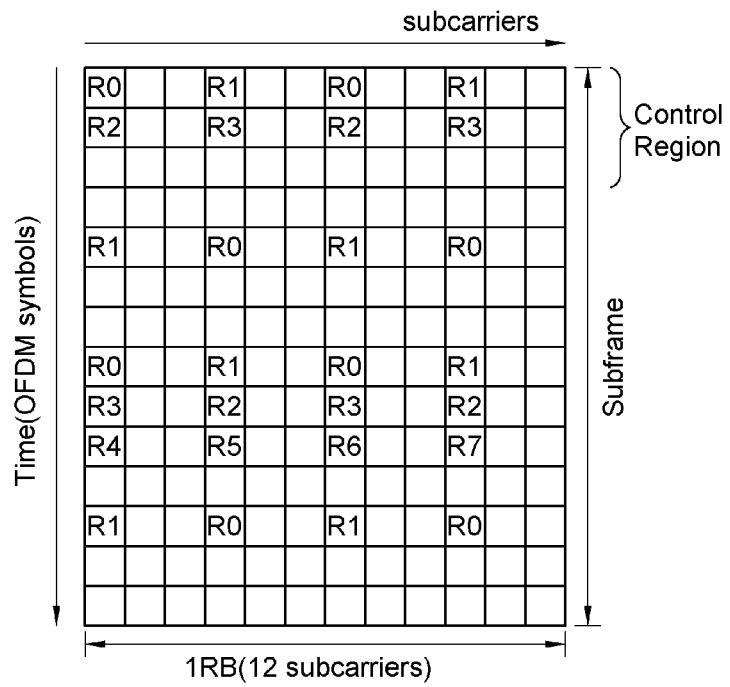
Figure 112:
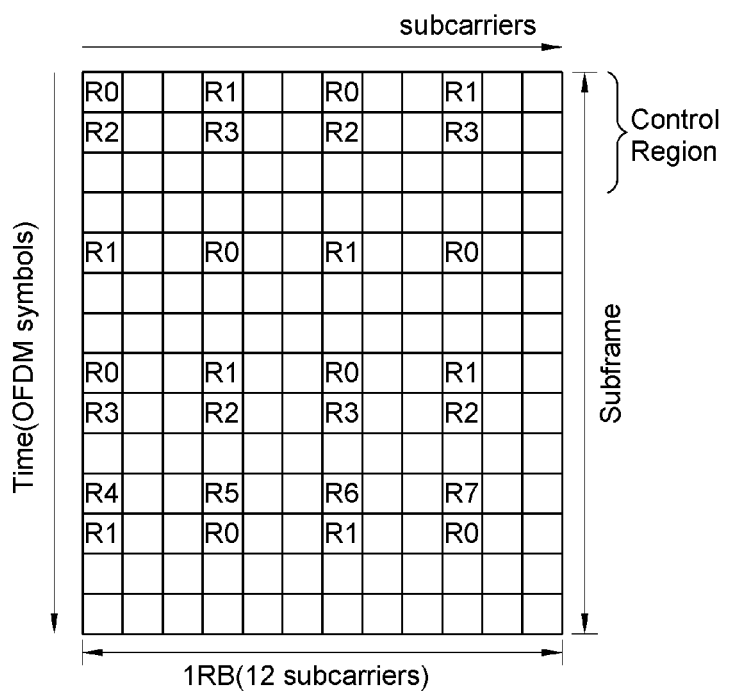
Figure 113:
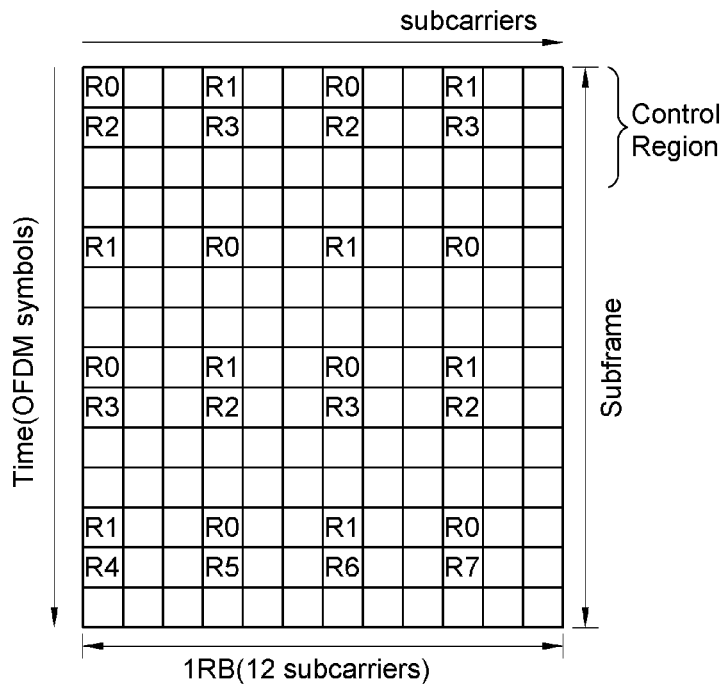
Figure 114:
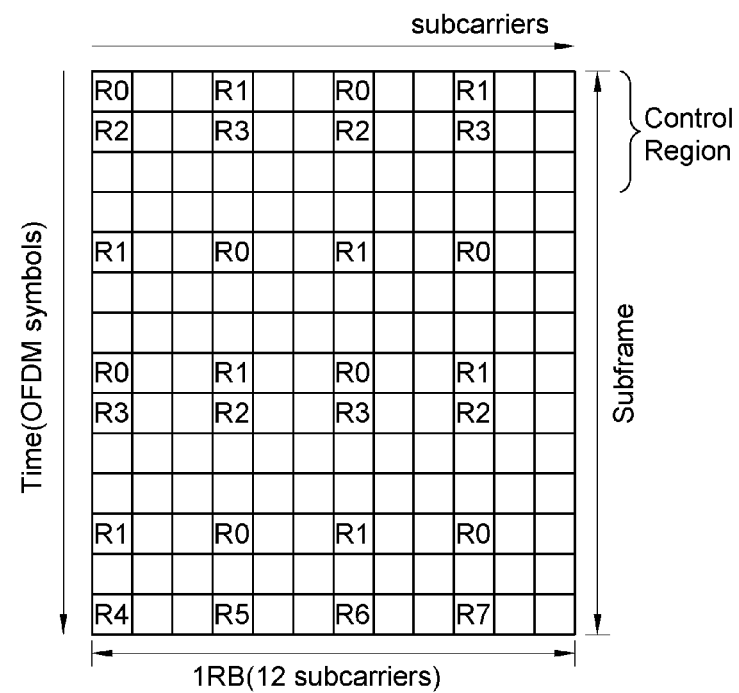
Figure 115:
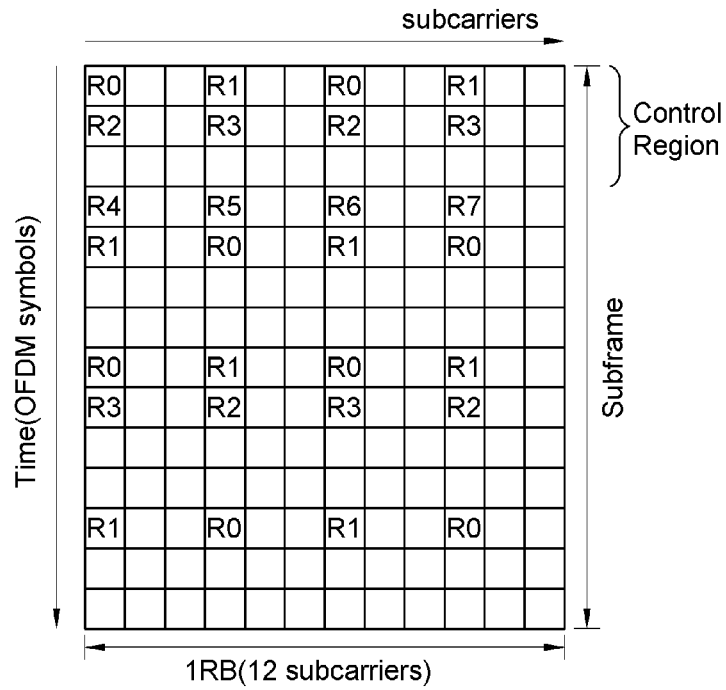
Figure 116:
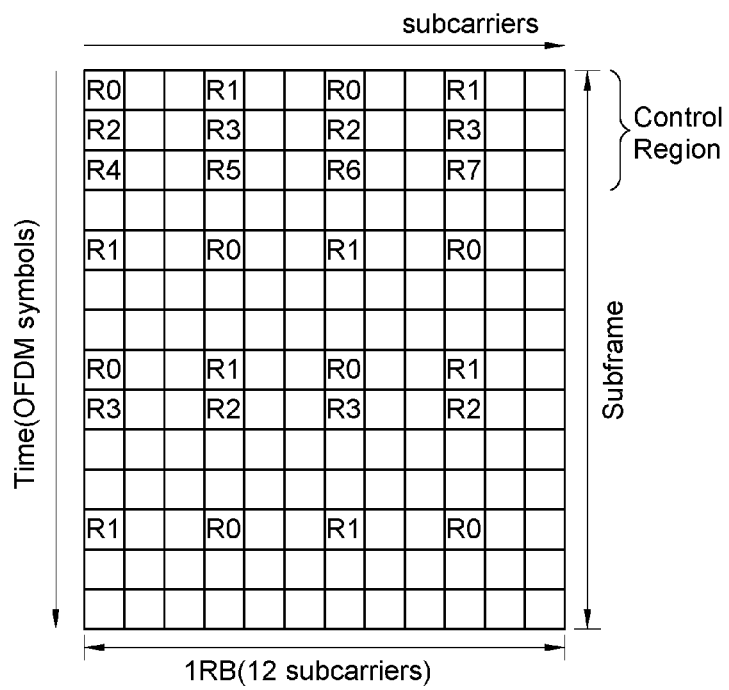

FIG. 82 to FIG. 116 show examples in which reference symbols of the antennas 4 to 7 of FIG. 81 are shifted in a frequency domain and/or a time domain. For example, in FIG. 82, the reference symbols of each of the antennas 4 to 7 are shifted by one subcarrier.

(3) RS Structure Considering Even Power Transmission of Multiple Antennas

In a multiple antenna system, it is effective to use even power transmission in which each antenna has the same Tx power as much as possible. Even power transmission using multiple antennas may result in decrease in implementation cost and improvement in system performance. To enable even power transmission using the multiple antennas, it is preferable that each antenna has the same number of reference symbols in one OFDM symbol.

Figure 117:
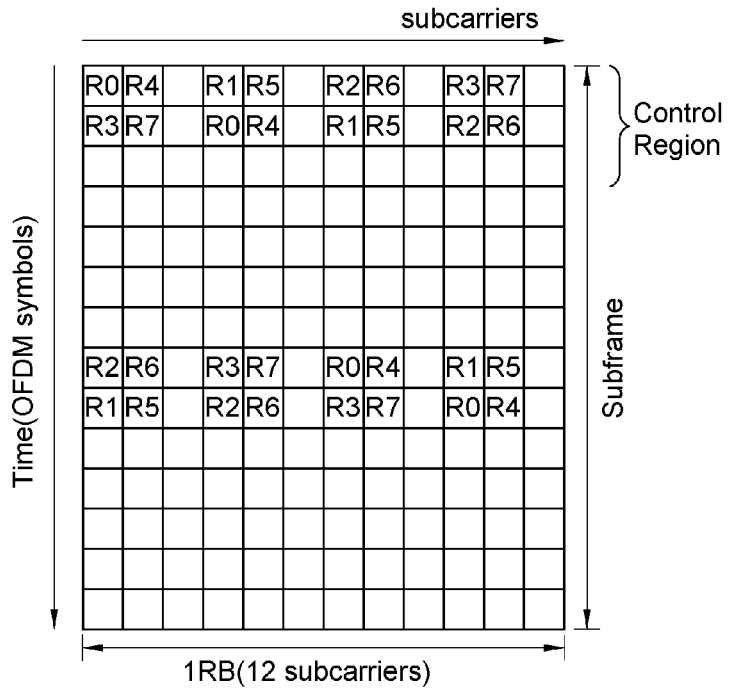
FIG. 117 shows a first example of a reference signal structure considering even power transmission for each antenna.

FIG. 117 shows a first example of an RS structure considering even power transmission for each antenna.

Referring to FIG. 117, 32 resource elements out of 168 resource elements are used as reference symbols. The remaining 136 resource elements can be used as data symbols. A reference symbol overhead is 19%. Antennas 0 to 7 each has one reference symbol in one OFDM symbol. In both 1st and 2nd slots within a subframe, OFDM symbols indexed with 0 and 1 (l=0, 1) include reference symbols. This may lead to deterioration of channel estimation performance in a frequency selective channel or a time selective channel.

Positions of OFDM symbols including reference symbols within the subframe may change. If 14 OFDM symbols are present in a time domain within the subframe, 4 OFDM symbols including reference symbols may be located in any 4 OFDM symbols among the 14 OFDM symbols within the subframe. To improve channel estimation performance in a time selective channel, it is preferable that the OFDM symbols including the reference symbols are spaced apart from one another by an equal spacing as much as possible.

Figure 118:
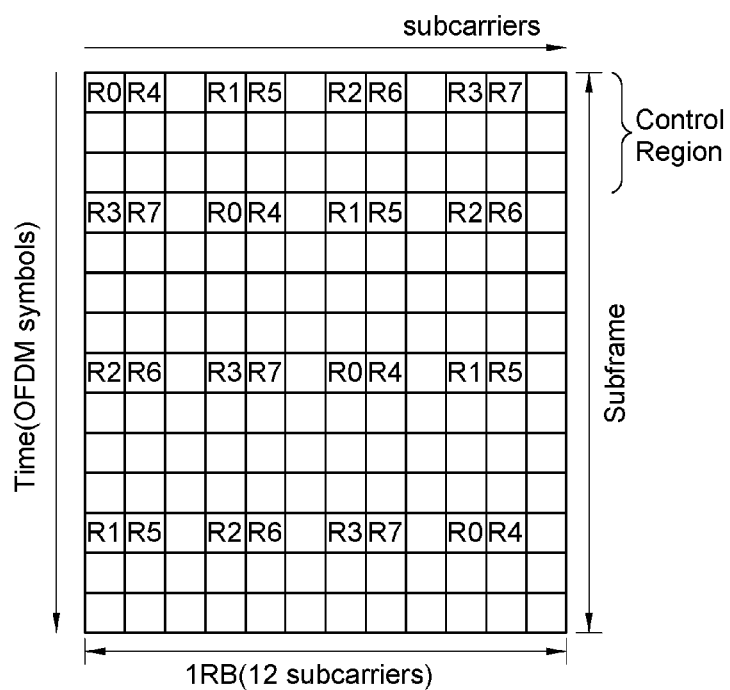
FIG. 118 shows a second example of a reference signal structure considering even power transmission for each antenna.

FIG. 118 shows a second example of an RS structure considering even power transmission for each antenna.

Referring to FIG. 118, positions of OFDM symbols including reference symbols are changed to increase a spacing between the OFDM symbols including the reference symbols of FIG. 117. In a subframe, a 1st slot having OFDM symbols indexed with 0 and 3 (l=0, 3) includes reference symbols, and a 2nd slot having OFDM symbols indexed with 0 and 4 (l=0, 4) includes reference symbols.

(4) RS Structure Considering Power Boosting of Reference Symbol

A BS uses a power boosting scheme of a reference symbol. In the power boosting scheme, Tx power of the reference symbol is used differently according to a cell size or according to positional distribution of UEs within a cell. The power boosting scheme of the reference symbol can achieve system optimization. When using an OFDM-based system, Tx power of a data symbol included in an OFDM symbol including the reference symbol can be additionally carried on the reference symbol to increase the Tx power of the reference symbol. However, if the number of reference symbols included in the OFDM symbol is greater than the number of data symbols, efficiency of the power boosting of the reference symbols deteriorates. This is because there may be insufficient power for increasing the Tx power of the reference symbol. Therefore, if one OFDM symbol includes too many reference symbols, the power boosting of the reference symbol is not effectively achieved.

Figure 119:
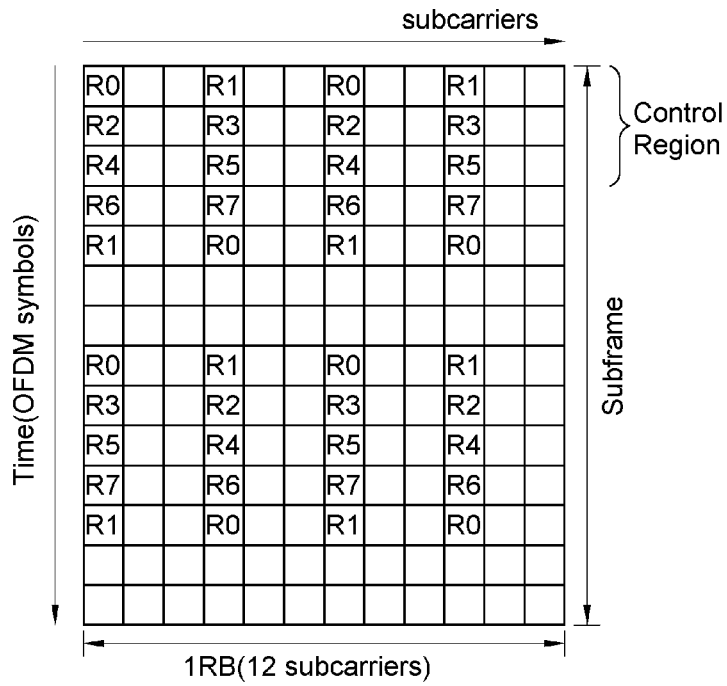
FIG. 119 shows an example of a reference signal structure considering power boosting of a reference symbol.

FIG. 119 shows an example of an RS structure considering power boosting of a reference symbol.

Referring to FIG. 119, 40 resource elements out of 168 resource elements are used as reference symbols. The remaining 128 resource elements can be used as data symbols. A reference symbol overhead is 24%. One OFDM symbol includes two reference symbols for each of two antennas. Therefore, one reference symbol can use up to two data symbols in power boosting. Accordingly, the power boosting of the reference symbol can be performed in a flexible manner.

Figure 55:
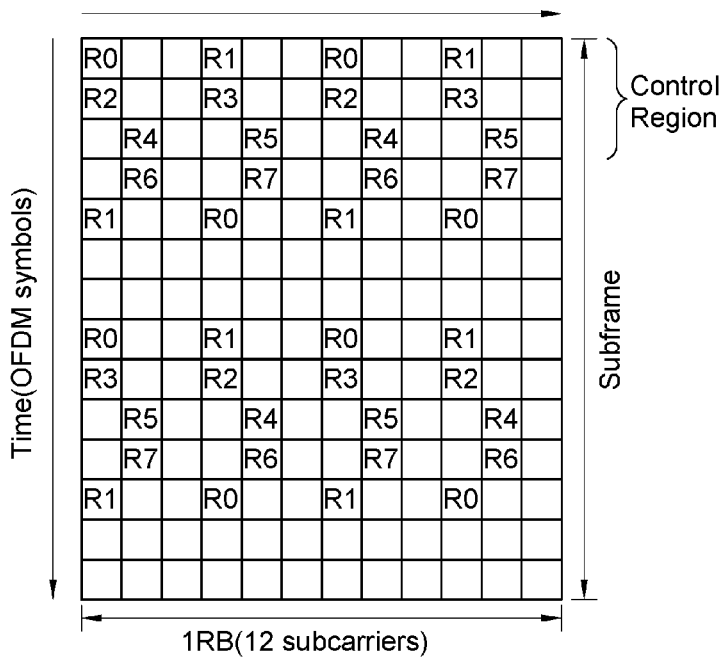
Figure 56:
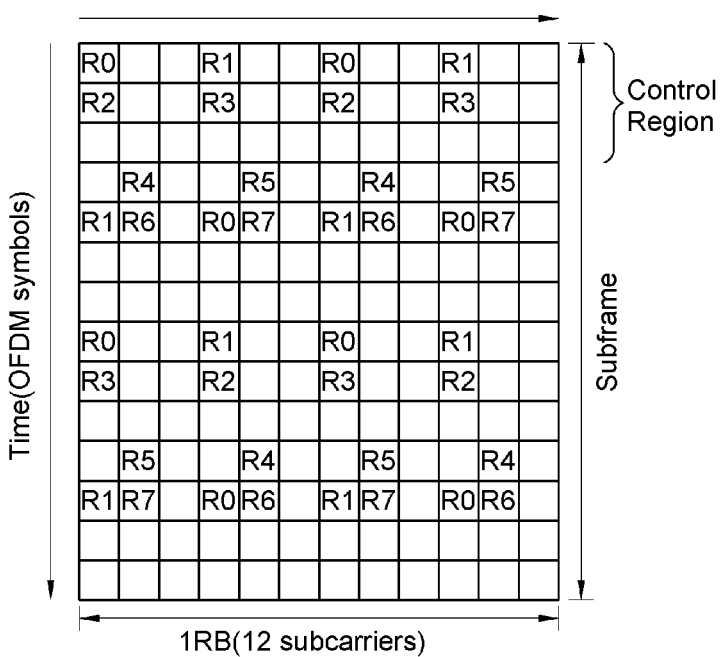
Figure 57:
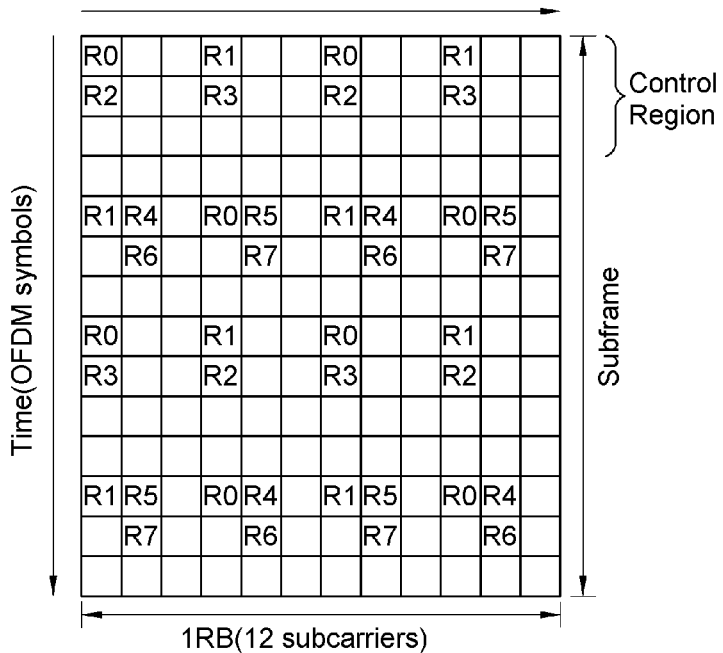
Figure 58:
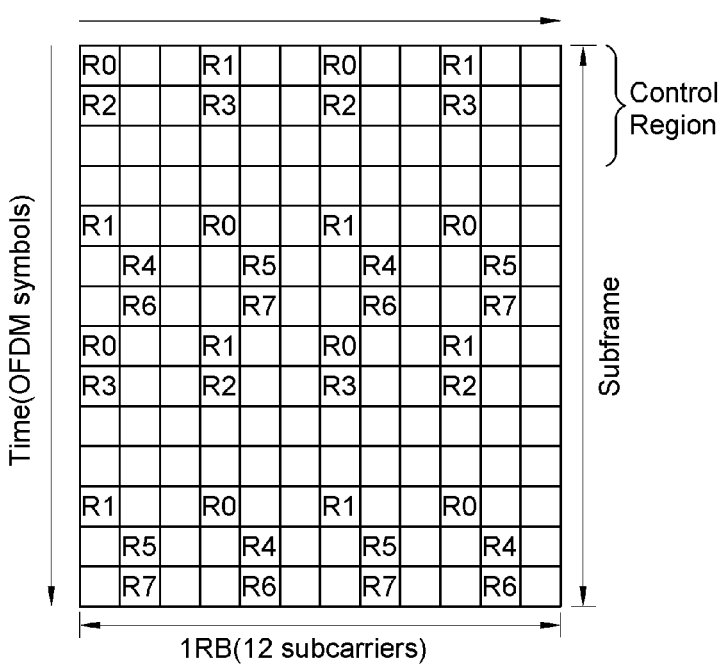
Figure 59:
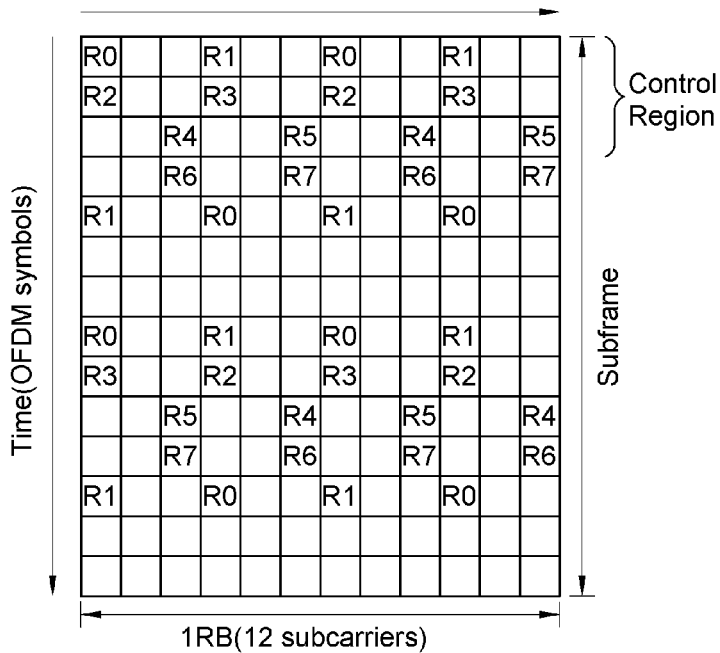
Figure 60:
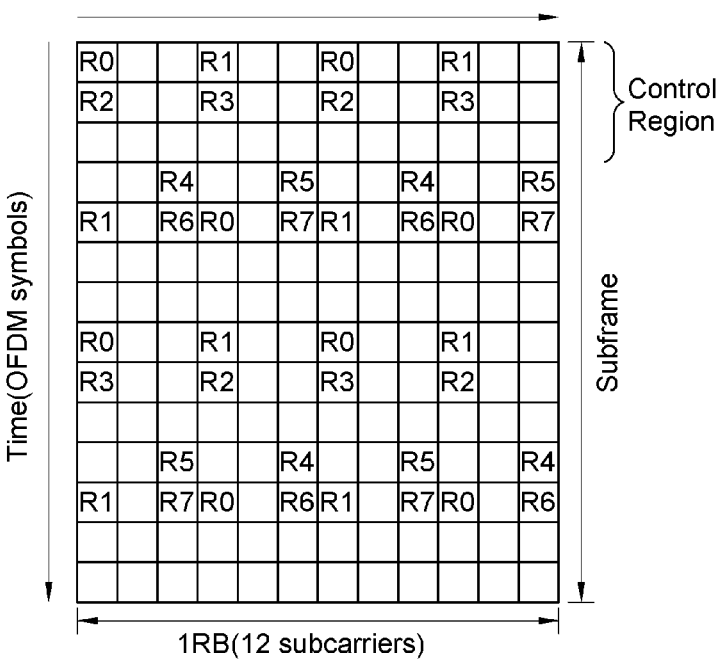
Figure 61:
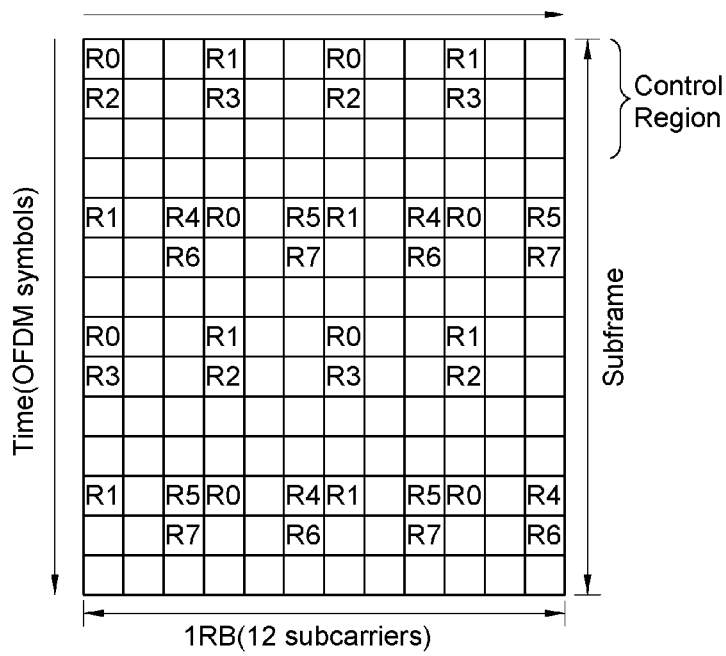

Referring back to FIG. 55, it can be seen that FIG. 55 shows a case where reference symbols of each of the antennas 4 to 7 of FIG. 119 are shifted by one subcarrier. In FIG. 55, power boosting of the reference symbols can also be performed in a flexible manner.

(5) RS Structure Considering Control Region

In the 3GPP LTE system, a maximum of three OFDM symbols located in a front portion of a subframe correspond to a control region to be assigned with a control channel. According to a situation, one, two, or three OFDM symbols are allocated to the control region. The 3GPP LTE is followed by 4th generation wireless communication which is currently being developed. The 4th generation wireless communication aims at support of a high-speed data service of 1 gigabits per second (Gbps) in downlink and 500 megabits per second (Mbps) in uplink. An LTE-advanced (LTE-A) wireless communication system based on the 3GPP LTE has been researched as the 4th generation wireless communication technique.

A newly introduced wireless communication system is compatible with the legacy 3GPP LTE system to provide user convenience and also to provide service providers with a chance of reusing the legacy equipment. Therefore, to maintain compatibility between different wireless communication systems, it is preferable that a control region and an RS structure in the control region are the same as those of the 3GPP LTE system.

In a case where the BS transmits downlink information by using 8 antennas, each of the 8 antennas may not be able to have the same channel estimation performance. Further, a reference symbol overhead may cause insufficient resources capable of transmitting control information. In this case, the control information may be transmitted using only 4 or 2 antennas, and other data information may be transmitted using all of the 8 antennas. For example, reference symbols only for 4 antennas may be transmitted on n OFDM symbols (where n is a natural number) that can be used as a control region within a subframe, and reference symbols for 8 antennas may be transmitted on the remaining OFDM symbols.

Figure 120:
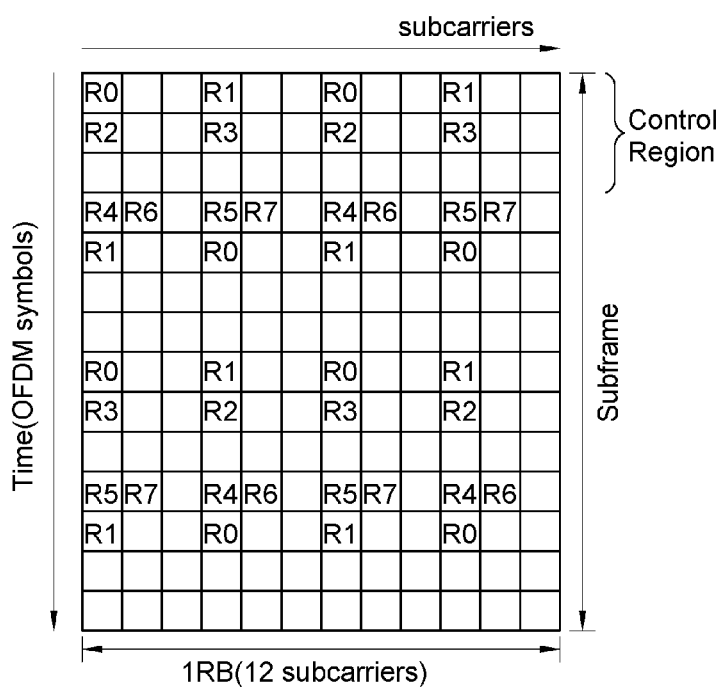
FIG. 120 shows a first example of a reference signal structure considering a control region.
Figure 121:
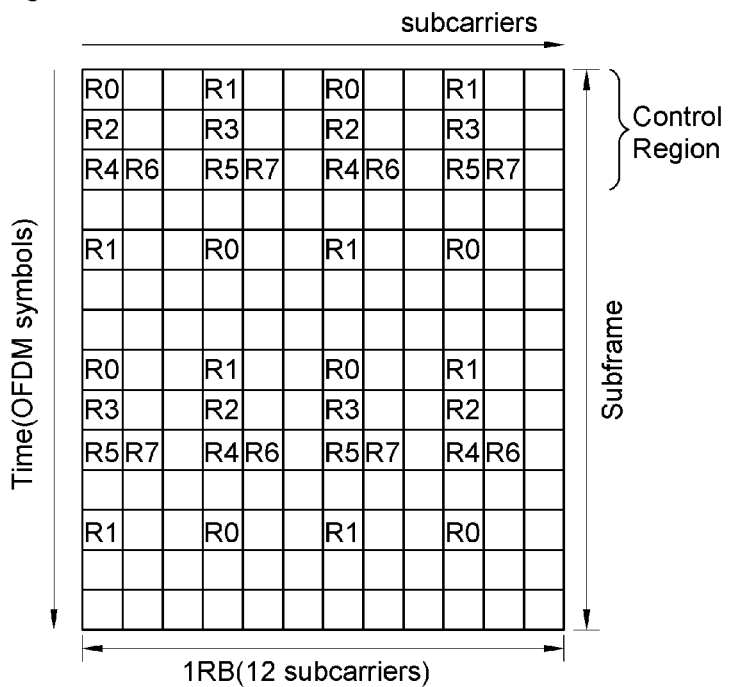
FIG. 121 to FIG. 126 show examples in which reference symbols of antennas 4 to 7 of FIG. 120 are shifted in a frequency domain and/or a time domain.
Figure 122:
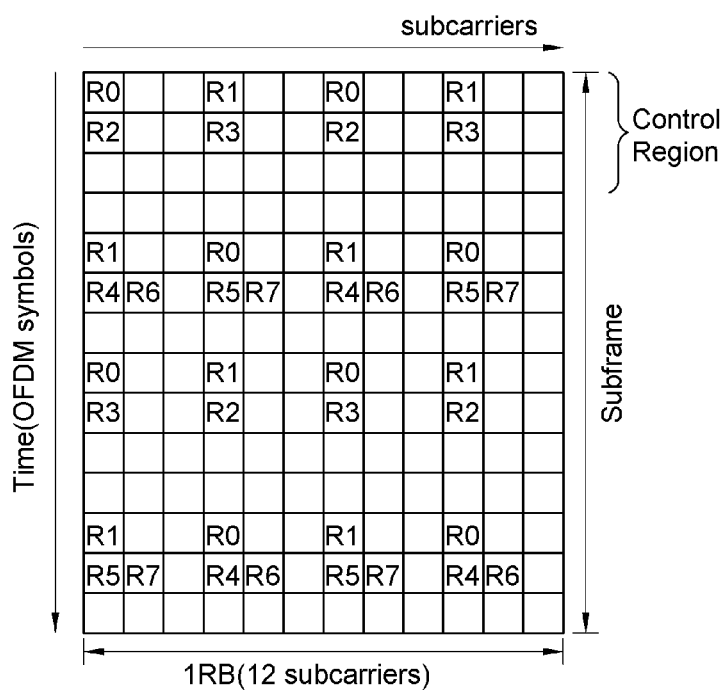
Figure 123:
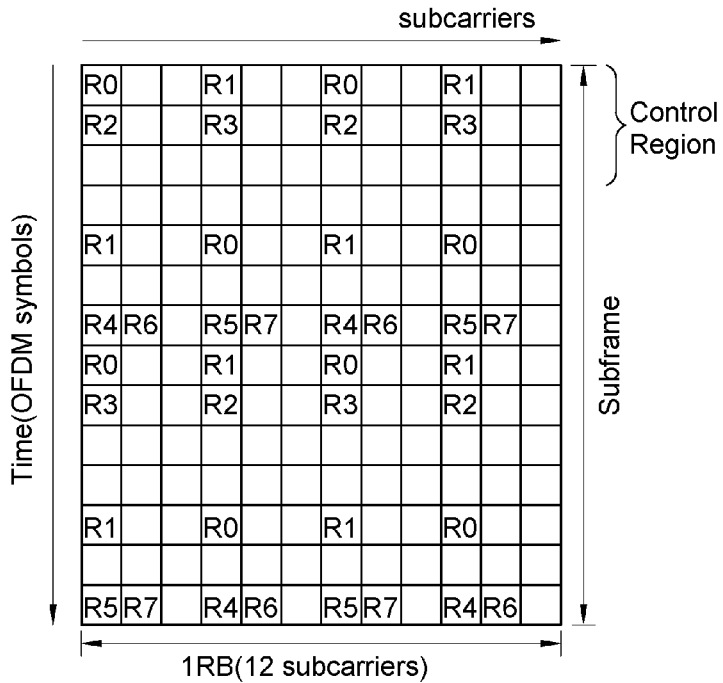
Figure 124:
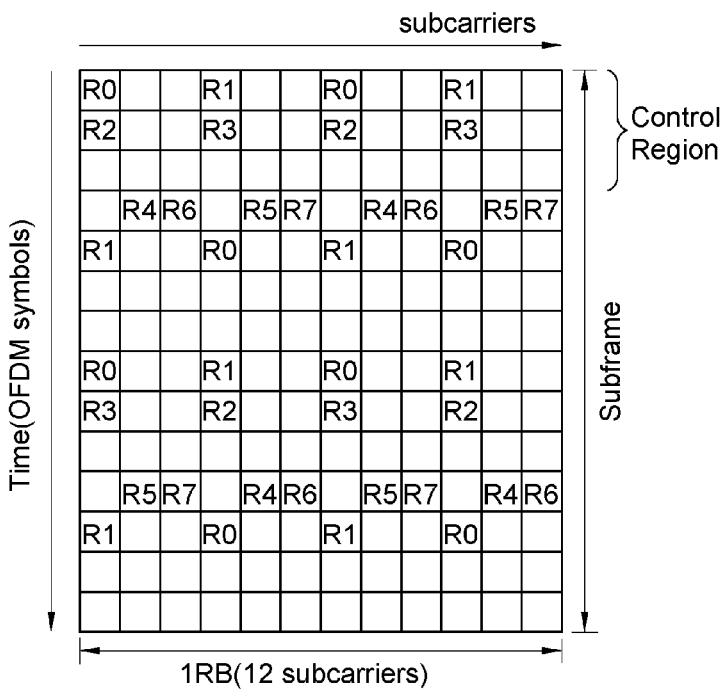
Figure 125:
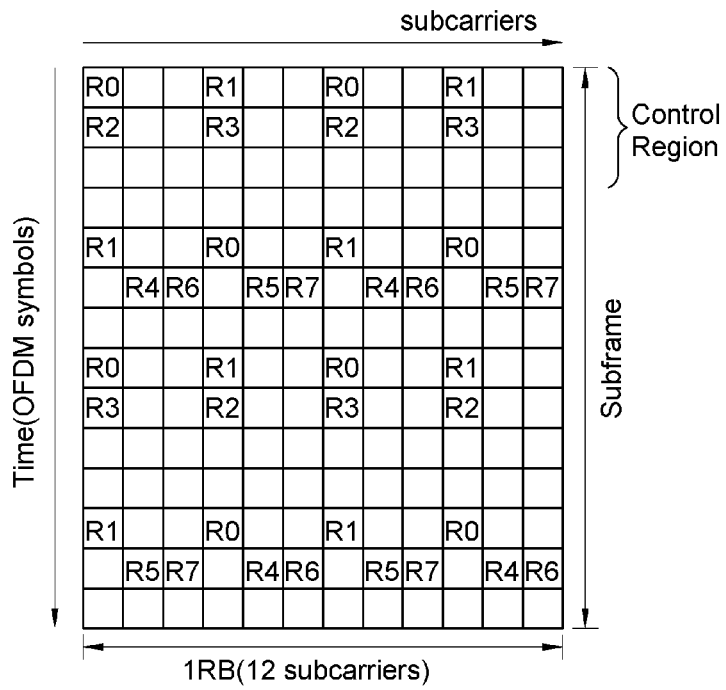
Figure 126:
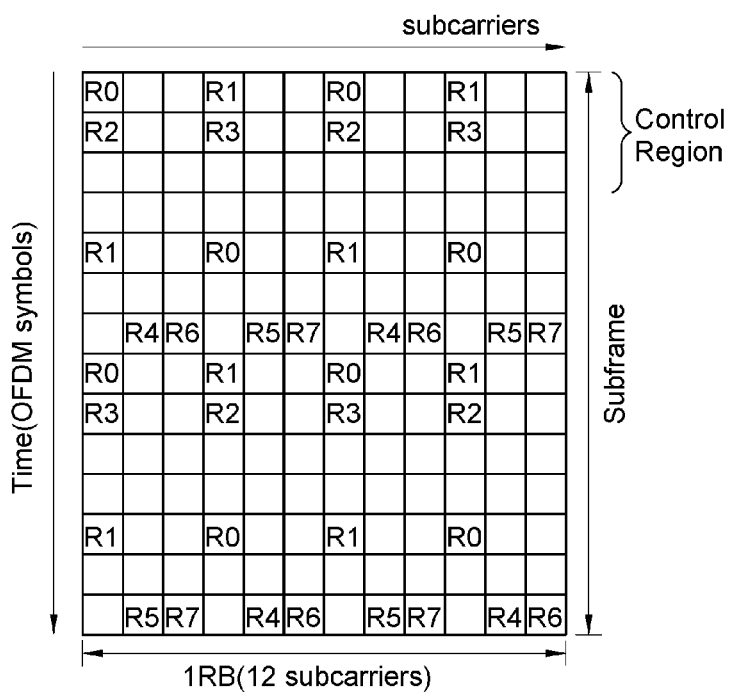
Figure 129:
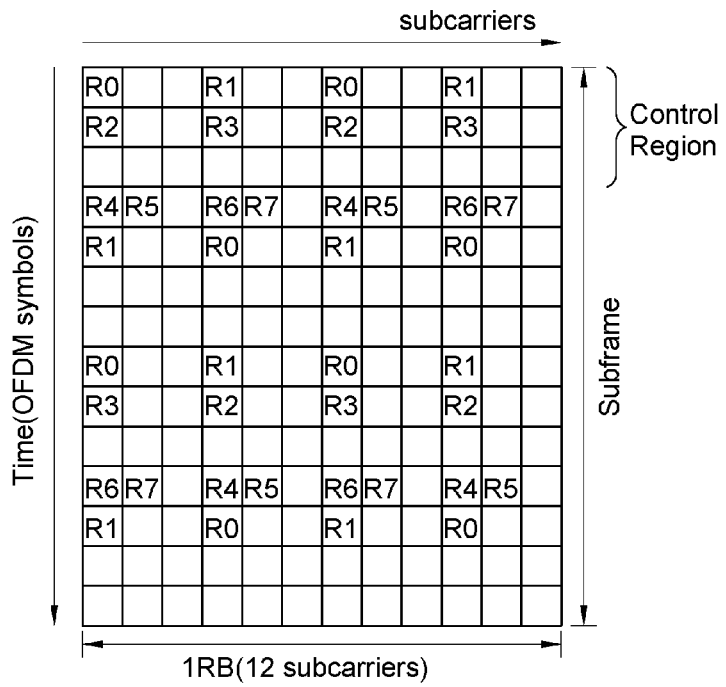

FIG. 120 shows a first example of an RS structure considering a control region.

Referring to FIG. 120, 40 resource elements out of 168 resource elements are used as reference symbols. The remaining 128 resource elements can be used as data symbols. A reference symbol overhead is 24%. Similarly to the 3GPP LTE system, three OFDM symbols in a front portion of a 1st slot within a subframe can be used as a control region. The RS structure in the control region is the same as that of the 3GPP LTE system. In the control region, reference symbols for antennas 4 to 7 are not transmitted. Therefore, control information and data information have different reliability from each other. The number of reference symbols, a reference symbol spacing in a frequency domain and a reference symbol spacing in a time domain of each of the antennas 4 to 7 are the same as those of each of antennas 2 and 3. Accordingly, the reference symbol overhead can be minimized.

Reference symbols of the antennas 4 to 7 may be interchanged in their positions. A position of an OFDM symbol including the reference symbols of the antennas 4 to 7 may also be changed to a position of another OFDM symbol other than the control region. However, it is preferable to maintain a spacing between OFDM symbols including the reference symbols of the antennas 4 to 7. This is to perform channel estimation through multi-subframe interpolation. The reference symbols of the antennas 4 to 7 may be shifted on a subcarrier basis or an OFDM symbol basis.

FIG. 121 to FIG. 126 show examples in which reference symbols of the antennas 4 to 7 of FIG. 120 are shifted in a frequency domain and/or a time domain. For example, in FIG. 121, the reference symbols of each of the antennas 4 to 7 are shifted by one OFDM symbol.

Figure 130:
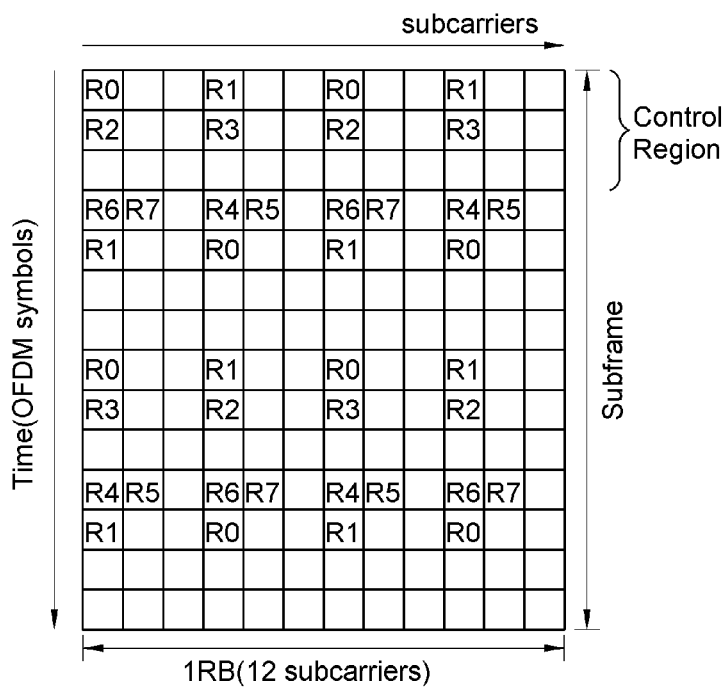
Figure 131:
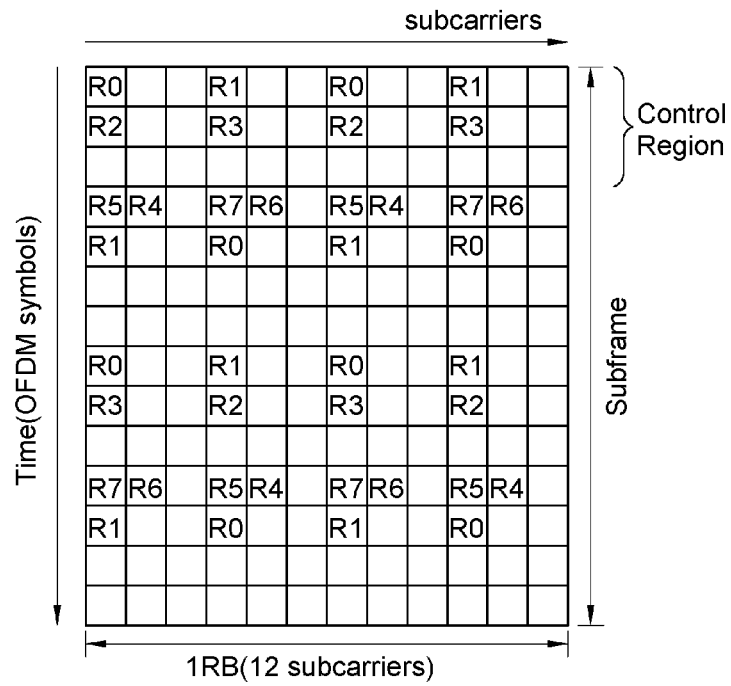
Figure 132:
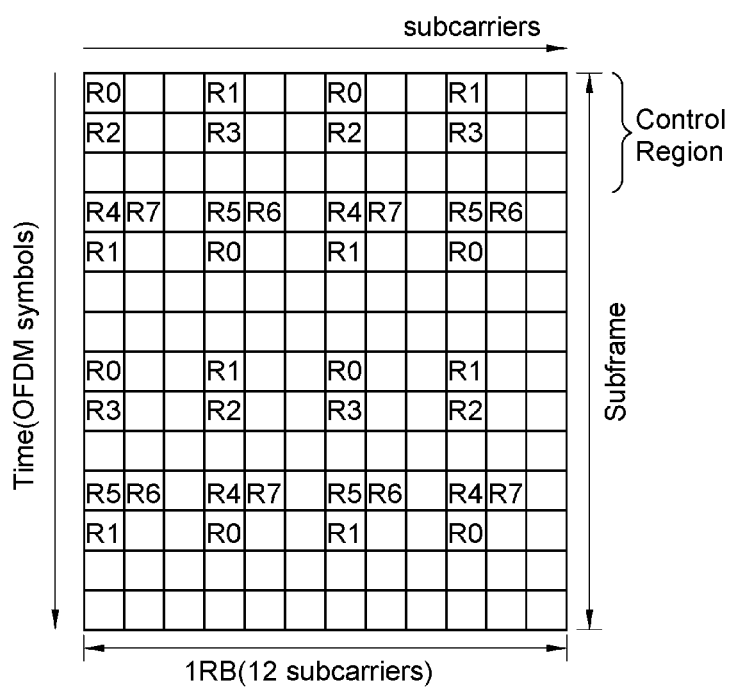
Figure 133:
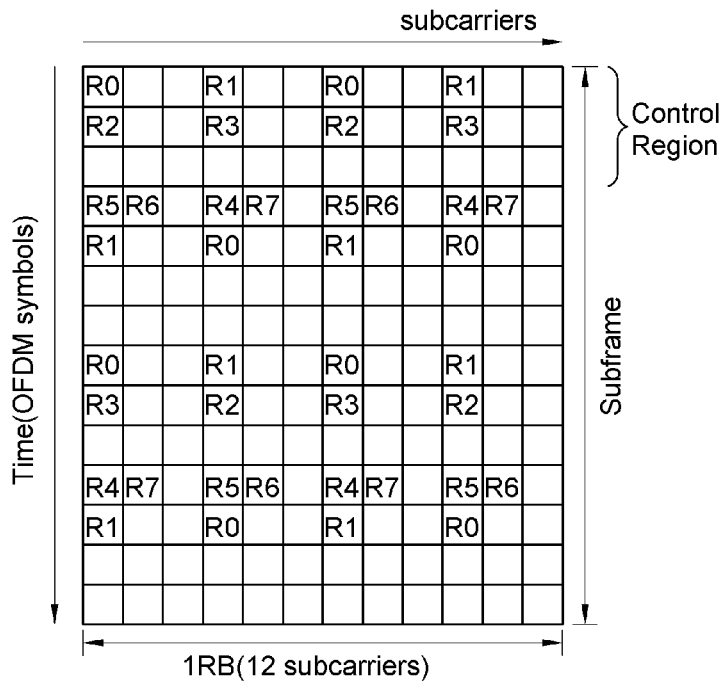
Figure 134:
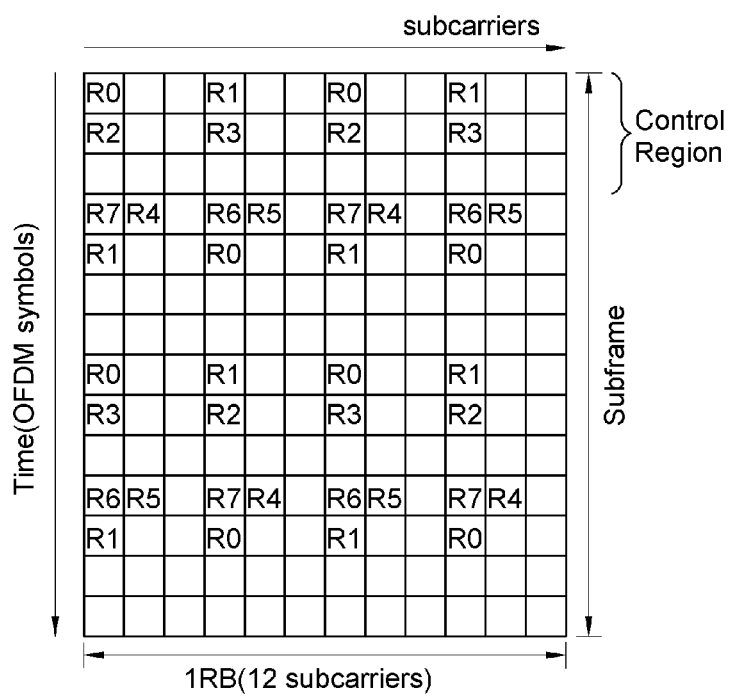
Figure 135:
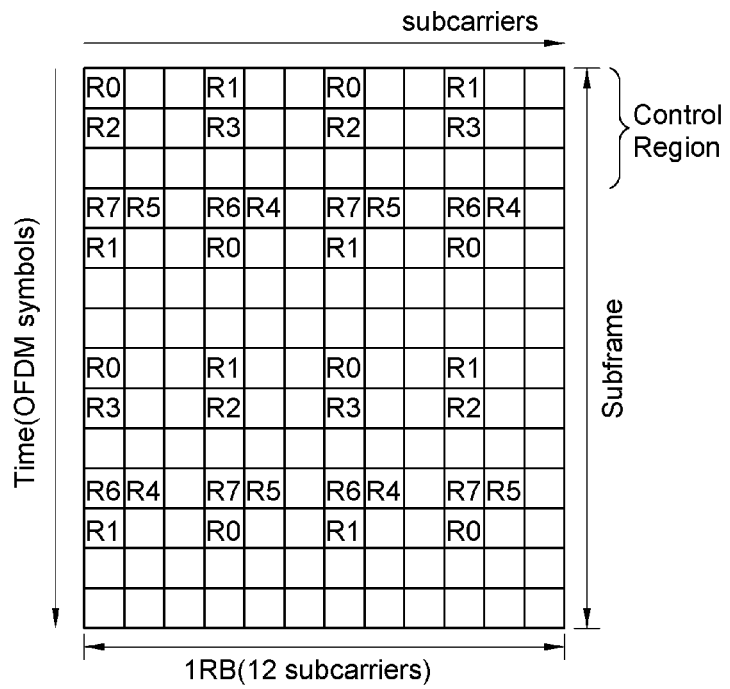
Figure 136:
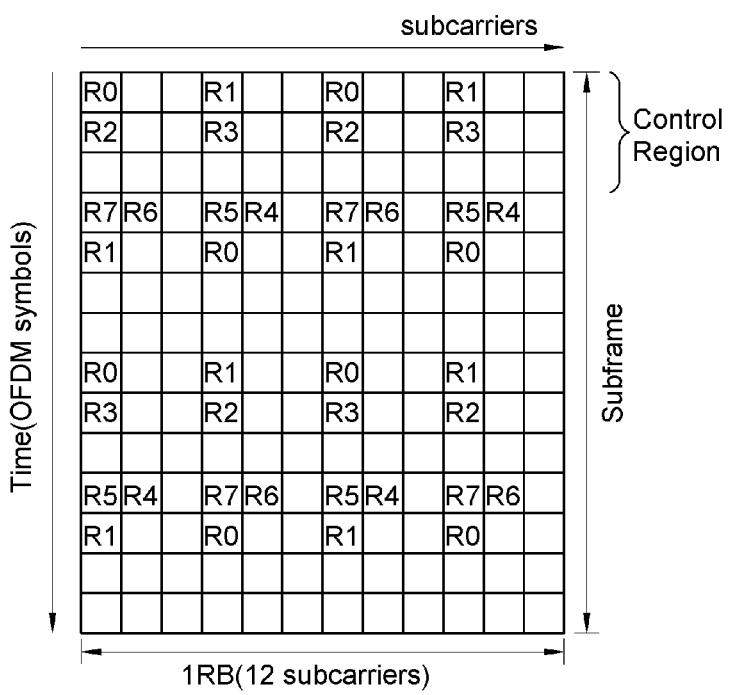
Figure 137:
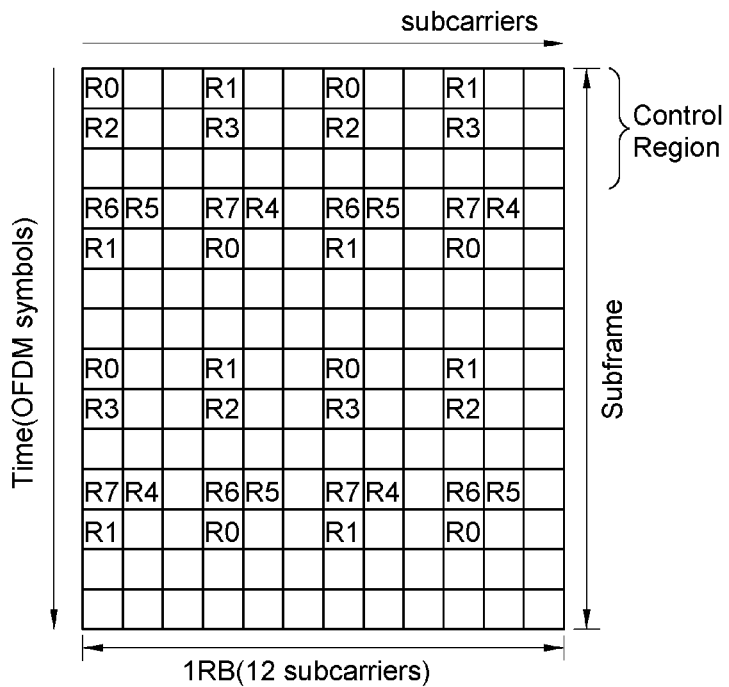

FIG. 127 to FIG. 137 show examples in which reference symbols of the antennas 4 to 7 of FIG. 120 are interchanged in their positions. For example, in FIG. 127, R4 and R6 of FIG. 120 are interchanged in their positions, and R5 and R7 of FIG. 120 are interchanged in their positions. In FIG. 130, positions of R4, R5, and R6, and R7 of FIG. 120 are respectively changed to positions of R6, R4, R7, and R5 of FIG. 120.

However, an OFDM symbol including reference symbols of antennas 0 and 1 includes 4 reference symbols. An OFDM symbol including reference symbols of antennas 2 and 3 also includes 4 reference symbols. An OFDM symbol including reference symbols of the antennas 4 to 7 includes 8 reference symbols. Reference symbol boosting can be easily performed in an OFDM symbol including the reference symbols of the antennas 0 and 1 or the antennas 2 and 3. However, a data symbol that can be used in power boosting is limited in an OFDM symbol including the reference symbols of the antennas 4 to 7. Therefore, the reference symbol boosting may not be easily performed in the OFDM symbol including the reference symbols of the antennas 4 to 7.

Figure 138:
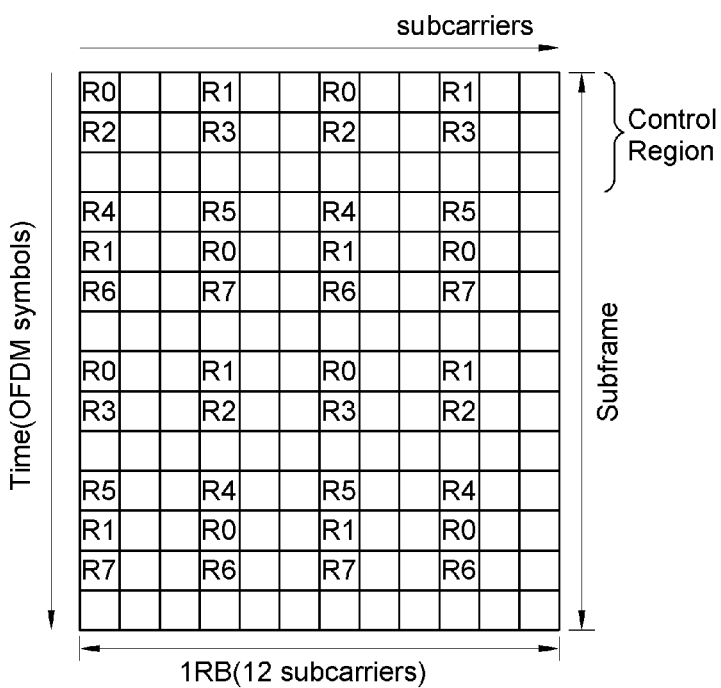
FIG. 138 shows a second example of a reference signal structure considering a control region.

FIG. 138 shows a second example of an RS structure considering a control region.

Referring to FIG. 138, 40 resource elements out of 168 resource elements are used as reference symbols. The remaining 128 resource elements can be used as data symbols. A reference symbol overhead is 24%. Each OFDM symbol including reference symbols has the same number of reference symbols. An OFDM symbol including reference symbols of antennas 4 and 5 or antennas 6 and 7 includes 4 reference symbols. That is, an RS structure using the antennas 4 and 5 or the antennas 6 and 7 is the same as an RS structure using the antennas 2 and 3. Therefore, reference symbol boosting is easier than the case of FIG. 120. In addition, since a channel estimation scheme can be simply reused, complexity of a receiver can be reduced. The reference symbols of the antennas 4 to 7 may be shifted on a subcarrier basis or an OFDM symbol basis. However, it is preferable to maintain a frequency spacing and a time spacing between reference symbols of each antennas.

Figure 139:
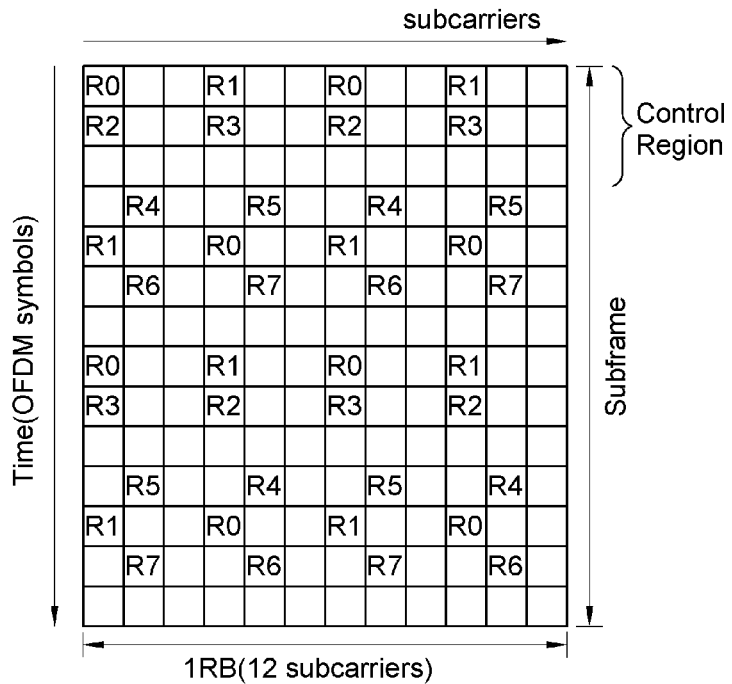
FIG. 139 and FIG. 140 show examples in which reference symbols of antennas 4 to 7 of FIG. 138 are shifted in a frequency domain.
Figure 140:
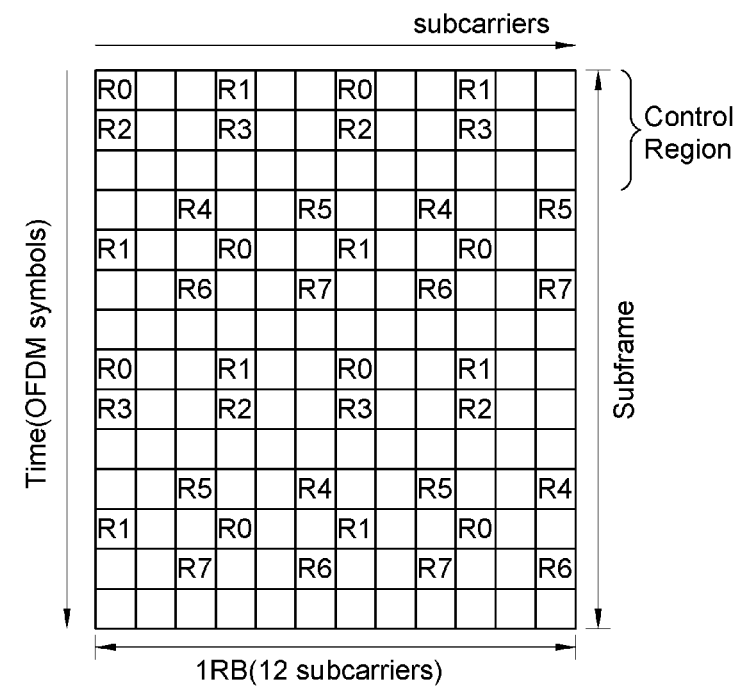

FIG. 139 and FIG. 140 show examples in which reference symbols of the antennas 4 to 7 of FIG. 138 are shifted in a frequency domain. In FIG. 139 and FIG. 140, the reference symbols of the antennas 4 to 7 of FIG. 138 are shifted by one subcarrier and two subcarriers, respectively.

However, reference symbols of the antennas 0 to 7 are included in remaining OFDM symbol other than 4 OFDM symbols. Although this may facilitate reference symbol boosting, too many OFDM symbols may be demodulated when channel estimation is performed.

Figure 141:
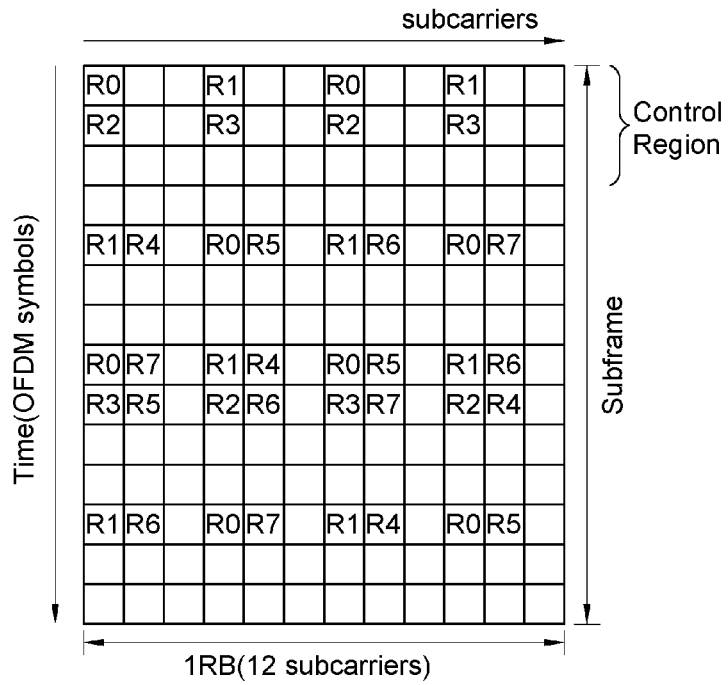
FIG. 141 shows a third example of a reference signal structure considering a control region.

FIG. 141 shows a third example of an RS structure considering a control region.

Referring to FIG. 141, 40 resource elements out of 168 resource elements are used as reference symbols. The remaining 128 resource elements can be used as data symbols. A reference symbol overhead is 24%. The number of OFDM symbols including reference symbols is 6. In comparison with FIG. 138, reference symbol boosting is slightly limited, but the number of OFDM symbols including reference symbols is small. As such, the number of OFDM symbols including reference signals can be limited while flexibility is slightly limited in the reference symbol boosting.

Reference symbols of the antennas 4 to 7 may be interchanged in their positions, and a rotation type may also be changed.

Figure 142:
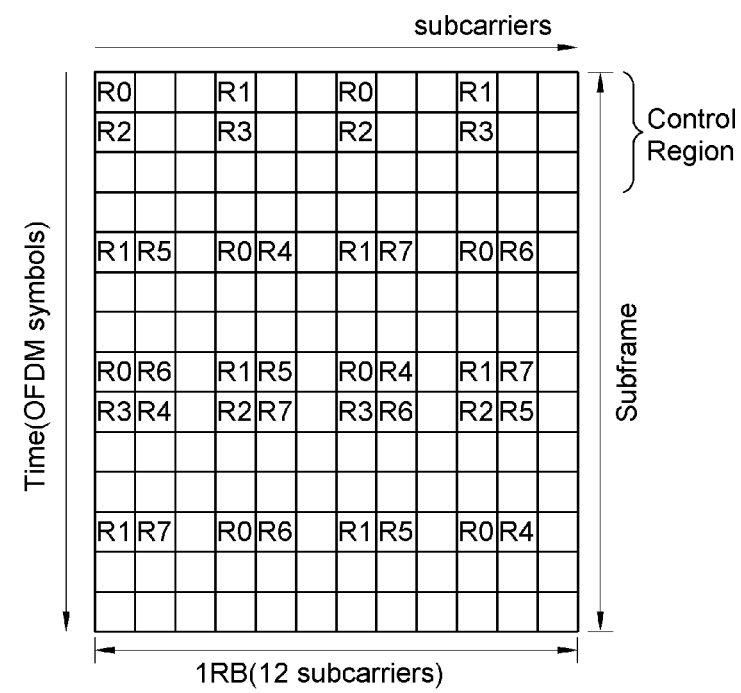
FIG. 142 to FIG. 144 show examples in which reference symbols of antennas 4 to 7 of FIG. 141 are interchanged in their positions.
Figure 143:
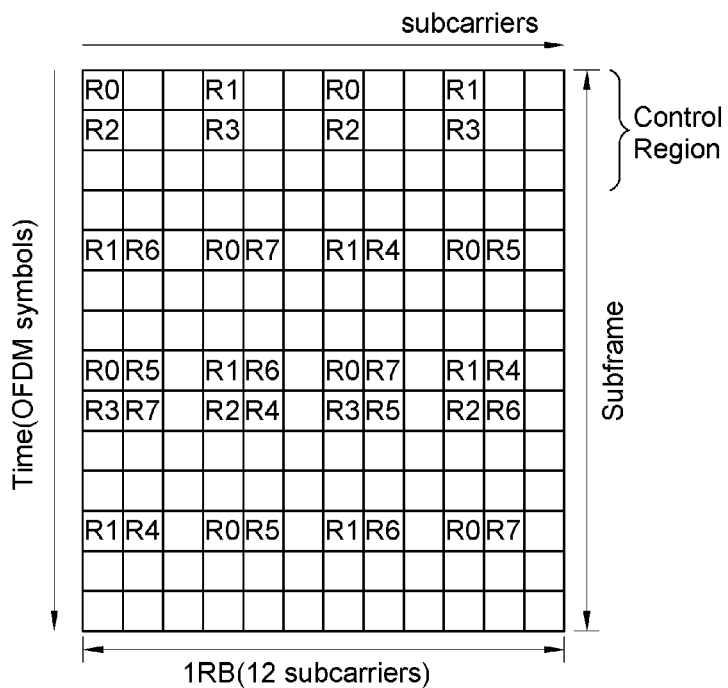
Figure 144:
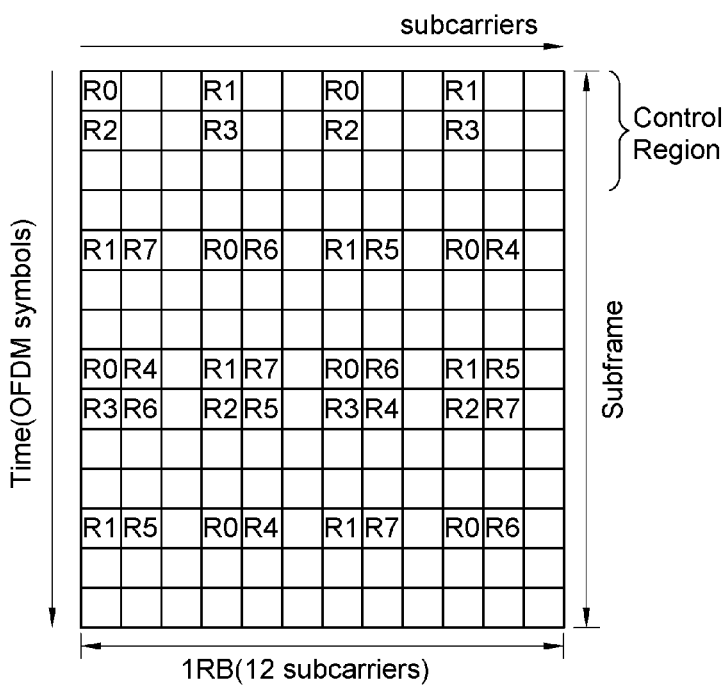

FIG. 142 to FIG. 144 show examples in which reference symbols of the antennas 4 to 7 of FIG. 141 are interchanged in their positions. For example, in FIG. 142, R4 and R5 of FIG. 141 are interchanged in their positions, and R6 and R7 of FIG. 141 are interchanged in their positions.

Figure 145:
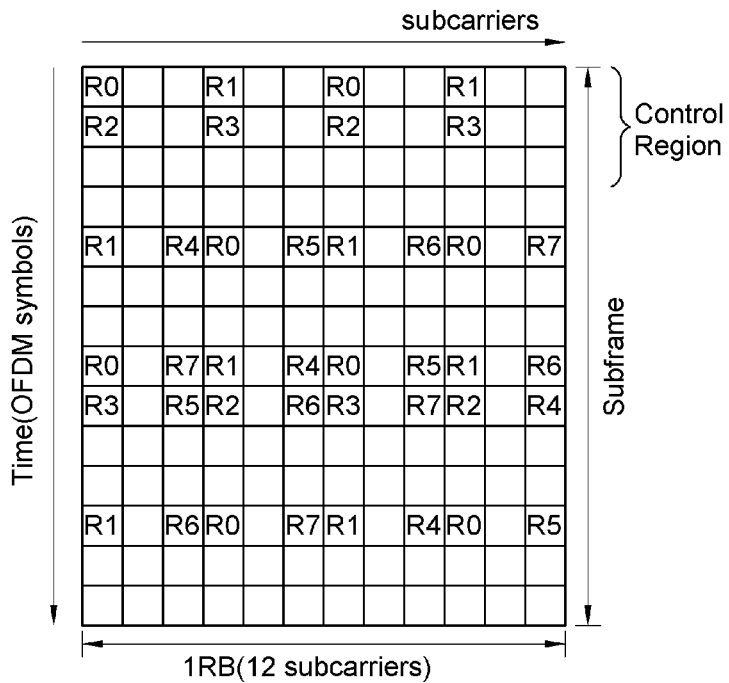
FIG. 145 shows an example in which reference symbols of antennas 4 to 7 of FIG. 141 are shifted by one subcarrier.
Figure 146:
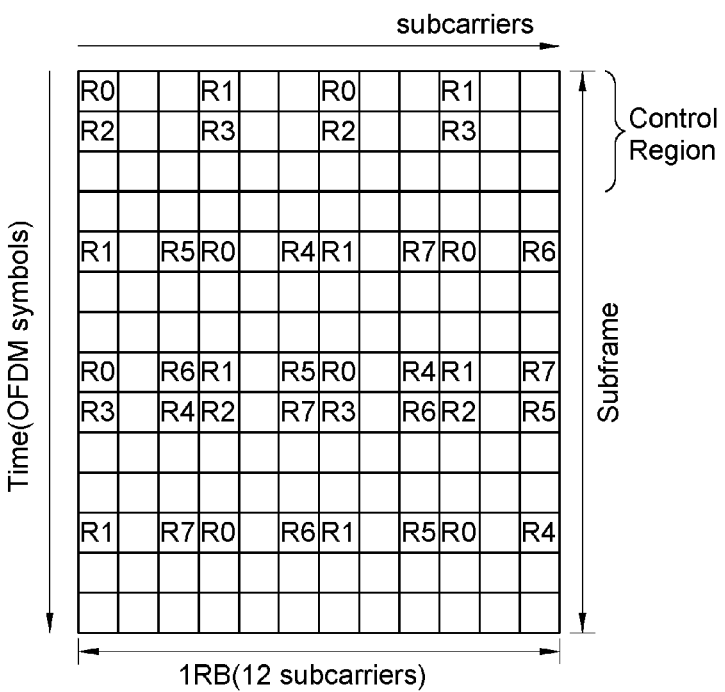
FIG. 146 to FIG. 148 show examples in which reference symbols of antennas 4 to 7 of FIG. 145 are interchanged in their positions.
Figure 147:
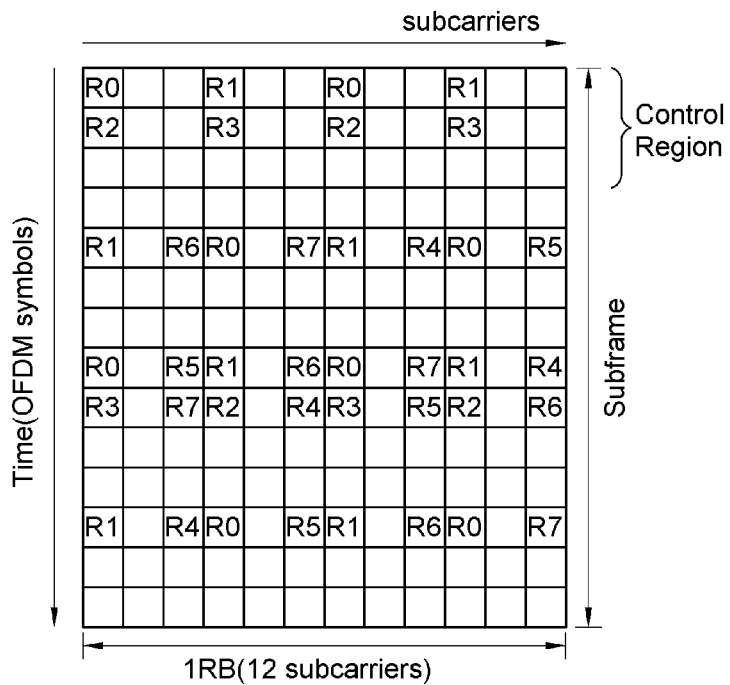
Figure 148:
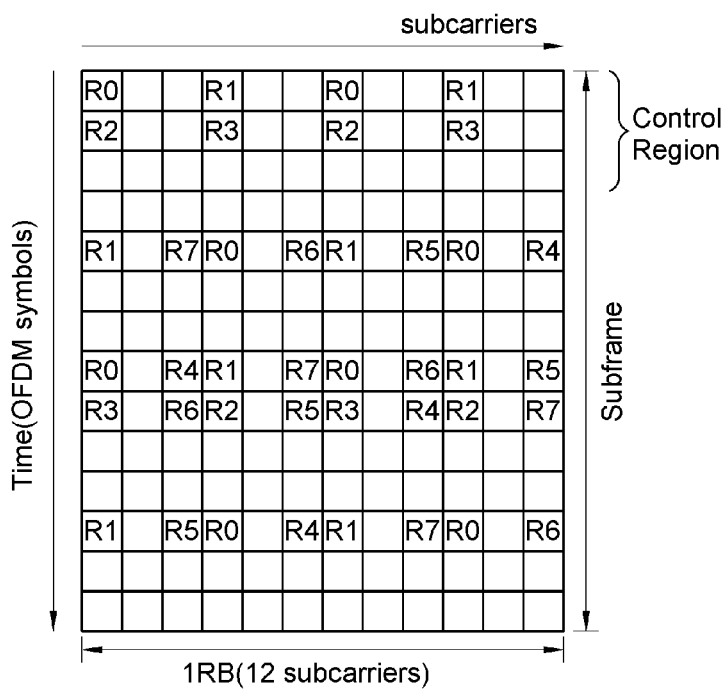

FIG. 145 shows an example in which reference symbols of the antennas 4 to 7 of FIG. 141 are shifted by one subcarrier. FIG. 146 to FIG. 148 show examples in which reference symbols of the antennas 4 to 7 of FIG. 145 are interchanged in their positions. For example, in FIG. 146, R4 and R5 of FIG. 145 are interchanged in their positions, and R6 and R7 of FIG. 145 are interchanged in their positions.

Figure 149:
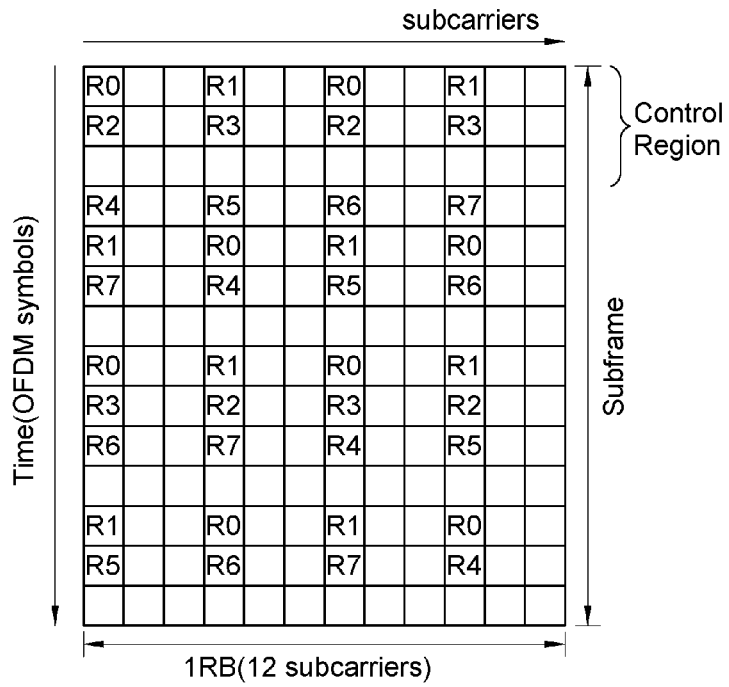
FIG. 149 shows a fourth example of a reference signal structure considering a control region.

FIG. 149 shows a fourth example of an RS structure considering a control region.

Referring to FIG. 149, 40 resource elements out of 168 resource elements are used as reference symbols. The remaining 128 resource elements can be used as data symbols. A reference symbol overhead is 24%. Each OFDM symbol including reference symbols has the same number of reference symbols. Thus, reference symbol boosting can be easily performed. In addition, antennas 4 to 7 each has one reference symbol in one OFDM symbol. Therefore, even power transmission is possible among the antennas 4 to 7.

In addition thereto, various forms of RS structures can be further considered.

Figure 150:
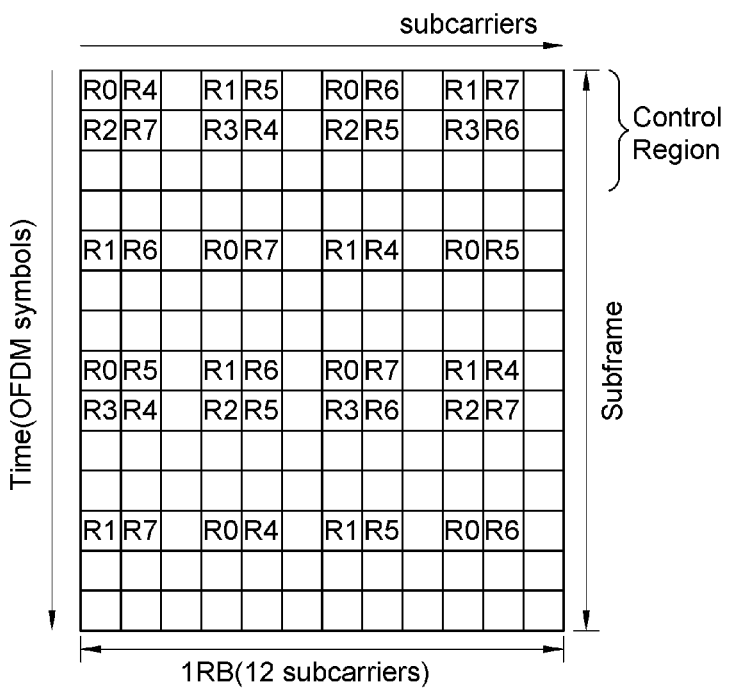
FIG. 150 shows an example of a reference signal structure when using 8 antennas.

FIG. 150 shows an example of an RS structure when using 8 antennas.

Referring to FIG. 150, 48 resource elements out of 168 resource elements are used as reference symbols. The remaining 120 resource elements can be used as data symbols. A reference symbol overhead is 29%. Antennas 4 to 7 each has the same number of reference symbols. Therefore, the antennas 4 to 7 each has similar channel estimation performance. Further, even power transmission is possible among the antennas 4 to 7.

Figure 151:
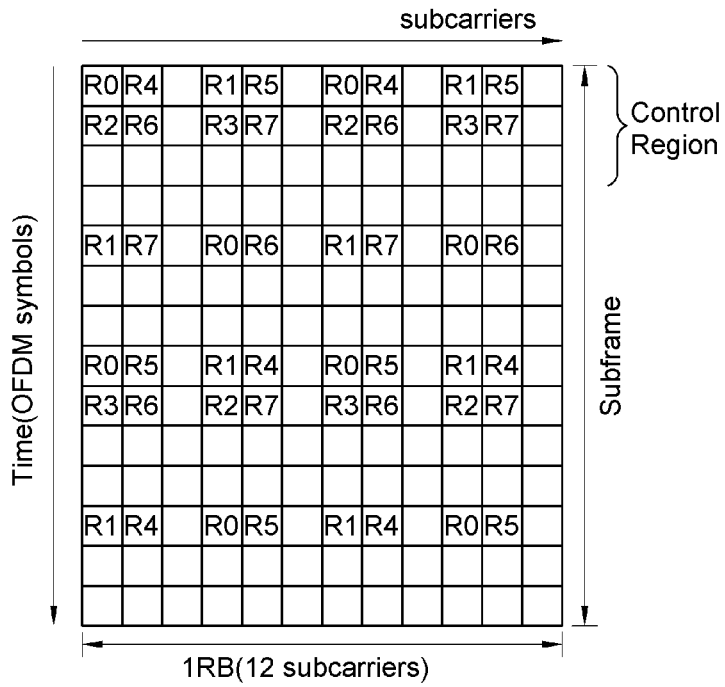
FIG. 151 shows another example of a reference signal structure when using 8 antennas.

FIG. 151 shows another example of an RS structure when using 8 antennas.

Referring to FIG. 151, 48 resource elements out of 168 resource elements are used as reference symbols. The remaining 120 resource elements can be used as data symbols. A reference symbol overhead is 29%. Antennas 4 to 7 each has the same number of reference symbols. Therefore, the antennas 4 to 7 each has similar channel estimation performance.

In a case described up to now, reference signals of each antenna are transmitted by being divided in a frequency domain and/or a time domain according to the FDM and the TDM. In this manner, interference between the reference signals of each antenna is avoided.

Next, a case where reference signals are transmitted through multiple antennas according to the CDM in addition to the FDM and the TDM will be described. In this case, resource elements used for transmission of the reference signals of each antenna may overlap. Hereinafter, Px denotes a resource element to which the reference signals are mapped, where x is any one value selected from 1, 2, . . . , 8.

When a reference signal sequence is used for reference symbols, the length of the reference signal sequence corresponds to the number of reference symbols for one antenna in one OFDM symbol. For example, if it is assumed that the number of reference symbols for one antenna in one OFDM symbol is Np, a 1st sequence having a length of Np is used as a reference signal sequence for the one antenna. A resource element using a reference symbol for the one antenna (i.e., a first antenna) may be multiplexed with a reference symbol for another antenna (i.e., a second antenna). In this case, a 2nd sequence is used as a reference signal sequence in the reference symbol for the second antenna. The 2nd sequence may be a sequence having a length of Np and orthogonal to the 1st sequence. When the 1st sequence and the 2nd sequence are orthogonal to each other, a UE can recover the 1st sequence and the 2nd sequence without interference. If the 1st sequence and the 2nd sequence are orthogonal to each other, any sequence can be used as the 1st sequence and the 2nd sequence. In addition, the 2nd sequence may use a sequence having a low correlation with the 1st sequence.

In general, the reference signal sequence is a random sequence. Hereinafter, the 1st sequence is referred to as a pseudo-random sequence 1 (PN1), and the 2nd sequence is referred to as a pseudo-random sequence 2 (PN2). For example, the PN2 may be obtained by cyclic-shifting or delaying the PN1 in a time domain. When cyclic shifting is performed in the time domain, the PN2 is configured in a form in which the PN1 is multiplied by a phase shift sequence in a frequency domain.

In FIG. 152 to FIG. 155 described below, R0 and R4 are multiplexed on P1. R1 and R5 are multiplexed on P2. R2 and R6 are multiplexed on P3. R3 and R7 are multiplexed on P4. R0, R1, R2, and R3 each use the PN1 as the reference signal sequence. R4, R5, R6, and R7 each use the PN2 as the reference signal sequence. This can be expressed by the following table.

TABLE 1

|    | R0  | R1  | R2  | R3  | R4  | R5  | R6  | R7  |
|----|-----|-----|-----|-----|-----|-----|-----|-----|
| P1 | PN1 |     |     |     | PN2 |     |     |     |
| P2 |     | PN1 |     |     |     | PN2 |     |     |
| P3 |     |     | PN1 |     |     |     | PN2 |     |
| P4 |     |     |     | PN1 |     |     |     | PN2 |

As such, the PN1 and the PN2, which are orthogonal to each other, can be used to transmit reference signals of 8 antennas.

Figure 152:
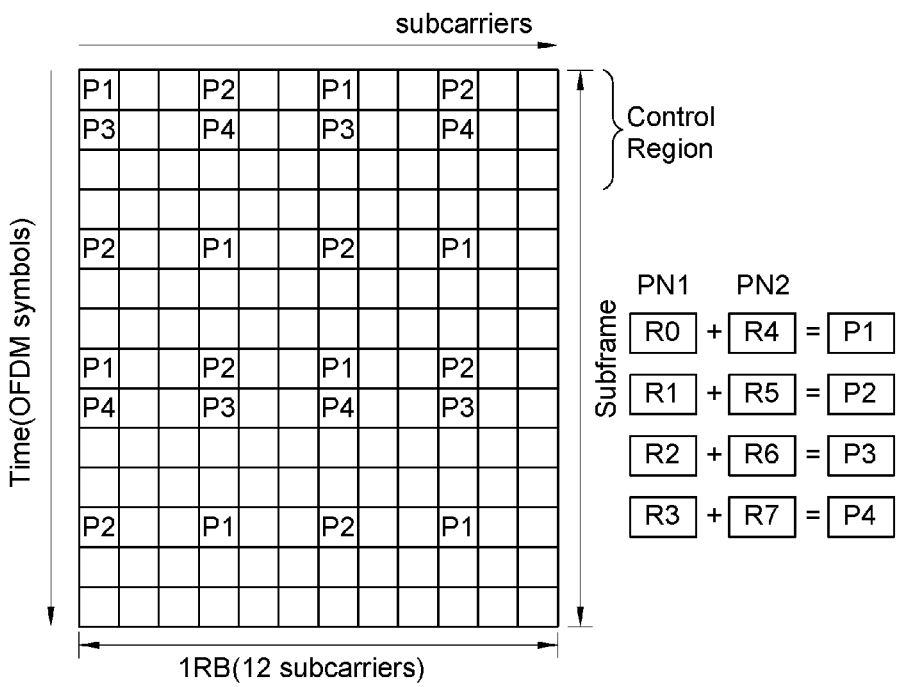
FIG. 152 shows a first example of a reference signal structure using code division multiplexing (CDM).

FIG. 152 shows a first example of an RS structure using CDM.

Referring to FIG. 152, an RS structure using 4 antennas (see FIG. 11) is extended to an RS structure using 8 antennas. Channel estimation performances of antennas 4 to 7 are respectively identical to those of antennas 0 to 3. A reference symbol overhead is 14% similarly to the RS structure using 4 antennas (see FIG. 11). In an OFDM symbol including reference symbols, the number of data symbols is properly maintained. Thus, power boosting of the reference symbols can be easily performed. In particular, a data symbol structure in a control region is not changed. Therefore, the structure of FIG. 152 can be compatible with the 3GPP LTE system.

However, the number of reference symbols used in antennas 0, 1, 4, and 5 is double of that used in antennas 2, 3, 6, and 7, respectively. Therefore, each of the antennas 2, 3, 6, and 7 has poorer channel estimation performance than each of the antennas 0, 1, 4, and 5. In particular, each of the antennas 2, 3, 6, and 7 may have inferior channel estimation performance in a time selective channel.

Figure 153:
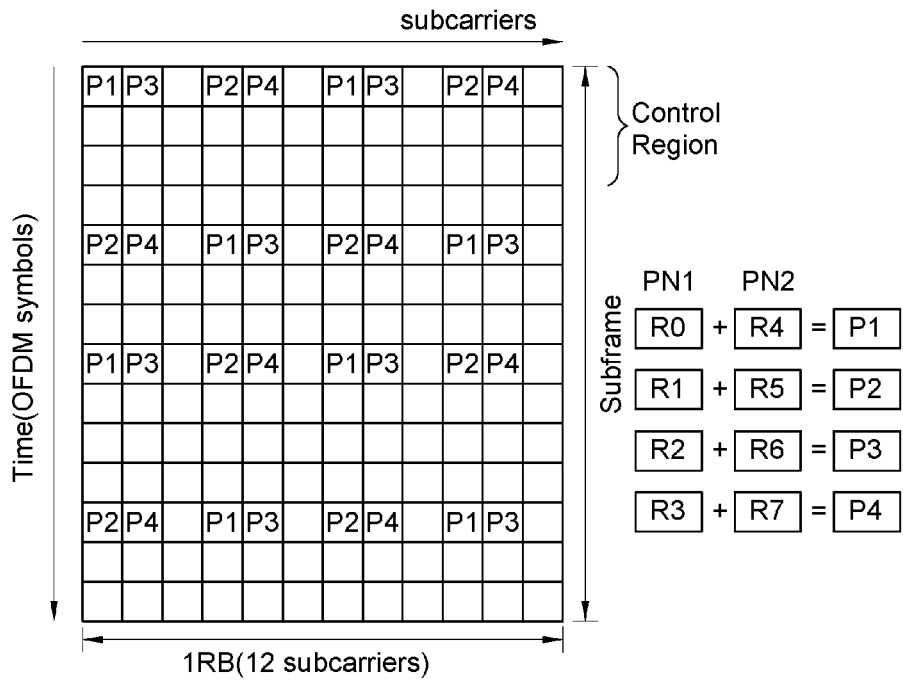
FIG. 153 shows a second example of a reference signal structure using CDM.

FIG. 153 shows a second example of an RS structure using CDM.

Referring to FIG. 153, antennas 0 to 7 each has the same number of reference symbols. Thus, each of the antennas 0 to 7 has the same channel estimation performance. A reference symbol overhead is 19%. In addition, reference symbols of all antennas are transmitted in one OFDM symbol. Therefore, even power transmission is possible among the antennas 0 to 7.

However, the number of data symbols is small in an OFDM symbol including reference symbols. Therefore, power boosting of reference symbols is limited. In particular, when the power boosting of the reference symbols is limited in a control region, reliability of a control channel may deteriorate.

Figure 154:
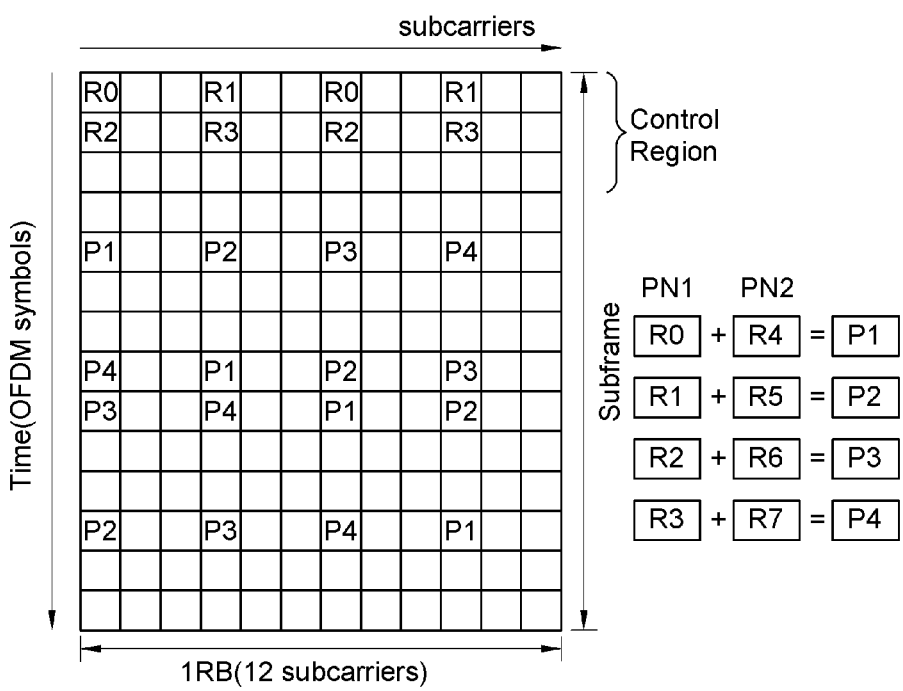
FIG. 154 shows a third example of a reference signal structure using CDM.

FIG. 154 shows a third example of an RS structure using CDM.

Referring to FIG. 154, the CDM is not used in a region used as a control region, and only reference symbols for 4 antennas are transmitted on the region. On the remaining regions other than the control region, reference symbols for 8 antennas may be transmitted using the CDM. The control region and an RS structure in the control region can be maintained identical to those in the 3GPP LTE system, thereby maintaining compatibility with the 3GPP LTE system.

Figure 155:
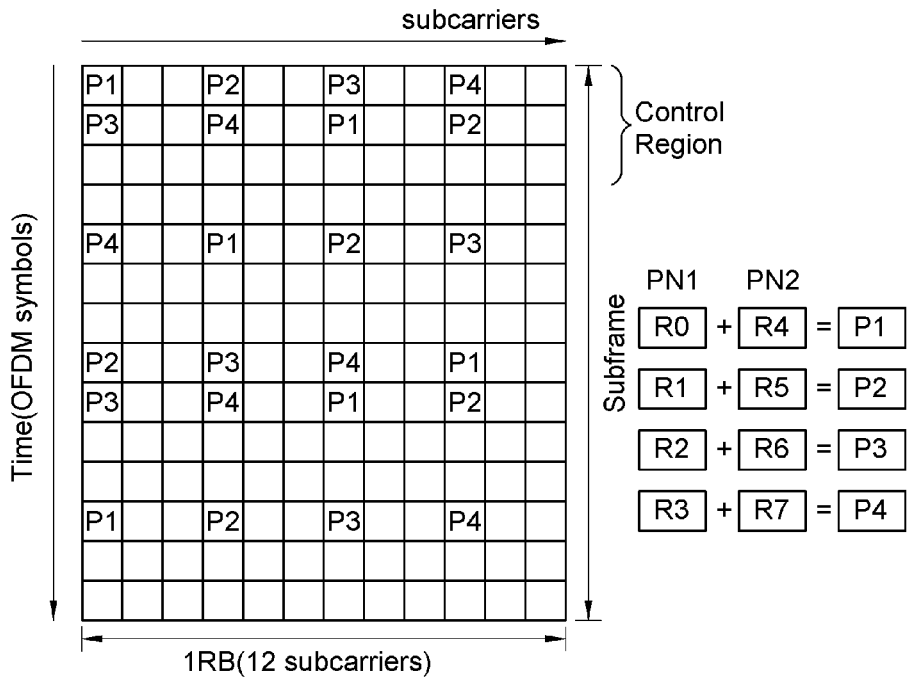
FIG. 155 shows a fourth example of a reference signal structure using CDM.

FIG. 155 shows a fourth example of an RS structure using CDM. In this RS structure, a reference symbol overhead is decreased to 14% while maintaining a characteristic of the RS structure of FIG. 153.

Referring to FIG. 155, antennas 0 to 7 each has the same number of reference symbols. Thus, the antennas 0 to 7 each has the same channel estimation performance. The reference symbol overhead is 14%. In addition, in one OFDM symbol, reference symbols of all antennas are transmitted. Therefore, even power transmission is possible among the antennas 0 to 7. Further, the number of data symbols is properly maintained for an OFDM symbol including reference symbols. Therefore, power boosting of the reference signals can be easily performed.

Figure 156:
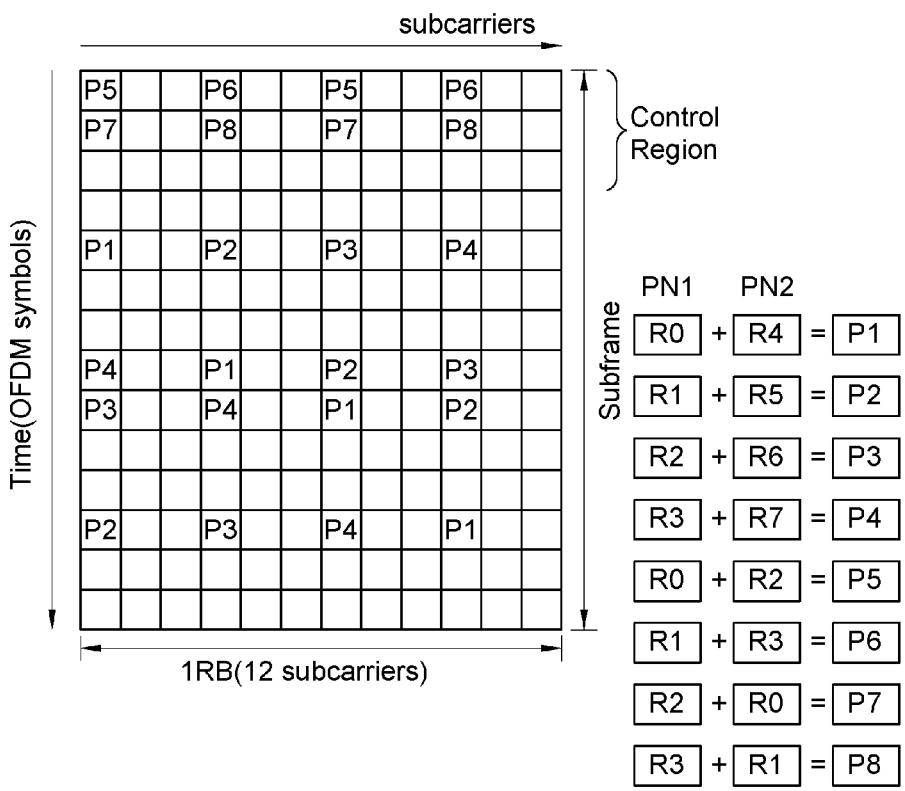
FIG. 156 shows a fifth example of a reference signal structure using CDM.

FIG. 156 shows a fifth example of an RS structure using CDM.

Referring to FIG. 156, R0 and R4 are multiplexed on P1. R1 and R5 are multiplexed on P2. R2 and R6 are multiplexed on P3. R3 and R7 are multiplexed on P4. In this case, R0, R1, R2, and R3 each use PN1 as a reference signal sequence, and R4, R5, R6, and R7 each use PN2 as the reference signal sequence. R0 using PN1 and R2 using PN2 are multiplexed on P5. R1 using PN1 and R3 using PN2 are multiplexed on P6. R2 using PN1 and R0 using PN2 are multiplexed on P7. R3 using PN1 and R1 using PN2 are multiplexed on P8. This can be expressed by the following table.

TABLE 2

|    | R0  | R1  | R2  | R3  | R4  | R5  | R6  | R7  |
|----|-----|-----|-----|-----|-----|-----|-----|-----|
| P1 | PN1 |     |     |     | PN2 |     |     |     |
| P2 |     | PN1 |     |     |     | PN2 |     |     |
| P3 |     |     | PN1 |     |     |     | PN2 |     |
| P4 |     |     |     | PN1 |     |     |     | PN2 |
| P5 | PN1 |     | PN2 |     |     |     |     |     |
| P6 |     | PN1 |     | PN2 |     |     |     |     |
| P7 | PN2 |     | PN1 |     |     |     |     |     |
| P8 |     | PN2 |     | PN1 |     |     |     |     |

As shown in the above table, instead of using the same sequence for all reference symbols of the same antenna, different sequences can be used according to a position of an OFDM symbol.

As described up to now, an RS structure can be designed by using FDM, TDM, CDM, etc., and by considering channel estimation performance, a reference symbol overhead, even power transmission for each antenna, power boosting of a reference symbol, a control region, etc. Although the RS structure has been described for a downlink, it can also apply to an uplink.

A reference signal (RS) transmission method may be classified into a common RS transmission method, a dedicated RS transmission method, a combined RS transmission method, etc. Each method can have different types of RS structures according to various combinations.

The common RS transmission method always transmits a specific number of common RSs irrespective of the number of streams, wherein the specific number is equal to the number of Tx antennas. The common RS is a reference signal transmitted to all UEs within a cell. The common RS has an independent reference signal for each Tx antenna.

A frequency-domain position and a time-domain position of the common RS within a subframe are determined irrespective of the UEs. A common RS sequence to be multiplied by the common RS is generated also irrespective of the UEs. Therefore, all UEs within the cell can receive the common RS. A position of the common RS in a subframe and the common RS sequence may be determined according to a cell ID. Thus, the common RS is also referred to as a cell-specific RS. More specifically, the frequency-domain position of the common RS within a subframe may be determined according to an antenna number and a cell ID. Further, the frequency-domain position of the common RS may be determined by further considering an OFDM symbol index l or a slot number in a radio frame. The time-domain position of the common RS may be determined according to an antenna number and the number of OFDM symbols within a resource block.

The dedicated RS transmission method transmits a specific number of dedicated RSs, wherein the specific number is equal to the number of streams. The dedicated RS is a reference signal received by a specific UE in a cell or a specific UE group. The dedicated RS is also referred to as a UE-specific RS. The dedicated RS can be used when the BS transmits downlink information to a specific UE by beamforming. The dedicated RS can be transmitted using a resource block to which a PDSCH is mapped. The information about the resource block mapped with the PDSCH can be transmitted on a PDCCH. The BS transmits downlink information to the specific UE on the PDSCH.

A frequency-domain position and a time-domain position of the dedicated RS in a subframe can be determined according to a resource block allocated for PDSCH transmission and according to an antenna number. A dedicated RS sequence to be multiplied by the dedicated RS can be determined according to a UE ID. Equations 4 and 5 can also apply to the dedicated RS sequence. However, m is determined by $N^{PDSCH}$. $N^{PDSCH}$ denotes the number of resource blocks corresponding to a bandwidth in association with PDSCH transmission. Therefore, a length of the dedicated RS sequence may vary depending on $N^{PDSCH}$. Accordingly, only the specific UE corresponding to the UE ID in a cell can receive the dedicated RS.

The combined RS transmission method transmits a common RS until the number of steams is less than a specific value, and transmits a dedicated RS when the number of streams is greater than the specific value.

Figure 157:
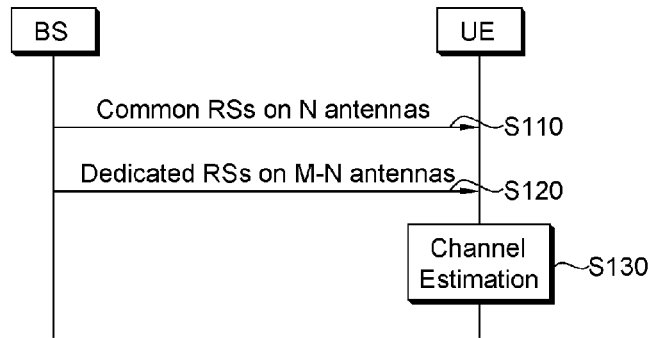
FIG. 157 is a flow diagram showing an example of a combined RS transmission method.

FIG. 157 is a flow diagram showing an example of a combined RS transmission method.

Referring to FIG. 157, it is assumed that a BS uses M antennas to transmit downlink information. Herein, M is a natural number greater than or equal to 2. The BS transmits common RS(s) to a UE on N antennas among the M antennas (step S110). Herein, N is a natural number less than M. The BS transmits dedicated RS(s) to the UE on M−N antennas other than the N antennas (step S120). The UE estimates a channel by using the common RS(s) and the dedicated RS(s) (step S130). The UE can recover the downlink information by estimating the channel.

The BS may transmit antenna information to the UE by using an RRC message. The antenna information may include the number M of antennas used for transmission of the downlink information, the number N of antennas used for transmission of the common RS, etc. In addition, the antenna information may be transmitted to the UE by being masked onto a cyclic redundancy check (CRC) attached to a BCH transport block. The M antennas are numbered from 0 to M−1. Hereinafter, the common RS is transmitted through the N antennas numbered from 0 to N−1, and the dedicated RS is transmitted through M−N antennas numbered from N to M−1.

For example, the BS transmits downlink information by using 8 antennas (i.e., M=8). A common RS can be transmitted through 4 antennas numbered from 0 to 3, and a dedicated RS can be transmitted through 4 antennas numbered from 4 to 7. This is for exemplary purposes only, and thus the combined RS transmission method is not limited thereto.

Figure 158:
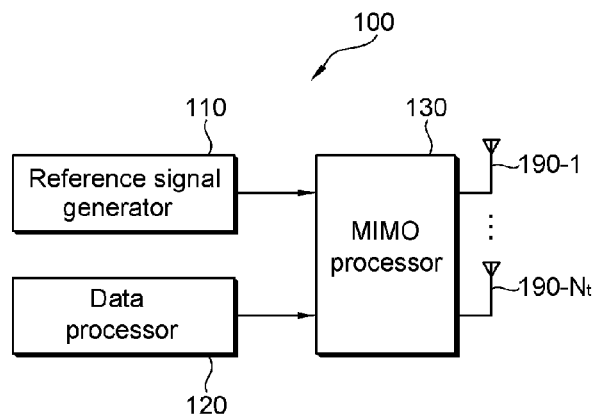
FIG. 158 is a block diagram showing an example of a transmitter using multiple antennas.

FIG. 158 is a block diagram showing an example of a transmitter using multiple antennas. The transmitter may be a part of a BS or a part of a UE.

Referring to FIG. 158, a transmitter 100 includes a reference signal generator 110, a data processor 120, and a MIMO processor 130.

The reference signal generator 110 generates a reference signal as described up to now. The data processor 120 generates a data symbol by performing data processing. For example, data processing includes channel coding, modulation, etc. The MIMO processor 130 processes a data symbol and a reference signal according to a MIMO scheme depending on Tx antennas 190-1, ..., 190-$Nt$. The data symbol and the reference signal are mapped to resource elements for each of the Tx antennas 190-1, ..., 190-$Nt$, and then an OFDM symbol is generated. The generated OFDM signal is transmitted on each of the Tx antennas 190-1, ..., 190-$Nt$.

Figure 159:
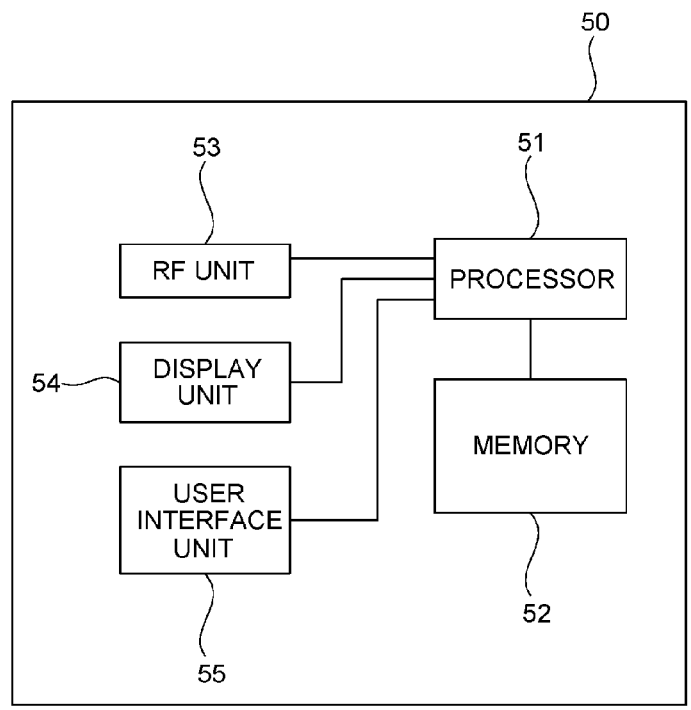
FIG. 159 is a block diagram showing an apparatus for a wireless communication.

FIG. 159 is a block diagram showing an apparatus for a wireless communication. The apparatus may be a part of a UE. An apparatus 50 includes a processor 51, a memory 52, a radio frequency (RF) unit 53, a display unit 54, and a user interface unit 55. The processor 51 may be configured to implement proposed functions, procedures and/or methods described in this description. Layers of the radio interface protocol may be implemented in the processor 51. The processor 51 may provide the control plane and the user plane. The function of each layer can be implemented in the processor 51. The memory 52 is operatively coupled with the processor 51 and stores a variety of information to operate the processor 51 (e.g., an operating system, applications, and general files). The display unit 54 displays a variety of information of the apparatus 50 and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is operatively coupled with the processor 51 and transmits and/or receives radio signals.

The processor 51 may include application-specific integrated circuit (ASIC), other chipset, logic circuit and/or data processing device. The memories 52 may include read-only memory (ROM), random access memory (RAM), flash memory, memory card, storage medium and/or other storage device. The RF units 53 may include baseband circuitry to process radio frequency signals. When the embodiments are implemented in software, the techniques described herein can be implemented with modules (e.g., procedures, functions, and so on) that perform the functions described herein. The modules can be stored in memories 52 and executed by processor 51. The memories 52 can be implemented within the processor 51 or external to the processor 51 in which case those can be communicatively coupled to the processor 51 via various means as is known in the art.

As described above, a method and an apparatus for effectively transmitting a reference signal in a multiple antenna system can be provided. Therefore, overall system performance can be improved.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method for transmitting a reference signal in a multiple antenna system using M antennas (M>2, where M is a natural number), the method comprising:
   transmitting a common reference signal through N antennas (N<M); and transmitting a dedicated reference signal through M−N antennas, wherein:
   the common reference signal is transmitted to all user equipments within a cell, and
   the dedicated reference signal is transmitted to at least one user equipment within the cell, wherein:
   a resource block is defined for each of the M antennas, the resource block comprises a plurality of orthogonal frequency division multiplexing (OFDM) symbols and a plurality of subcarriers, each element of the resource block is a resource element, and
   the common reference signal or the dedicated reference signal is transmitted through a reference symbol which corresponds to a resource element at a specific position in the resource block for each of the M antennas, wherein:
   a first reference signal for one of the M antennas is generated based on a first sequence, and
   a second reference signal for the other one of the M antennas is generated based on a second sequence, and
   wherein the first reference signal and the second reference signal are multiplexed and are transmitted on the same resource element in the resource block.

2. The method of claim 1, wherein:
   the common reference signal is generated based on an identifier (ID) of the cell; and
   the dedicated reference signal is generated based on an ID of the at least one user equipment.

3. The method of claim 1, wherein:
   the dedicated reference signal is transmited transmitted in a resource block mapped with a physical downlink shared channel (PDSCH); and
   information indicating the resource block mapped with the PDSCH is transmitted on a physical downlink control channel (PDCCH).

4. The method of claim 1, wherein the M antennas each has the same number of reference symbols within the resource block.

5. The method of claim 1, wherein the M antennas each has the same number of reference symbols in one OFDM symbol within the resource block.

6. The method of claim 1, further comprising transmitting information indicating the number M and the number N by using a radio resource control (RRC) message.

7. The method of claim 1, wherein information indicating the number M and the number N is masked onto a cyclic redundancy check (CRC) attached to a broadcast channel (BCH) transport block.

8. The method of claim 1, wherein n OFDM symbols (where n is a natural number) within the resource block are mapped to only reference symbols of the N antennas transmitting the common reference signal.

9. The method of claim 8, wherein:
control information is transmitted on a PDCCH in the n OFDM symbols; and
information indicating the number n is transmitted on a physical control format indicator channel (PCFICH).

10. The method of claim 1, wherein the second sequence is obtained by cyclic-shifting the first sequence in a time domain.

11. The method of claim 1, wherein the second sequence is orthogonal to the first sequence.

12. A transmitter, comprising:
M antennas (M>2, where M is a natural number); and
a reference signal generator generating a common reference signal transmitted through N antennas (N<M), and generating a dedicated reference signal transmitted through M−N antennas, wherein:
the common reference signal is transmitted to all user equipments within a cell, and
the dedicated reference signal is transmitted to at least one user equipment within the cell,
wherein:
a resource block is defined for each of the M antennas,
the resource block comprises a plurality of OFDM symbols and a plurality of subcarriers,
each element of the resource block is a resource element, and
the common reference signal or the dedicated reference signal is transmitted through a reference symbol which corresponds to a resource element at a specific position on the resource block for each of the M antennas,
wherein:
a first reference signal for one of the M antennas is generated based on a first sequence, and
a second reference signal for the other one of the M antennas is generated based on a second sequence, and
wherein the first reference signal and the second reference signal are multiplexed and are transmitted on the same resource element in the resource block.

* * * * *